US008355818B2

(12) United States Patent
Nielsen et al.

(10) Patent No.: US 8,355,818 B2
(45) Date of Patent: Jan. 15, 2013

(54) ROBOTS, SYSTEMS, AND METHODS FOR HAZARD EVALUATION AND VISUALIZATION

(75) Inventors: Curtis W. Nielsen, Rexburg, ID (US); David J. Bruemmer, Idaho Falls, ID (US); Miles C. Walton, Idaho Falls, ID (US); Robert S. Hartley, Idaho Falls, ID (US); David I. Gertman, Idaho Falls, ID (US); Robert A. Kinoshita, Idaho Falls, ID (US); Jonathan Whetten, Denver, CO (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 552 days.

(21) Appl. No.: 12/553,794

(22) Filed: Sep. 3, 2009

(65) Prior Publication Data
US 2011/0054689 A1 Mar. 3, 2011

(51) Int. Cl.
*G06F 19/00* (2011.01)
(52) U.S. Cl. ........................ 700/258; 340/628
(58) Field of Classification Search .............. 700/258, 700/245, 253, 255; 318/567, 568.11, 587; 340/628–634, 3.1, 539.22, 870.16, 870.17, 340/501, 506, 525, 531, 539.11, 539.14, 340/587, 600–602
See application file for complete search history.

(56) References Cited

U.S. PATENT DOCUMENTS

| | | |
|---|---|---|
| 4,570,217 A | 2/1986 | Allen et al. |
| 4,613,942 A | 9/1986 | Chen |
| 4,786,847 A | 11/1988 | Dagett et al. |
| 4,846,576 A | 7/1989 | Maruyama et al. |
| 4,870,561 A | 9/1989 | Love et al. |
| 4,967,862 A | 11/1990 | Pong et al. |
| 5,111,401 A | 5/1992 | Everett et al. |
| 5,247,608 A | 9/1993 | Flemming et al. |
| 5,286,973 A | 2/1994 | Westrom et al. |
| 5,347,459 A | 9/1994 | Greenspan et al. |

(Continued)

FOREIGN PATENT DOCUMENTS

WO 0006084 2/2000

OTHER PUBLICATIONS

Bruemmer et al., "Autonomous Robot System for Sensor Characterization" 10th International Conference on Robotics and Remote Systems for Hazardous Environments, Mar. 1, 2004, pp. 1-6.

(Continued)

*Primary Examiner* — Dalena Tran
(74) *Attorney, Agent, or Firm* — TraskBritt

(57) ABSTRACT

A robot includes a hazard sensor, a locomotor, and a system controller. The robot senses a hazard intensity at a location of the robot, moves to a new location in response to the hazard intensity, and autonomously repeats the sensing and moving to determine multiple hazard levels at multiple locations. The robot may also include a communicator to communicate the multiple hazard levels to a remote controller. The remote controller includes a communicator for sending user commands to the robot and receiving the hazard levels from the robot. A graphical user interface displays an environment map of the environment proximate the robot and a scale for indicating a hazard intensity. A hazard indicator corresponds to a robot position in the environment map and graphically indicates the hazard intensity at the robot position relative to the scale.

14 Claims, 35 Drawing Sheets

U.S. PATENT DOCUMENTS

| | | | |
|---|---|---|---|
| 5,371,854 | A | 12/1994 | Kramer |
| 5,509,090 | A | 4/1996 | Maruyama et al. |
| 5,511,147 | A | 4/1996 | Abdel-Malek |
| 5,521,843 | A | 5/1996 | Hashima et al. |
| 5,561,742 | A | 10/1996 | Terada et al. |
| 5,586,199 | A | 12/1996 | Kanda et al. |
| 5,590,062 | A | 12/1996 | Nagamitsu et al. |
| 5,617,335 | A | 4/1997 | Hashima et al. |
| 5,675,229 | A | 10/1997 | Thorne |
| 5,684,531 | A | 11/1997 | Li et al. |
| 5,684,695 | A | 11/1997 | Bauer |
| 5,705,906 | A | 1/1998 | Tanabe et al. |
| 5,721,691 | A | 2/1998 | Wuller et al. |
| 5,838,562 | A | 11/1998 | Gudat et al. |
| 5,867,800 | A | 2/1999 | Leif |
| 5,870,494 | A | 2/1999 | Kanda et al. |
| 5,913,919 | A | 6/1999 | Bauer et al. |
| 5,936,240 | A | 8/1999 | Dudar et al. |
| 5,937,143 | A | 8/1999 | Watanabe et al. |
| 5,949,683 | A | 9/1999 | Akami et al. |
| 5,987,379 | A * | 11/1999 | Smith .................. 701/468 |
| 6,055,042 | A | 4/2000 | Sarangapani |
| 6,061,709 | A | 5/2000 | Bronte |
| 6,078,255 | A | 6/2000 | Dividock et al. |
| 6,157,864 | A | 12/2000 | Schwenke et al. |
| 6,160,371 | A | 12/2000 | Tachikawa |
| 6,163,252 | A | 12/2000 | Nishiwaki |
| 6,167,328 | A | 12/2000 | Takaoka et al. |
| 6,205,380 | B1 | 3/2001 | Bauer et al. |
| 6,212,574 | B1 | 4/2001 | O'Rourke et al. |
| 6,314,341 | B1 | 11/2001 | Kanayama |
| 6,332,102 | B1 | 12/2001 | Nakajima et al. |
| 6,476,354 | B1 | 11/2002 | Jank et al. |
| 6,496,755 | B2 | 12/2002 | Wallach et al. |
| 6,516,236 | B1 | 2/2003 | Brown et al. |
| 6,522,288 | B1 | 2/2003 | Paradie et al. |
| 6,535,793 | B2 | 3/2003 | Allard |
| 6,581,048 | B1 | 6/2003 | Werbos |
| 6,598,169 | B1 | 7/2003 | Warwick et al. |
| 6,618,767 | B1 | 9/2003 | Slaughter et al. |
| 6,681,150 | B1 | 1/2004 | Haga et al. |
| 6,697,147 | B2 | 2/2004 | Ko et al. |
| 6,721,462 | B2 | 4/2004 | Okabayashi et al. |
| 6,760,645 | B2 | 7/2004 | Kaplan et al. |
| 6,760,648 | B2 | 7/2004 | Sakamoto et al. |
| 6,768,944 | B2 | 7/2004 | Breed et al. |
| 6,782,306 | B2 | 8/2004 | Yutkowitz |
| 6,785,590 | B2 | 8/2004 | Kasuga et al. |
| 6,799,100 | B2 * | 9/2004 | Burns et al. .................. 701/25 |
| 6,804,580 | B1 | 10/2004 | Stoddard et al. |
| 6,809,490 | B2 | 10/2004 | Jones et al. |
| 6,816,753 | B2 | 11/2004 | Sakamoto et al. |
| 6,836,701 | B2 | 12/2004 | McKee |
| 6,845,297 | B2 | 1/2005 | Allard |
| 6,865,429 | B1 | 3/2005 | Schneider et al. |
| 6,883,201 | B2 | 4/2005 | Jones et al. |
| 6,889,118 | B2 | 5/2005 | Murray, IV et al. |
| 6,917,893 | B2 | 7/2005 | Dietsch et al. |
| 6,922,632 | B2 | 7/2005 | Foxlin |
| 6,925,357 | B2 | 8/2005 | Wang et al. |
| 6,941,543 | B1 | 9/2005 | Brown et al. |
| 6,974,082 | B2 | 12/2005 | Mackey |
| 7,024,278 | B2 | 4/2006 | Chiappetta et al. |
| 7,069,113 | B2 | 6/2006 | Matsuoka et al. |
| 7,069,124 | B1 | 6/2006 | Whittaker et al. |
| 7,085,637 | B2 | 8/2006 | Breed et al. |
| 7,151,848 | B1 | 12/2006 | Watanabe et al. |
| 7,162,056 | B2 | 1/2007 | Burl et al. |
| 7,164,971 | B2 | 1/2007 | Ferla et al. |
| 7,170,252 | B2 | 1/2007 | Maeki |
| 7,211,980 | B1 * | 5/2007 | Bruemmer et al. .................. 318/587 |
| 7,236,854 | B2 | 6/2007 | Pretlove et al. |
| 7,343,222 | B2 | 3/2008 | Solomon |
| 7,343,232 | B2 | 3/2008 | Duggan et al. |
| 7,429,843 | B2 | 9/2008 | Jones et al. |
| 7,450,127 | B2 | 11/2008 | Hong et al. |
| 2002/0091466 | A1 | 7/2002 | Song et al. |
| 2002/0120362 | A1 | 8/2002 | Lathan et al. |
| 2002/0137557 | A1 | 9/2002 | Ishii et al. |
| 2002/0165028 | A1 | 11/2002 | Miyamoto et al. |
| 2003/0055654 | A1 | 3/2003 | Oudeyer |
| 2003/0101151 | A1 | 5/2003 | Holland |
| 2003/0144774 | A1 | 7/2003 | Trissel et al. |
| 2003/0171846 | A1 | 9/2003 | Murray, IV et al. |
| 2003/0191559 | A1 | 10/2003 | Chatsinchai et al. |
| 2003/0216834 | A1 | 11/2003 | Allard |
| 2004/0019406 | A1 | 1/2004 | Wang et al. |
| 2004/0066500 | A1 | 4/2004 | Gokturk et al. |
| 2004/0073360 | A1 | 4/2004 | Foxlin |
| 2004/0133316 | A1 | 7/2004 | Dean |
| 2004/0138959 | A1 | 7/2004 | Hlavac et al. |
| 2004/0158355 | A1 | 8/2004 | Holmqvist et al. |
| 2004/0167670 | A1 | 8/2004 | Goncalves et al. |
| 2004/0168148 | A1 | 8/2004 | Goncalves et al. |
| 2004/0170302 | A1 | 9/2004 | Museth et al. |
| 2004/0175680 | A1 | 9/2004 | Hlavac et al. |
| 2004/0189702 | A1 | 9/2004 | Hlavac et al. |
| 2004/0193321 | A1 | 9/2004 | Anfindsen et al. |
| 2004/0199290 | A1 | 10/2004 | Stoddard et al. |
| 2004/0210847 | A1 | 10/2004 | Berson et al. |
| 2005/0007603 | A1 | 1/2005 | Arieli et al. |
| 2005/0021186 | A1 | 1/2005 | Murray, IV et al. |
| 2005/0182518 | A1 | 8/2005 | Karlsson |
| 2005/0197739 | A1 | 9/2005 | Noda et al. |
| 2005/0204438 | A1 | 9/2005 | Wang et al. |
| 2005/0234592 | A1 | 10/2005 | McGee et al. |
| 2005/0234679 | A1 | 10/2005 | Karlsson |
| 2006/0015215 | A1 | 1/2006 | Howard et al. |
| 2006/0031429 | A1 | 2/2006 | Ayyagari |
| 2006/0095160 | A1 | 5/2006 | Orita et al. |
| 2006/0117324 | A1 | 6/2006 | Alsafadi et al. |
| 2006/0178777 | A1 | 8/2006 | Park et al. |
| 2006/0241827 | A1 | 10/2006 | Fukuchi et al. |
| 2007/0093940 | A1 | 4/2007 | Ng-Thow-Hing et al. |
| 2007/0135962 | A1 | 6/2007 | Kawabe et al. |
| 2007/0143345 | A1 | 6/2007 | Jones et al. |
| 2007/0156286 | A1 | 7/2007 | Yamauchi |
| 2007/0197877 | A1 | 8/2007 | Decorte et al. |
| 2007/0198145 | A1 | 8/2007 | Norris et al. |
| 2007/0208442 | A1 | 9/2007 | Perrone |
| 2007/0260394 | A1 | 11/2007 | Dean |
| 2007/0271002 | A1 | 11/2007 | Hoskinson et al. |
| 2008/0009964 | A1 | 1/2008 | Bruemmer et al. |
| 2008/0009965 | A1 | 1/2008 | Bruemmer et al. |
| 2008/0009966 | A1 | 1/2008 | Bruemmer et al. |
| 2008/0009967 | A1 | 1/2008 | Bruemmer |
| 2008/0009968 | A1 | 1/2008 | Bruemmer et al. |
| 2008/0009969 | A1 | 1/2008 | Bruemmer et al. |
| 2008/0009970 | A1 | 1/2008 | Bruemmer |
| 2008/0049217 | A1 | 2/2008 | Cappelletti |
| 2008/0071423 | A1 | 3/2008 | Murray, IV et al. |
| 2008/0294288 | A1 | 11/2008 | Yamauchi |
| 2009/0043439 | A1 | 2/2009 | Barfoot et al. |

OTHER PUBLICATIONS

Few, et al., "Semi Autonomous Mine Detection System," INL/CON-10-17918, SPIE Defense Security and Sensing, Orlando, FL, Apr. 2010, 12 pages.

Herman et al., "Modular Countermine Payload for Small Robots," INL/CON-10-17962, SPIE Defense Security and Sensing, Orlando, FL, Apr. 2010, 10 pages.

Baptista et al., "An experimental testbed for position and force control of robotic manipulators," 1998, IEEE, p. 222-227.

Baptista et al., "An open architecture for position and force control of robotic manipulators," 1998, IEEE, p. 471-474, vol. 2.

Barber et al., "A Communication Protocol Supporting Dynamic Autonomy Agreements in Multi-agent Systems," 2001, Internet, p. 1-18.

Bruemmer et al., "Shared Understanding for Collaborative Control," IEEE Transactions on Systems, Man, and Cybernetics-Part A: Systems and Humans, vol. 35, No. 4, Jul. 2005.

Bualat et al., "Developing an Autonomy Infusion Infrastructure for Robotic Exploration," 2004 IEEE Aerospace Conference Proceedings, Jun. 2004, pp. 849-860.

Buttazzo et al., "Robot control in hard real-time environment," 1997, IEEE, p. 152-159.

Fernandez-Madrigal et al., "Adaptable Web Interfaces for Networked Robots," University of Malaga, Spain., 6 pages. (Aug. 2005).

Iberall et al., "Control philosophy and simulation of a robotic hand as a model for prosthetic hands," 1993, IEEE, p. 824-831.

Idaho National Laboratory, Dynamic Autonomy Collaborative Cognitive Workspace, 2002, Internet, p. 1-3.

Idaho National Laboratory, Dynamic Autonomy Real-Time Human-Robot Interaction Issues, Internet, 2002.

Idaho National Laboratory, Teleoperation, 2002, Internet, p. 1-2.

Idasiak et al., "A predictive real-time software for robotic application," 1995, IEEE, p. 3994-3999 vol. 5.

Jennings et al., Cooperative Robot Localization with Vision-Based Mapping, 1998, Internet, p. 1-7.

Laschi et al., "Adaptable Semi-Autonomy in Personal Robots," IEEE International Workshop on Robot and Human Interactive Communication, 2001, pp. 152-157.

Munich et al., "ERSP: A Software Platform and Architecture for the Service Robotics Industry," IEEE, Aug. 2-6, 2005, pp. 460-467.

Piaggio et al., "ETHNOS-II, A Programming Environment for Distributed Multiple Robotic Systems," IEEE Mar. 1999, pp. 1-10.

Teng et al., "A HAL for Component-based Embedded Operating Systems," IEEE Proceedings of the 29th Annual International Computer Software and Applications Conference, 2005, 2 pages.

Thompson, Colleen, "Robots as Team Members? Why, yes, and the Idaho lab is finding them to be as effective as bomb-sniffing dogs," Innovation: America's Journal of Technology Commercialization, Jun.-Jul. 2007, pp. 20-21.

Thrun, "Leaning Occupancy Grids with Forward Models," 2001, IEEE, pp. 1676-1681, vol. 3.

Volpe et al., "The CLARAty Architecture for Robotic Autonomy," Jet Propulsion Laboratory, California Institute of Technology, Pasadena, California, IEEE, Feb. 2001, pp. 1-121 to 1-132.

Yamauchi, Brian, "The Wayfarer modular navigation payload for intelligent robot infrastructure," iRobot Research Group, Burlington, MA, (May 2005) 12 pages.

Yoo et al., "Introduction to Hardware Abstraction Layers for SoC," IEEE Proceedings of the Design, Automation and Test in Europe conference and Exhibition, 2003, 2 pages.

Montano et al., "Active sensing using proximity sensors for object recognition and localization," 1991, IEEE, p. 49-54.

PCT International Search Report and Written Opinion of the International Searching Authority for PCT/US09/36685, dated Nov. 2, 2009, 9 pages.

\* cited by examiner

270

Cognitive Glue:
blends & orchestrates asynchronous firings from
reactive & deliberate behaviors below GoTo: guarded motion, obstacle avoidance, get-unstuck
reactive & deliberate path plan waypoint navigation
272

Human detection & pursuit:   274
occupancy change detection, laser tracking, visual tracking,
path planning, obstacle avoidance 276
Exploration / Reconnaissance (map building)

278
Leader / Follower

280
Search & Identify

*FIG. 9*

| Autonomy Mode | Defines Task Goals | Supervises Direction | Motivates Motion | Prevents Collision |
|---|---|---|---|---|
| Teleoperation mode 293 | Operator | Operator | Operator | Operator |
| Safe Mode 294 | Operator | Operator | Operator | Robot |
| Shared Mode 295 | Operator | Operator | Robot | Robot |
| Collaborative Tasking Mode 296 | Operator | Robot | Robot | Robot |
| Autonomous Mode 297 | Robot | Robot | Robot | Robot |

Guarded Motion Behavior

500

Execute for each direction of motion using resistance, bump, and range regions for each direction (forward, left, right, back)

- Start
- 510 — Is guarded motion on? — No → exit
- Yes
- 520 — Bump/tactile readings indicate a bump? — Yes → 525 Slow down, move in opposite direction from bump T=0, V= -20%
- No
- 530 — Resistance Limit: Wheel acc. = 0 and wheel force > 0 and inertial acc. < 0.15 and impedance > resistance limit — Yes → 535 Halt motion in impeded direction
- No
- 540 — Obstacle inside of event horizon? (threshold+speedadjustment) — No → exit
- Yes
- 550 — Timing Loop (safety glide): Slow down to allowable speed newspeed = current_speed*(0.75-loopspeedadjust) loopspeed adjustment based on event loop speed
- 560 — Obstacle inside of danger zone? (range<threshold) — No → exit
- Yes
- 570 — Stop Motion in current direction Set motion obstruction flag → exit

FIG. 14

ROBOTS, SYSTEMS, AND METHODS FOR HAZARD EVALUATION AND VISUALIZATION

CONTRACTUAL ORIGIN OF THE INVENTION

This invention was made with government support under Contract Number DE-AC07-05ID14517 awarded by the United States Department of Energy. The government has certain rights in the invention.

CROSS-REFERENCE TO RELATED APPLICATIONS

The present application is related to:
U.S. patent application Ser. No. 11/428,769, filed Jul. 5, 2006, now U.S. Pat. No. 7,668,621, issued Feb. 23, 2010;
U.S. patent application Ser. No. 11/428,757, filed Jul. 5, 2006, now U.S. Pat. No. 8,073,564, issued Dec. 6, 2011;
U.S. patent application Ser. No. 11/428,729, filed Jul. 5, 2006, now U.S. Pat. No. 7,801,644, issued Sep. 21, 2010;
U.S. patent application Ser. No. 11/428,650, filed Jul. 5, 2006, now U.S. Pat. No. 7,620,477, issued Nov. 17, 2009;
U.S. patent application Ser. No. 11/428,646, filed Jul. 5, 2006, now U.S. Pat. No. 7,584,020, issued Sep. 1, 2009;
U.S. patent application Ser. No. 11/428,637, filed Jul. 5, 2006, now U.S. Pat. No. 7,587,260, issued Sep. 8, 2009;
U.S. patent application Ser. No. 11/428,621, filed Jul. 5, 2006, now U.S. Pat. No. 7,974,738, issued Jul. 5, 2011;
U.S. patent application Ser. No. 11/428,743, filed Jul. 5, 2006, now U.S. Pat. No. 7,211,980, issued May 1, 2007; and
U.S. patent application Ser. No. 12/048,110, filed Mar. 13, 2008, now U.S. Pat. No. 8,271,132, issued Sep. 18, 2012, the disclosures of which are incorporated by reference herein in their entireties.

This application is also related to U.S. patent application Ser. No. 13/049,788, filed Mar. 16, 2011, pending.

TECHNICAL FIELD

The present invention relates generally to robotics and, more specifically, to hazard identification and presentation using different levels of autonomy in robots.

BACKGROUND

Historically, robot behaviors have been created for specific tasks and applications. These behaviors have generally been reinvented time and again for different robots and different applications. There has been no sustained attempt to provide a kernel of basic robot competence and decision making that can be used to bootstrap development across many different applications.

Some architectures have been proposed that provide a generic application programming interface (API) for querying various sensors and commanding various actuators; however, many of these architectures have been limited to raw inputs and outputs rather than provide the intelligence and behavior to a robot. As a result, the behavior functionality created for one robot may not be easily ported to new robots. Other architectures have been proposed to allow limited behaviors to port across different robot platforms, but these have generally been limited to specific low-level control systems.

The problem with robots today is that they are not very bright. Current robot "intelligence" is really just a grab-bag of programmed behaviors to keep mobile robots from doing stupid things, like getting stuck in corners or running into obstacles. The promise of wireless robots is that they can be sent into remote situations that are too difficult or dangerous for humans. The reality is that today's robots generally lack the ability to make any decisions on their own and rely on continuous guidance by human operators watching live video from on-board cameras.

Most commercial robots operate on a master/slave principle. A human operator completely controls the movement of the robot from a remote location using robot-based sensors such as video and Global Positioning System (GPS). This setup often requires more than one operator per robot to navigate around obstacles and achieve a goal. As a result, very skilled operators may be necessary to reliably direct the robot. Furthermore, the intense concentration needed for controlling the robot can detract from achieving mission goals.

Although it has been recognized that there is a need for adjustable autonomy, robot architectures currently define levels of autonomy that are only selectable by the user. As a result, performance of the robot and its human controller is often dependent on the human controller's understanding of the robot's autonomy levels and when the various levels are appropriate.

One common task for robots is to perform threat assessments in environments that may be too dangerous for humans. A typical threat assessment in a hazardous environment requires teams of highly trained personnel and may require extensive personal protective equipment (PPE), decontamination facilities, rescue teams, and other preparations. The PPE that may be needed can range from anti-contamination (anti-C) boots and gloves to full-HAZMAT (HAZardous MATerial) suits with supplied breathing air. Simply moving down range in a respirator or with heavy oxygen tanks and anti-Cs or a HAZMAT suit is difficult. Multiple bulky instruments may be required to detect and assess varied potential hazards. The instruments themselves may need to be wrapped adding to their weight and making control and interpretation difficult, especially when wearing gloves and a respirator or supplied air. The time in which an assessment team may be able to stay in the environment can be limited by ambient temperature, workload, and various other external factors. These issues can severely limit the responder's situational awareness of the environment and developing hazards and make it difficult to assess the hazards, identify safety boundaries, and report the results for an effective response. Significant manpower may be needed, such as a backup two-man team if for rescue, or to continue assessment, perform decontamination, or other support.

When returning from a down-range exploration, responders generally provide a map of the area including where the hazards are located and at what levels the hazards were recorded. This requires the responder to either remember the information or transmit the information back to the main base where other responders can create the map. In order to effectively perform the full mission, responders are also thoroughly trained, which can take significant time to learn the equipment and procedures. Even with training, the process of manually mapping an area is extremely time consuming and the results, especially in large, complex environments, are often inaccurate or incomplete. Furthermore, empirical studies have shown that differing levels of training is often evidenced in performance of the task with current state-of-the-art robotics.

While there are tactics, techniques, procedures, and technology to perform threat assessments, the approaches are constrained by human vulnerability to the environment, human error, human communication protocols, and human memory. Ideally, humans would be able to gather and map information about the hazardous environment while stationed a safe distance from the hazard. Robots are sometimes used for this approach. However, conventionally these hazard robot applications operate in a teleoperation mode where a human user directs movements of the robot. In addition, localization and visualization of specific hazard levels in the environment has been limited.

Therefore, there is a need for systems and methods that provide a more autonomous level of decision making when seeking out and localizing hazardous materials, as well as intuitive visualizations of the environment and hazard intensities detected therein.

BRIEF SUMMARY OF THE INVENTION

Embodiments of the present invention provide a more autonomous level of decision making when seeking out and localizing hazardous materials, as well as creating intuitive visualizations of the environment and hazard intensities detected therein.

An embodiment of the present invention comprises a robot platform including a locomotor configured for providing mobility to the robot platform and a hazard sensor configured for sensing an environmental hazard to generate a signal containing hazard information indicative of a magnitude of the environmental hazard. A system controller is disposed on the robot platform and is operably coupled to the signal from the at least one hazard sensor and the at least one locomotor. The system controller is configured for executing a hazard evaluation of an area of interest by repeatedly determining a hazard level of the hazard information proximate the hazard sensor and using a robot initiative to adaptively move the robot platform with the locomotor to a new position responsive to the hazard level.

Another embodiment of the present invention comprises a method for controlling a robot to perform a hazard evaluation with the robot at multiple locations of an area of interest. To perforin the hazard evaluation, the method includes repeatedly detecting an intensity of an environmental hazard at a current location in the area of interest with at least one detector coupled to the robot and autonomously moving to a new location in the area of interest responsive to the intensity of the environmental hazard. The method also includes communicating the intensity of the environmental hazard for at least one of the multiple locations to a remote user interface and indicating, with the remote user interface, the intensity of the environmental hazard for the at least one of the multiple locations to a user.

Another embodiment of the present invention also comprises a robot control system including a robot platform and a remote controller. The robot platform includes a hazard sensor, a locomotor, a robot communicator and a system controller. The robot platform is configured for sensing a hazard intensity at a current location of the robot platform with the hazard sensor, moving the robot platform to a new location with the locomotor responsive to the hazard intensity, and autonomously repeating the sensing and moving to determine multiple hazard levels at multiple locations responsive to the hazard intensity at the current location. The robot platform is also configured to communicate at least one of the multiple hazard levels to the remote controller with the robot communicator. The remote controller includes a user interface for developing user commands, a hazard level indicator for notifying a user of the hazard intensity at one or more of the multiple locations in substantially real time, and a remote controller communicator for sending the user commands to the robot platform and receiving the hazard intensity at one or more of the multiple locations from the robot platform.

Another embodiment of the present invention comprises a Graphical User Interface (GUI) for displaying information about an environment proximate a robot. The GUI includes an environment map for displaying a representation of the environment proximate the robot and a hazard gradient scale for indicating varying levels of a hazard intensity. The GUI also includes at least one hazard indicator corresponding to a robot position in the environment map and graphically indicating the hazard intensity at the robot position relative to the hazard gradient scale.

BRIEF DESCRIPTION OF THE DRAWINGS

In the drawings, which illustrate what is currently considered to be the best mode for carrying out the invention:

FIG. 9 illustrates representative cognitive conduct components that may be available on robot platforms;

FIG. 14 is a software flow diagram illustrating components of an algorithm for performing a guarded motion behavior;

DETAILED DESCRIPTION OF THE INVENTION

In the following description, circuits and functions may be shown in block diagram form in order not to obscure the present invention in unnecessary detail. Conversely, specific circuit implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations, and the like, have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Furthermore, in this description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Headings are included herein to aid in locating certain sections of detailed description. These headings should not be considered to limit the scope of the concepts described under any specific heading. Furthermore, concepts described in any specific heading are generally applicable in other sections throughout the entire specification.

1. Hardware Environment

Figure 1:
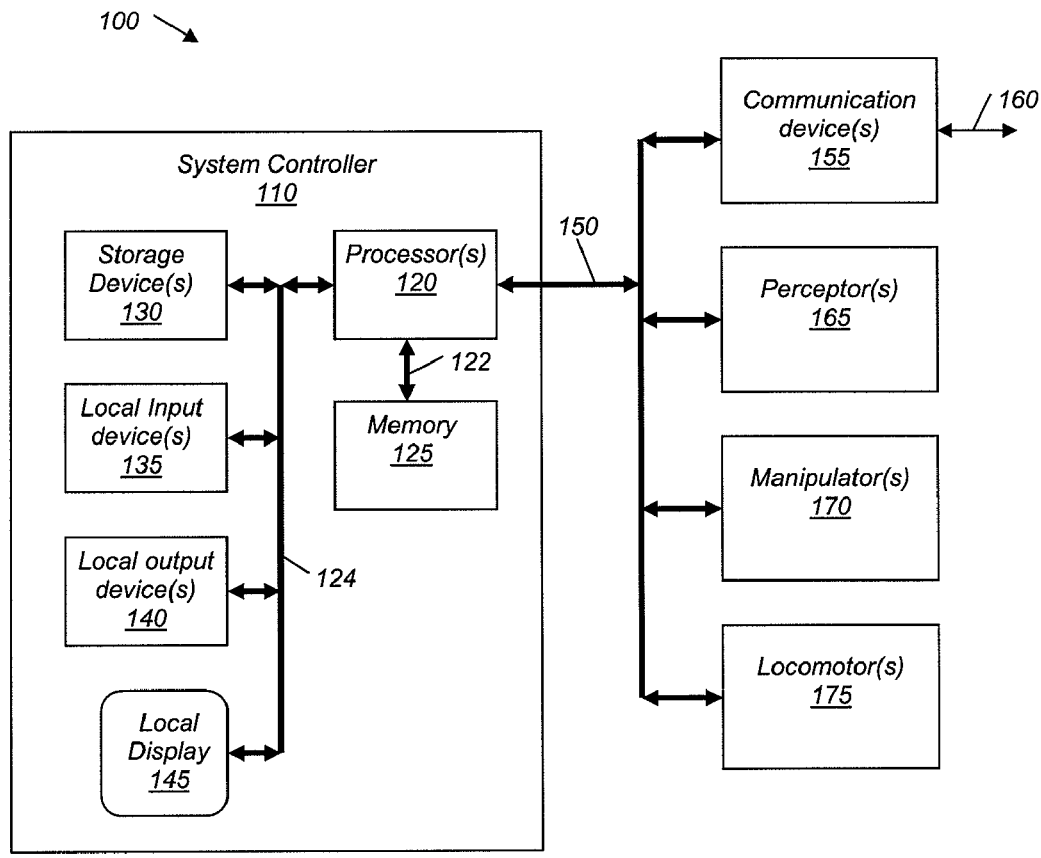
FIG. 1 illustrates a representative robot platform embodiment of the present invention.

FIG. 1 illustrates a representative robot platform 100 (may also be referred to herein as a robot system) including the present invention. A robot platform 100 may include a system controller 110 including a system bus 150 for operable coupling to one or more communication devices 155 operably coupled to one or more communication channels 160, one or more perceptors 165, one or more manipulators 170, and one or more locomotors 175.

The system controller 110 may include a processor 120 operably coupled to other system devices by internal buses (122, 124). By way of example, and not limitation, the processor 120 may be coupled to a memory 125 through a memory bus 122. The system controller 110 may also include an internal bus 124 for coupling the processor 120 to various other devices, such as storage devices 130, local input devices 135, local output devices 140, and local displays 145.

Local output devices 140 may be devices such as speakers, status lights, and the like. Local input devices 135 may be devices such as keyboards, mice, joysticks, switches, and the like.

Local displays 145 may be as simple as light-emitting diodes indicating status of functions of interest on the robot platform 100, or may be as complex as a high-resolution display terminal.

The communication channels 160 may be adaptable to both wired and wireless communication, as well as supporting various communication protocols. By way of example, and not limitation, the communication channels 160 may be configured as a serial or parallel communication channel, such as, for example, USB, IEEE-1394, 802.11a/b/g, cellular telephone, and other wired and wireless communication protocols.

The perceptors 165 may include inertial sensors, thermal sensors, tactile sensors, compasses, range sensors, sonar, Global Positioning System (GPS), Ground Penetrating Radar (GPR), lasers for object detection and range sensing, imaging devices, and the like. Furthermore, those of ordinary skill in the art will understand that many of these sensors may include a generator and a sensor to combine sensor inputs into meaningful, actionable perceptions. For example, sonar perceptors and GPR may generate sound waves or sub-sonic waves and sense reflected waves. Similarly, perceptors including lasers may include sensors configured for detecting reflected waves from the lasers for determining interruptions or phase shifts in the laser beam.

Imaging devices may be any suitable device for capturing images, such as, for example, an infrared imager, a video camera, a still camera, a digital camera, a Complementary Metal Oxide Semiconductor (CMOS) imaging device, a charge coupled device (CCD) imager, and the like. In addition, the imaging device may include optical devices for modifying the image to be captured, such as, for example, lenses, collimators, filters, and mirrors. For adjusting the direction at which the imaging device is oriented, a robot platform 100 may also include pan and tilt mechanisms coupled to the imaging device. Furthermore, a robot platform 100 may include a single imaging device or multiple imaging devices.

The manipulators 170 may include vacuum devices, magnetic pickup devices, arm manipulators, scoops, grippers, camera pan and tilt manipulators, and the like.

The locomotors 175 may include one or more wheels, tracks, legs, rollers, propellers, and the like. For providing the locomotive power and steering capabilities, the locomotors 175 may be driven by motors, actuators, levers, relays and the like. Furthermore, perceptors 165 may be configured in conjunction with the locomotors 175, such as, for example, odometers and pedometers.

Figure 2:
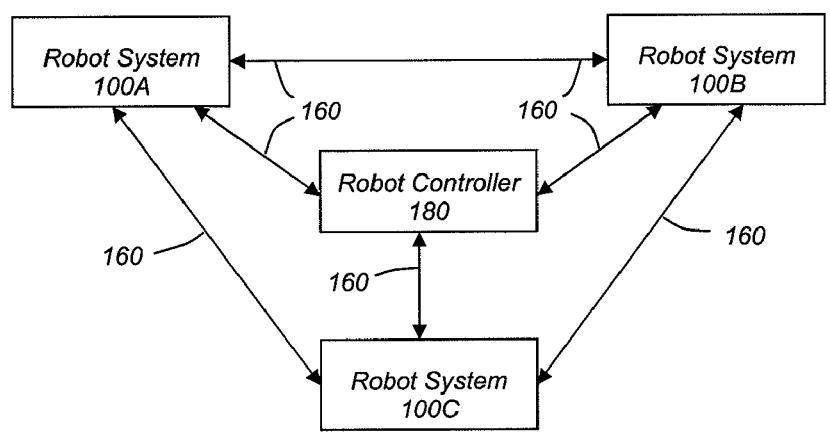
FIG. 2 illustrates a representative robot control environment including a plurality of robot platforms and a robot controller.

FIG. 2 illustrates a representative robot control environment including a plurality of robot platforms (100A, 100B, and 100C) and a robot controller 180. The robot controller 180 may be a remote computer executing a software interface from which an operator may control one or more robot platforms (100A, 100B, and 100C) individually or in cooperation. The robot controller 180 may communicate with the robot platforms (100A, 100B, and 100C), and the robot platforms (100A, 100B, and 100C) may communicate with each other, across the communication channels 160. While FIG. 2 illustrates one robot controller 180 and three robot platforms (100A, 100B, and 100C) those of ordinary skill in the art will recognize that a robot control environment may include one or more robot platforms 100 and one or more robot controllers 180. In addition, the robot controller 180 may be a version of a robot platform 100.

Software processes illustrated herein are intended to illustrate representative processes that may be performed by the robot platform 100 or robot controller 180. Unless specified otherwise, the order in which the processes are described is not intended to be construed as a limitation. Furthermore, the processes may be implemented in any suitable hardware, software, firmware, or combinations thereof. By way of example, software processes may be stored on the storage device 130, transferred to the memory 125 for execution, and executed by the processor 120.

When executed as firmware or software, the instructions for performing the processes may be stored on a computer readable medium (i.e., storage device 130). A computer readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

2. Generic Robot Abstraction Architecture

Conventionally, robot architectures have been defined for individual robots and generally must be rewritten or modified to work with different sensor suites and robot platforms. This means that adapting the behavior functionality created for one robot platform to a different robot platform is problematic. Furthermore, even architectures that propose a hardware abstraction layer to create a framework for accepting various hardware components still may not create a robot abstraction layer wherein the abstractions presented for high-level behavioral programming are in terms of actionable components or generic robot attributes rather than the hardware present on the robot.

A notable aspect of the present invention is that it collates the sensor data issued from hardware or other robotic architectures into actionable information in the form of generic precepts. Embodiments of the present invention may include a generic robot architecture (GRA), which comprises an extensible, low-level framework, which can be applied across a variety of different robot hardware platforms, perceptor suites, and low-level proprietary control application programming interfaces (APIs). By way of example, some of these APIs may be Mobility, Aria, Aware, Player, etc.).

Figure 3:
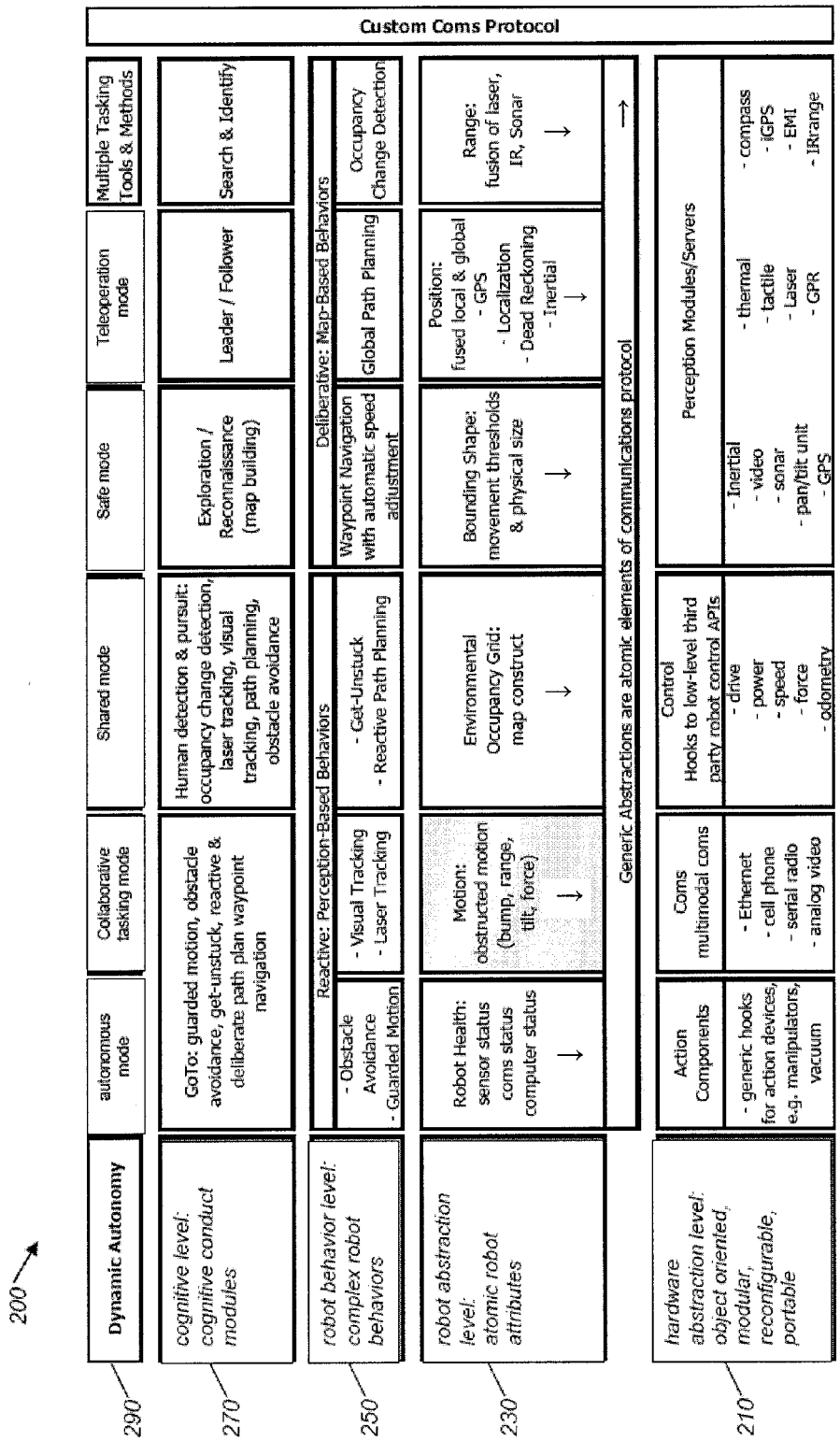
FIG. 3 is a software architecture diagram illustrating significant components of embodiments of the present invention.

FIG. 3 is a software architecture diagram 200 illustrating significant components of the GRA as a multi-level abstraction. Within the GRA, various levels of abstraction are available for use in developing robot behavior at different levels of dynamic autonomy 290. The object-oriented structure of the GRA may be thought of as including two basic levels. As is conventional in object-oriented class structures, each subsequent level inherits all of the functionality of the higher levels.

At the lower level, the GRA includes a hardware abstraction level, which provides for portable, object-oriented access to low-level hardware perception and control modules that may be present on a robot. The hardware abstraction level is reserved for hardware specific classes and includes, for example, implementations for the actual robot geometry and sensor placement on each robot type.

Above the hardware abstraction level, the GRA includes a robot abstraction level, which provides atomic elements (i.e., building blocks) of generic robot attributes and develops a membrane between the low-level hardware abstractions and controls. This membrane is based on generic robot attributes, or actionable components, which include robot functions, robot perceptions, and robot status. Each generic robot attribute may utilize a variety of hardware abstractions, and possibly other robot attributes, to accomplish its individual function.

The robot abstraction level may include implementations that are generic to given proprietary low-level APIs. Examples of functions in this class level include the interface calls for a variety of atomic level robot behaviors such as, for example, controlling motion and reading sonar data.

The GRA enables substantially seamless porting of behavioral intelligence to new hardware platforms and control APIs by defining generic robot attributes and actionable components to provide the membrane and translation between behavioral intelligence and the hardware. Once a definition for a robot in terms of platform geometries, sensors, and API calls has been specified, behavior and intelligence may be ported in a substantially seamless manner for future development. In addition, the object-oriented structure enables straightforward extension of the architecture for defining new robot platforms as well as defining low-level abstractions for new perceptors, motivators, communications channels, and manipulators.

The GRA includes an interpreter such that existing and new robot behaviors port in a manner that is transparent to both the operator and the behavior developer. This interpreter may be used to translate commands and queries back and forth between the operator and robot with a common interface, which can then be used to create perceptual abstractions and behaviors. When the "common language" supported by the GRA is used by robot developers, it enables developed behaviors and functionality to be interchangeable across multiple robots. In addition to creating a framework for developing new robot capabilities, the GRA interpreter may be used to translate existing robot capabilities into the common language so that the behavior can then be used on other robots. The GRA is portable across a variety of platforms and proprietary low-level APIs. This is done by creating a standard method for commanding and querying robot functionality that exists on top of any particular robot manufacturer's control API. Moreover, unlike systems where behavior stems from sensor data, the GRA facilitates a consistent or predictable behavior output regardless of robot size or type by categorizing robot and sensor data into perceptual abstractions from which behaviors can be built.

The Generic Robot Architecture also includes a scripting structure for orchestrating the launch of the different servers and executables that may be used for running the GRA on a particular robot platform. Note that since these servers and executables (e.g., laser server, camera server, and base platform application) will differ from robot to robot, the scripting structure includes the ability to easily specify and coordinate the launch of the files that may be needed for specific applications. In addition, the scripting structure enables automatic launching of the system at boot time so that the robot is able to exhibit functionality without any operator involvement (i.e., no need for a remote shell login).

The Generic Robot Architecture may access configuration files created for each defined robot type. For example, the configuration files may specify what sensors, actuators, and API are being used on a particular robot. Use of the scripting structure together with the configuration enables easy reconfiguration of the behaviors and functionality of the robot without having to modify source code (i.e., for example, recompile the C/C++ code).

The GRA keeps track of which capabilities are available (e.g., sensors, actuators, mapping systems, communications) on the specific embodiment and uses virtual and stub functions within the class hierarchy to ensure that commands and queries pertaining to capabilities that an individual robot does not have do not cause data access errors. For example, in a case where a specific capability, such as a manipulator, does not exist, the GRA returns special values indicating to the high-level behavioral control code that the command cannot be completed or that the capability does not exist. This makes it much easier to port seamlessly between different robot types by allowing the behavior code to adapt automatically to different robot configurations.

The above discussion of GRA capabilities has focused on the robot-oriented aspects of the GRA. However, the robot-oriented class structure is only one of many class structures included in the GRA. For example, the GRA also includes multi-tiered class structures for communication, range-sensing, cameras, and mapping. Each one of these class structures is set up to provide a level of functional modularity and allow different sensors and algorithms to be used interchangeably. By way of example, and not limitation, without changing the behavioral code built on the GRA at the robot behavior level, it may be possible to swap various mapping and localization systems or cameras and yet achieve the same functionality simply by including the proper class modules at the hardware abstraction level and possibly at the robot abstraction level. Additional capabilities and features of each of the levels of the GRA are discussed below.

2.1. Hardware Abstraction Level

Figure 4:
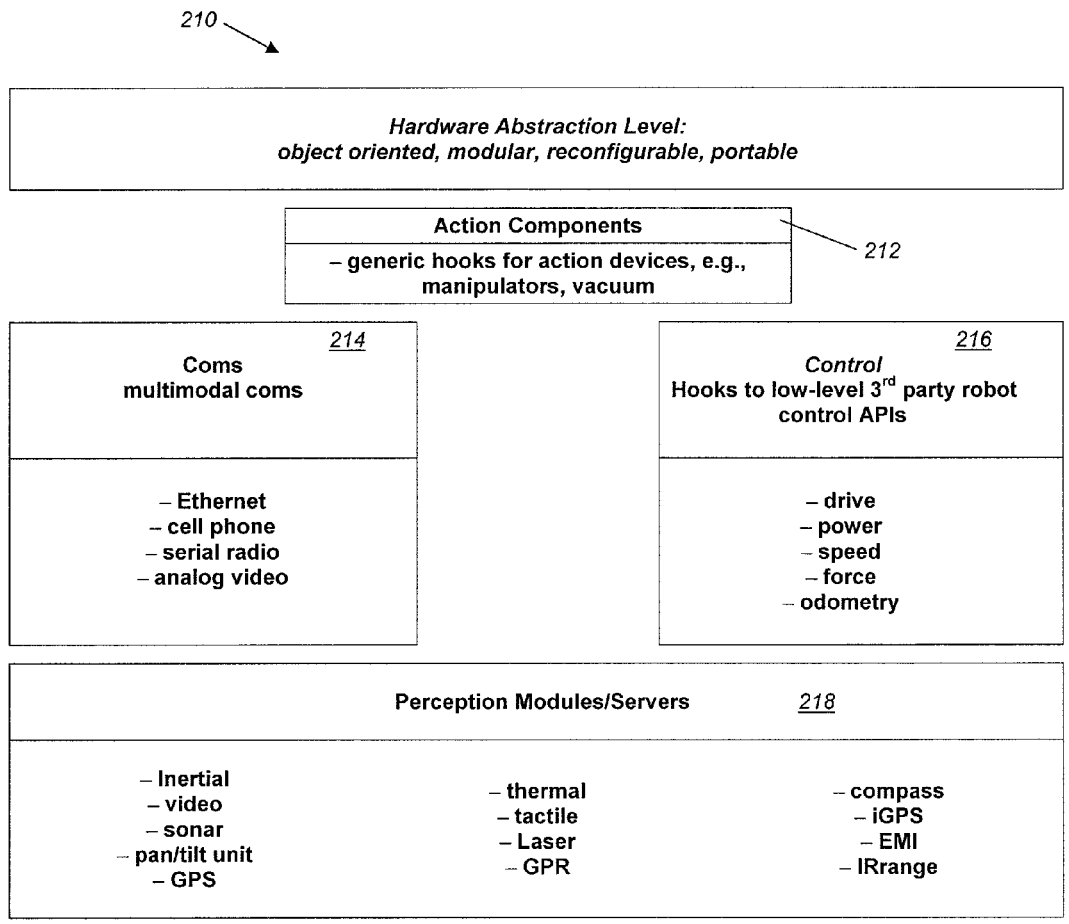
FIG. 4 illustrates representative hardware abstractions of hardware modules that may be available on robot platforms.

FIG. 4 illustrates the hardware abstraction level 210, which includes representative hardware abstractions of hardware modules that may be available on a robot platform. These hardware abstractions create an object-oriented interface between the software and hardware that is modular, reconfigurable, and portable across robot platforms. As a result, a software component can create a substantially generic hook to a wide variety of hardware that may perform a similar function. It will be readily apparent to those of ordinary skill in the art that the modules shown in FIG. 4 are a representative, rather than comprehensive example of hardware abstractions. Some of these hardware abstractions include; action abstractions 212 (also referred to as manipulation abstractions) for defining and controlling manipulation type devices on the robot, communication abstractions 214 for defining and controlling communication media and protocols, control abstractions 216 (also referred to as locomotion abstractions) for defining and controlling motion associated with various types of locomotion hardware, and perception abstractions 218 for defining and controlling a variety of hardware modules configured for perception of the robot's surroundings and pose (i.e., position and orientation).

2.1.1. Manipulation Abstractions

Action device abstractions 212 may include, for example, vacuum devices, magnetic pickup devices, arm manipulators, scoops, grippers, camera pan and tilt manipulators, and the like.

2.1.2. Communication Abstractions

The communication abstractions present substantially common communications interfaces to a variety of communication protocols and physical interfaces. The communication channels 160 may be adaptable to both wired and wireless communication, as well as supporting various communication protocols. By way of example, and not limitation, the communication abstractions may be configured to support serial and parallel communication channels, such as, for example, USB, IEEE-1394, 802.11a/b/g, cellular telephone, and other wired and wireless communication protocols.

2.1.3. Locomotion Abstractions

Locomotion abstractions 216 may be based on robot motion, not necessarily on specific hardware components. For example and not limitation, motion control abstractions may include drive, steering, power, speed, force, odometry, and the like. Thus, the motion abstractions can be tailored to individual third party drive controls at the hardware abstraction level and effectively abstracted away from other architectural components. In this manner, support for motion control of a new robot platform may comprise simply supplying the APIs that control the actual motors, actuators and the like, into the locomotion abstraction framework.

2.1.4. Perception Abstractions

The perception abstractions 218 may include abstractions for a variety of perceptive hardware useful for robots, such as, for example, inertial measurements, imaging devices, sonar measurements, camera pan/tilt abstractions, GPS and iGPS abstractions, thermal sensors, infrared sensors, tactile sensors, laser control and perception abstractions, GPR, compass measurements, EMI measurements, and range abstractions.

2.2. Robot Abstraction Level

Figure 5:
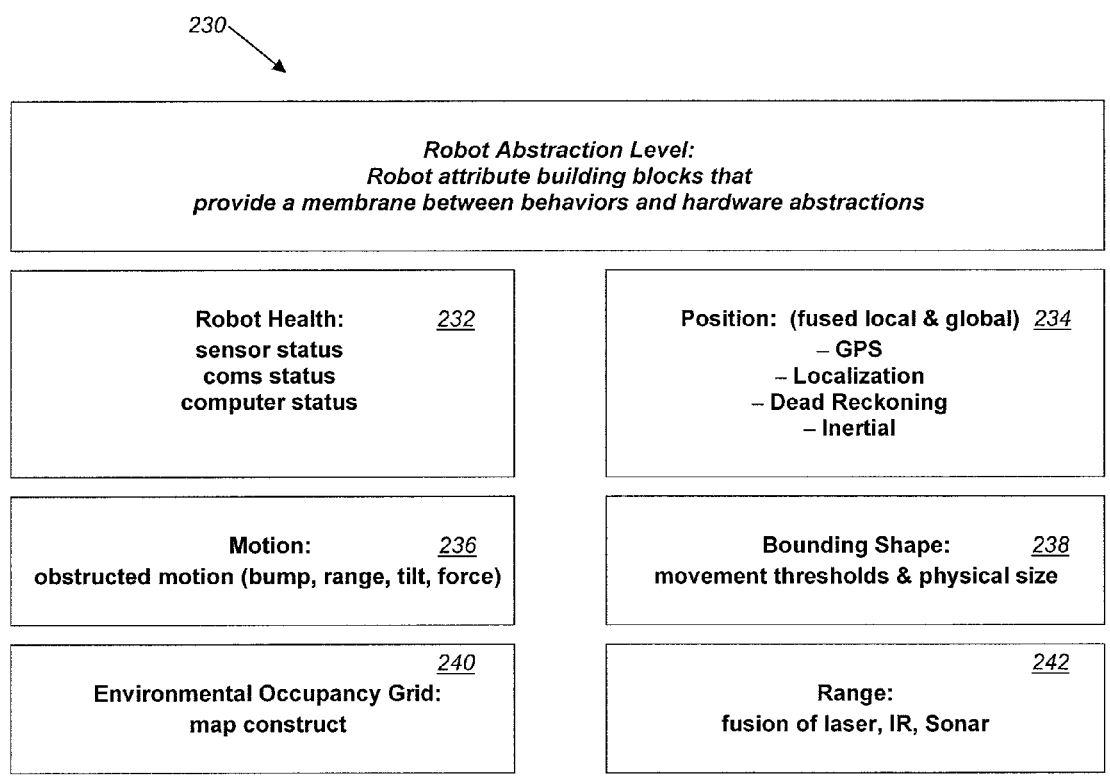
FIG. 5 illustrates a robot abstraction level including robot attributes that may be available on robot platforms.

While the hardware abstraction level 210 focuses on a software model for a wide variety of hardware that may be useful on robots, the robot abstraction level 230 (as illustrated in FIGS. 3 and 5) focuses on generic robot attributes. The generic robot attributes enable building blocks for defining robot behaviors at the robot behavior level and provide a membrane for separating the definition of robot behaviors from the low-level hardware abstractions. Thus, each robot attribute may utilize one or more hardware abstractions to define its attribute. These robot attributes may be thought of as actionable abstractions. In other words, a given actionable abstraction may fuse multiple hardware abstractions that provide similar information into a data set for a specific robot attribute. For example and not limitation, the generic robot attribute of "range" may fuse range data from hardware abstractions of an IR sensor and a laser sensor to present a single coherent structure for the range attribute. In this way, the GRA presents robot attributes as building blocks of interest for creating robot behaviors such that, the robot behavior can use the attribute to develop a resulting behavior (e.g., stop, slow down, turn right, turn left, etc).

Furthermore, a robot attribute may combine information from dissimilar hardware abstractions. By way of example, and not limitation, the position attributes may fuse information from a wide array of hardware abstractions, such as: perception modules like video, compass, GPS, laser, and sonar; along with control modules like drive, speed, and odometry. Similarly, a motion attribute may include information from position, inertial, range, and obstruction abstractions.

This abstraction of robot attributes frees the developer from dealing with individual hardware elements. In addition, each robot attribute can adapt to the amount, and type of information it incorporates into the abstraction based on what hardware abstractions may be available on the robot platform.

The robot attributes, as illustrated in FIG. 5, are defined at a relatively low level of atomic elements that include attributes of interest for a robot's perception, status, and control. Some of these robot attributes include; robot health 232, robot position 234, robot motion 236, robot bounding shape 238, environmental occupancy grid 240, and range 242. It will be readily apparent to those of ordinary skill in the art that the modules shown in FIG. 5 are a representative, rather than comprehensive, example of robot attributes. Note that the term robot attributes is used somewhat loosely, given that robot attributes may include physical attributes such as health 232 and bounding shape 238 as well as how the robot perceives its environment, such as the environmental occupancy grid 240 and range attributes 242.

2.2.1. Robot Health

The robot health abstractions 232 may include, for example, general object models for determining the status and presence of various sensors and hardware modules, determining the status and presence of various communication modules, and determining the status of on board computer components.

2.2.2. Robot Bounding Shape

The robot bounding shape 238 abstractions may include, for example, definitions of the physical size and boundaries of the robot and definitions of various thresholds for movement that define a safety zone or event horizon, as is explained more fully below.

2.2.3. Robot Motion

The robot motion abstractions 236 may include abstractions for defining robot motion and orientation attributes such as, for example, obstructed motion, velocity, linear and angular accelerations, forces, and bump into obstacle, and orientation attributes such as roll, yaw and pitch.

2.2.4. Range

The range abstractions 242 may include, for example, determination of range to obstacles from lasers, sonar, infrared, and fused combinations thereof.

Figure 6:
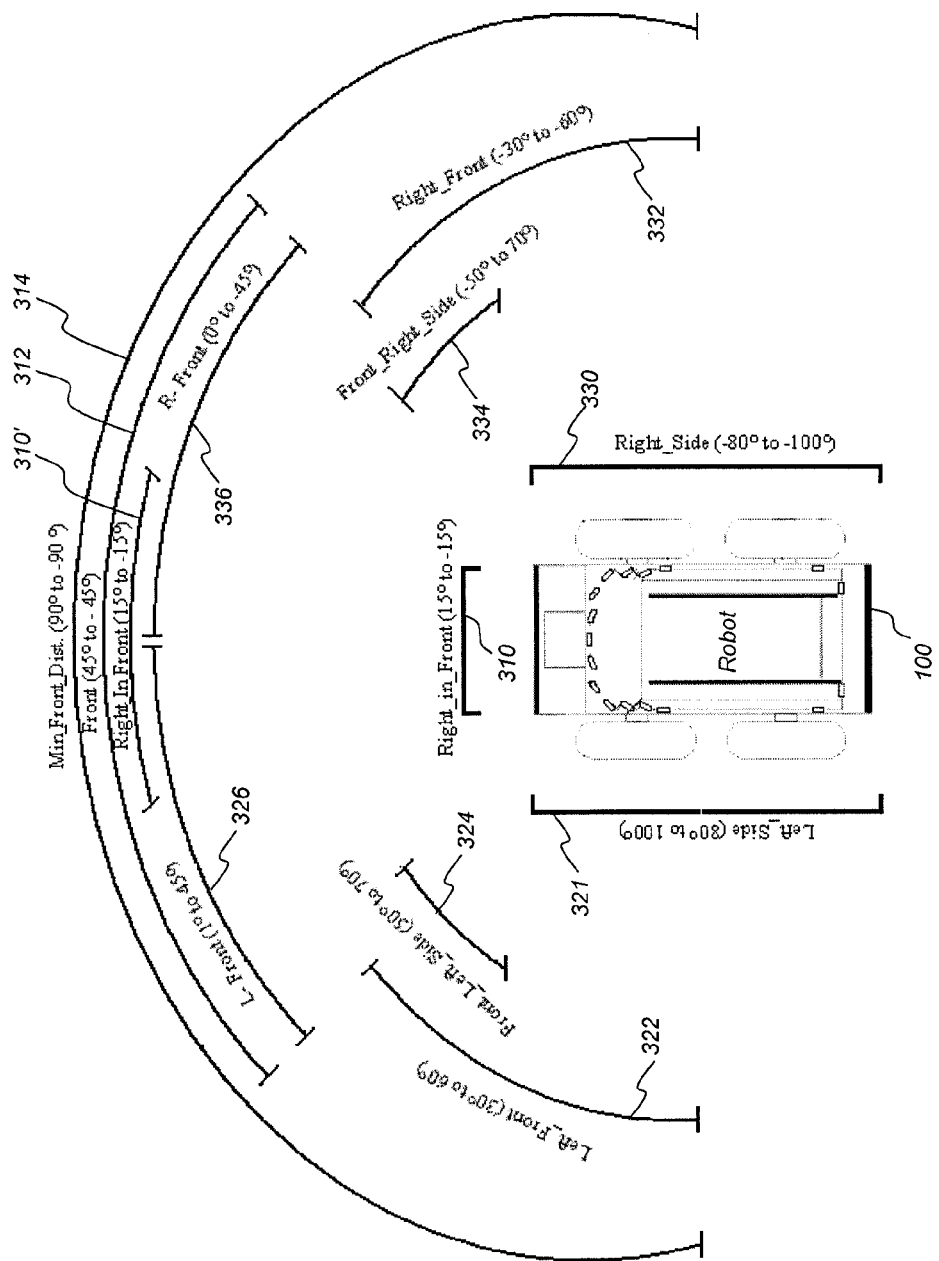
FIG. 6 illustrates a representative embodiment of how a range abstraction may be organized.

In more detail, FIG. 6 illustrates a representative embodiment of how a range abstraction may be organized. A variety of coordinate systems may be in use by the robot and an operator. By way of example, a local coordinate system may be defined by an operator relative to a space of interest (e.g., a building) or a world coordinate system defined by sensors such as a GPS unit, an iGPS unit, a compass, an altimeter, and the like. A robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot's current orientation.

The range measurements for the representative embodiment illustrated in FIG. 6 are organized in a cylindrical coordinate system relative to the robot. The angles may be partitioned into regions covering the front, left, right and back of the robot and given names such as, for example, those used in FIG. 6.

Thus, regions in front may be defined and named as: Right_In_Front (310 and 310'), representing an angle between −15° and 15°;

Front 312, representing an angle between −45° and 45°; and

Min_Front_Dist 314, representing an angle between −90° and 90°.

Similarly, regions to the left side may be defined as:

Left_Side 321, representing an angle between 100° and 80°;

Left_Front 322, representing an angle between 60° and 30';

Front_Left_Side 324, representing an angle between 70° and 50°; and

L_Front 326, representing an angle between 45° and 1°.

For the right side, regions may be defined as:

Right_Side 330, representing an angle between −100° and −80';

Right_Front 332, representing an angle between −60° and −30°;

Front_Right_Side 334, representing an angle between −70° and −50°; and

R_Front 336, representing an angle between −45° and 0°.

While not shown, those of ordinary skill in the art will recognize that with the exception of the Left_Side 321 and Right_Side 330 regions, embodiments may include regions in the back, which are a mirror image of those in the front wherein the "Front" portion of the name is replaced with "Rear."

Furthermore, the range attributes define a range to the closest object within that range. However, the abstraction of regions relative to the robot, as used in the range abstraction may, also be useful for many other robot attributes and robot behaviors that may require directional readings, such as, for example, defining robot position, robot motion, camera positioning, an occupancy grid map, and the like.

In practice, the range attributes may be combined to define a more specific direction. For example, directly forward motion may be defined as a geometrically adjusted combination of Right_In_Front 310, L_Front 326, R_Front 336, Front_Left_Side 324, and Front_Right_Side 334.

2.2.5. Robot Position and Environmental Occupancy Grid Maps

Returning to FIG. 5, the robot abstractions may include position attributes 234. Mobile robots may operate effectively only if they, or their operators, know where they are. Conventional robots may rely on real-time video and global positioning systems (GPS) as well as existing maps and floor plans to determine their location. However, GPS may not be reliable indoors and video images may be obscured by smoke or dust, or break up because of poor communications. Maps and floor plans may not be current and often are not readily available, particularly in the chaotic aftermath of natural, accidental or terrorist events. Consequently, real-world conditions on the ground often make conventional robots that rely on a priori maps ineffective.

Accurate positioning knowledge enables the creation of high-resolution maps and accurate path following, which may be needed for high-level deliberative behavior, such as systematically searching or patrolling an area.

Embodiments of the present invention may utilize various mapping or localization techniques including positioning systems such as indoor GPS, outdoor GPS, differential GPS, theodolite systems, wheel-encoder information, and the like. To make robots more autonomous, embodiments of the present invention may fuse the mapping and localization information to build 3D maps on-the-fly that let robots understand their current position and an estimate of their surroundings. Using existing information, map details may be enhanced as the robot moves through the environment. Ultimately, a complete map containing rooms, hallways, doorways, obstacles and targets may be available for use by the robot and its human operator. These maps also may be shared with other robots or human first responders.

With the on-board mapping and positioning algorithm that accepts input from a variety of range sensors, the robot may make substantially seamless transitions between indoor and outdoor operations without regard for GPS and video dropouts that occur during these transitions. Furthermore, embodiments of the present invention provide enhanced fault tolerance because they do not require off-board computing or reliance on potentially inaccurate or non-existent a priori maps.

Embodiments of the present invention may use localization methods by sampling range readings from scanning lasers and ultrasonic sensors and by reasoning probabilistically about where the robot is within its internal model of the world. The robot localization problem may be divided into two subtasks: global position estimation and local position tracking. Global position estimation is the ability to determine the robot's position in an a priori or previously learned map, given no information other than that the robot is somewhere in the region represented by the map. Once a robot's position has been found in the map, local tracking is the problem of keeping track of the robot's position over time and movement.

The robot's state space may be enhanced by localization methods such as Monte Carlo techniques and Markovian probability grid approaches for position estimation, as are well known by those of ordinary skill in the art. Many of these techniques provide efficient and substantially accurate mobile robot localization.

With a substantially accurate position for the robot determined, local tracking can maintain the robot's position over time and movement using dead-reckoning, additional global positioning estimation, or combinations thereof. Dead-reckoning is a method of navigation by keeping track of how far you have gone in any particular direction. For example, dead reckoning would determine that a robot has moved a distance of about five meters at an angle from the current pose of about 37 degrees if the robot moves four meters forward, turns 90 degrees to the right, and moves forward three meters. Dead-reckoning can lead to navigation errors if the distance traveled in a given direction, or the angle through which a robot turns, is interpreted incorrectly. This can happen, for example, if one or more of the wheels on the robot spin in place when the robot encounters an obstacle.

Therefore, dead reckoning accuracy may be bolstered by sensor information from the environment, new global positioning estimates, or combinations thereof. With some form of a map, the robot can use range measurements to map features to enhance the accuracy of a pose estimate. Furthermore, the accuracy of a pose estimate may be enhanced by new range measurements (e.g., laser scans) into a map that may be growing in size and accuracy. In Simultaneous Localization and Mapping (SLAM), information from the robot's encoders and laser sensors may be represented as a network of probabilistic constraints linking the successive positions (poses) of the robot. The encoders may relate one robot pose to the next via dead-reckoning. To give further constraints between robot poses, the laser scans may be matched with dead-reckoning, including constraints for when a robot returns to a previously visited area.

Figure 7:
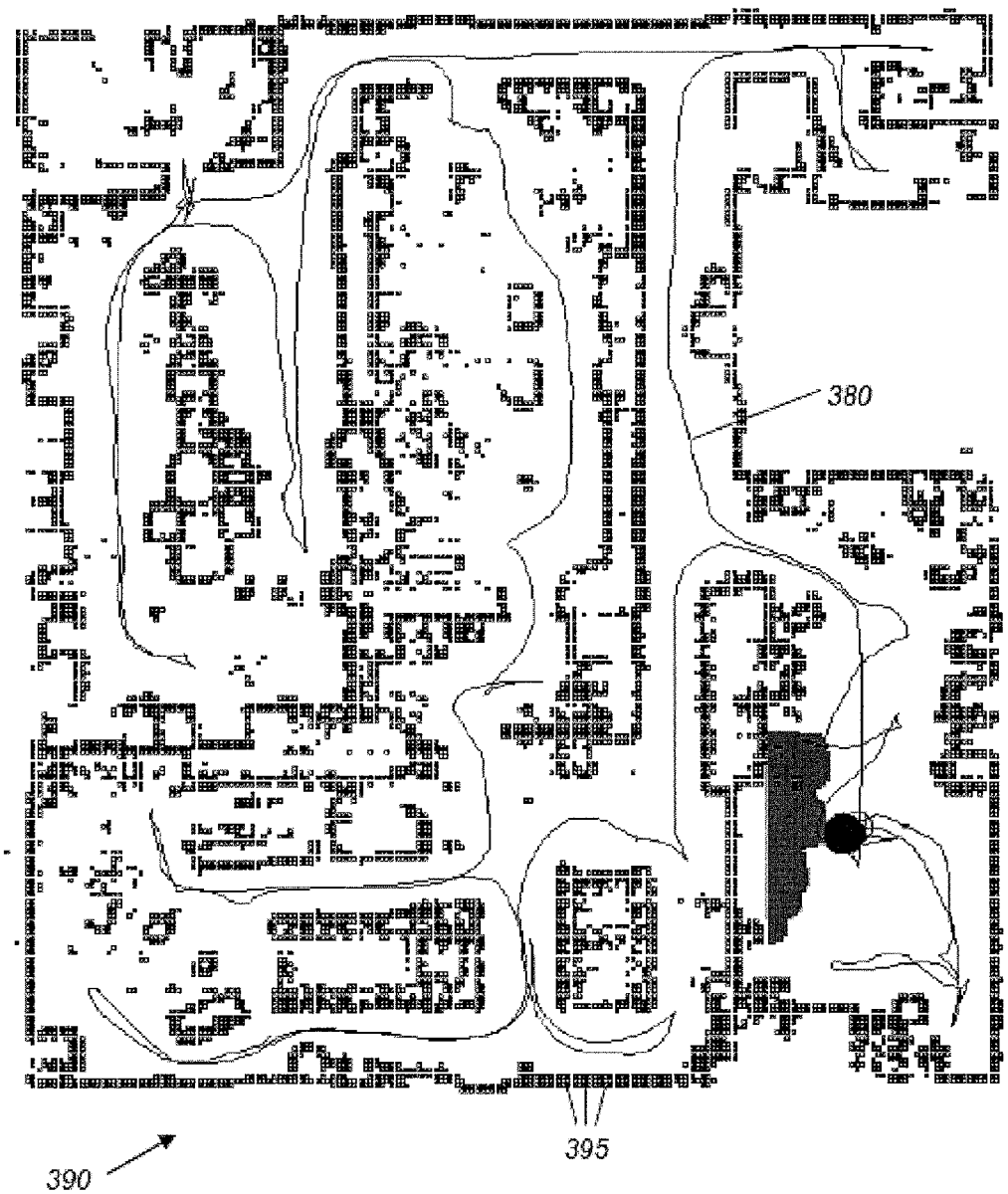
FIG. 7 illustrates an occupancy grid map that may be developed by embodiments of the present invention.

The robot abstractions may include environmental occupancy grid attributes 240. One form of map that may be useful from both the robot's perspective and an operator's perspective is an occupancy grid. An environmental occupancy grid, formed by an occupancy grid abstraction 240 (FIG. 5) is illustrated in FIG. 7. In forming an occupancy grid, a robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot's current orientation. Furthermore, occupancy grids may be translated to other coordinate systems for use by an operator.

An occupancy grid map 390 may be developed by dividing the environment into a discrete grid of occupancy cells 395 and assigning a probability to each grid indicating whether the grid is occupied by an object. Initially, the occupancy grid may be set so that every occupancy cell is set to an initial probability. As the robot scans the environment, range data developed from the scans may be used to update the occupancy grid. For example, based on range data, the robot may detect an object at a specific orientation and range away from the robot. This range data may be converted to a different coordinate system (e.g., local or world Cartesian coordinates). As a result of this detection, the robot may increase the probability that the particular occupancy cell is occupied and decrease the probability that occupancy cells between the robot and the detected object are occupied. As the robot moves through its environment, new horizons may be exposed to the robot's sensors, which enable the occupancy grid to be expanded and enhanced. To enhance map building and localization even further, multiple robots may explore an environment and cooperatively communicate their map information to each other or a robot controller to cooperatively build a map of the area.

The example occupancy grid map 390 as it might be presented to an operator is illustrated in FIG. 7. The grid cells 395 can be seen as small squares on this occupancy grid 390. A robot path 380 is shown to illustrate how the robot may have moved through the environment in constructing the occupancy grid 390. Of course, those of ordinary skill in the art will recognize that, depending on the application and expected environment, the occupancy grid 390 may be defined in any suitable coordinate system and may vary in resolution (i.e., size of each occupancy cell). In addition, the occupancy grid 390 may include a dynamic resolution such that the resolution may start out quite coarse while the robot discovers the environment, then evolve to a finer resolution as the robot becomes more familiar with its surroundings.

3. Robotic Intelligence Kernel

A robot platform 100 may include a robot intelligence kernel (may also be referred to herein as intelligence kernel), which coalesces hardware components for sensing, motion, manipulation, and actions with software components for perception, communication, behavior, and world modeling into a single cognitive behavior kernel that provides intrinsic intelligence for a wide variety of unmanned robot platforms. The intelligence kernel architecture may be configured to support multiple levels of robot autonomy that may be dynamically modified depending on operating conditions and operator wishes.

The robot intelligence kernel (RIK) may be used for developing a variety of intelligent robotic capabilities. By way of example, and not limitation, some of these capabilities including visual pursuit, intruder detection and neutralization, security applications, urban reconnaissance, search and rescue, remote contamination survey, and countermine operations.

Referring back to the software architecture diagram of FIG. 3, the RIK comprises a multi-level abstraction including a robot behavior level 250 and a cognitive level 270. The RIK may also include the robot abstraction level 230 and the hardware abstraction level 210 discussed above.

Above the robot abstraction level 230, the RIK includes the robot behavior level 250, which defines specific complex behaviors that a robot, or a robot operator, may want to accomplish. Each complex robot behavior may utilize a variety of robot attributes, and in some cases a variety of hardware abstractions, to perform the specific robot behavior.

Above the robot behavior level 250, the RIK includes the cognitive level 270, which provides cognitive conduct modules to blend and orchestrate the asynchronous events from the complex robot behaviors and generic robot behaviors into combinations of functions exhibiting cognitive behaviors, wherein high-level decision making may be performed by the robot, the operator, or combinations of the robot and the operator.

Some embodiments of the RIK may include, at the lowest level, the hardware abstraction level 210, which provides for portable, object-oriented access to low-level hardware perception and control modules that may be present on a robot. These hardware abstractions have been discussed above in the discussion of the GRA.

Some embodiments of the RIK may include, above the hardware abstraction level 210, the robot abstraction level 230 including generic robot abstractions, which provide atomic elements (i.e., building blocks) of generic robot attributes and develop a membrane between the low-level hardware abstractions and control based on generic robot functions. Each generic robot abstraction may utilize a variety of hardware abstractions to accomplish its individual function. These generic robot abstractions have been discussed above in the discussion of the GRA.

3.1. Robot Behaviors

While the robot abstraction level 230 focuses on generic robot attributes, higher levels of the RIK may focus on; relatively complex robot behaviors at the robot behavior level 250, or on robot intelligence and operator collaboration at the cognitive level 270.

The robot behavior level 250 includes generic robot classes comprising functionality common to supporting behavior across most robot types. For example, the robot behavior level includes utility functions (e.g., Calculate angle to goal) and data structures that apply across substantially all robot types (e.g., waypoint lists). At the same time, the robot behavior level defines the abstractions to be free from implementation specifics such that the robot behaviors are substantially generic to all robots.

Figure 8:
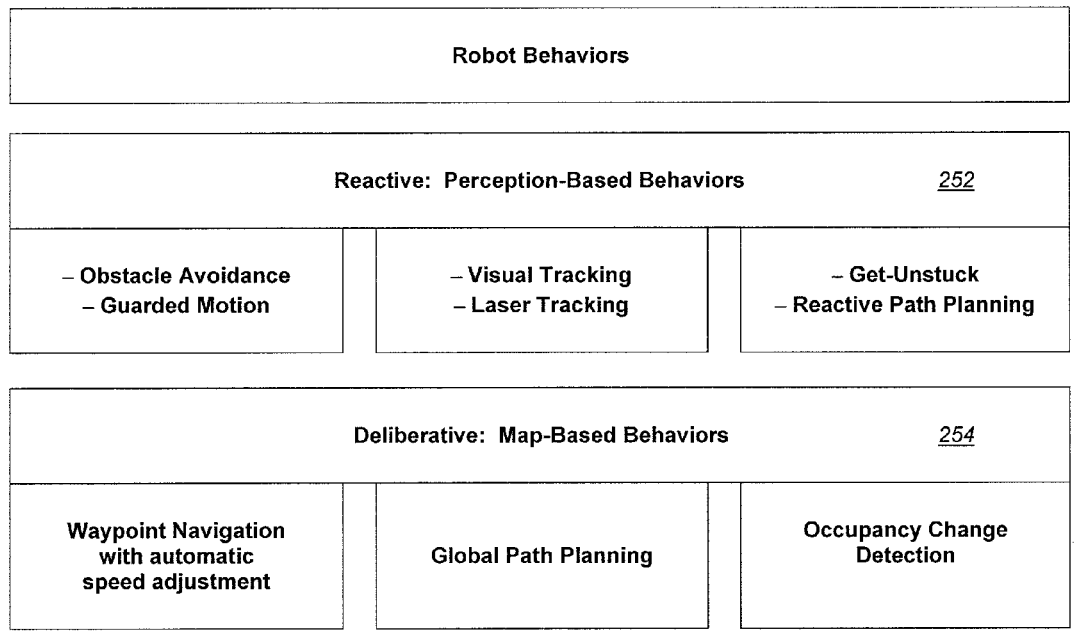
FIG. 8 illustrates representative robot behavioral components that may be available on robot platforms.

The robot behavior level 250, as illustrated in FIG. 8, may be loosely separated into reactive behaviors 252 and deliberative behaviors 254. Of course, it will be readily apparent to those of ordinary skill in the art that the modules shown in FIG. 8 are a representative, rather than comprehensive, example of robot behaviors.

The reactive behaviors 252 may be characterized as behaviors wherein the robot reacts to its perception of the environment based on robot attributes, hardware abstractions, or combinations thereof. Some of these reactive behaviors may include autonomous navigation, obstacle avoidance, guarded motion, visual tracking, laser tracking, get-unstuck behavior, and reactive planning. As examples, and not limitations, details regarding some of these behaviors are discussed in the section below regarding application specific behaviors.

In contrast, deliberative behaviors 254 may be characterized as behaviors wherein the robot may need to make decisions on how to proceed based on the results of the reactive behaviors, information from the robot attributes and hardware abstractions, or combinations thereof. Some of these deliberative behaviors may include waypoint navigation with automatic speed adjustment, global path planning, and occupancy change detection. As examples, and not limitations, details regarding some of these behaviors are discussed in the section below regarding application specific behaviors.

3.2. Cognitive Conduct

The cognitive conduct level 270, as illustrated in FIG. 9, represents the highest level of abstraction, wherein significant robot intelligence may be built in to cognitive conduct modules, as well as significant operator-robot collaboration to perform complex tasks requiring enhanced robot initiative 299. Cognitive conduct modules blend and orchestrate asynchronous firings from the reactive behaviors 252, deliberative behaviors 254, and robot attributes 230 into intelligent robot conduct. Cognitive conduct modules may include conduct such as GoTo 272, wherein the operator may simply give a coordinate for the robot to go to and the robot takes the initiative to plan a path and get to the specified location. This GoTo conduct 272 may include a combination of robot behaviors 250, robot attributes 230, and hardware abstractions 210, such as, for example, obstacle avoidance, get-unstuck, reactive path planning, deliberative path planning, and waypoint navigation.

Another representative cognitive conduct module is human detection and pursuit 274, wherein the robot may react to changes in the environment and pursue those changes. This detection and pursuit conduct 274 may also include pursuit of other objects, such as, for example, another robot. The detection and pursuit 274 conduct may include a combination of robot behaviors 250, robot attributes 230, and hardware abstractions 210, such as, for example, occupancy change detection, laser tracking, visual tracking, deliberative path planning, reactive path planning, and obstacle avoidance.

Other representative cognitive conduct modules include conduct such as exploration and reconnaissance conduct 276 combined with map building, leader/follower conduct 278, and search and identify conduct 280.

Of course, it will be readily apparent to those of ordinary skill in the art that the cognitive conduct modules shown in FIG. 9 are a representative, rather than comprehensive, example of robot conduct that may be implemented using embodiments of the present invention.

3.3. Timing and Behavior Adaptation

A notable aspect of the RIK is that the cognitive conduct modules 270 and robot behaviors 250 generally operate from a perception of speed of motion in relationship to objects and obstacles. In other words, rather than being concerned with spatial horizons and the distance away from an object, the cognitive conduct 270 and robot behaviors 250 are largely concerned with temporal horizons and how soon the robot may encounter an object. This enables defining the cognitive conduct 270 and robot behaviors 250 in a relativistic sense wherein, for example, the modules interpret motion as an event horizon wherein the robot may only be concerned with obstacles inside the event horizon. For example, a robot behavior 250 is not necessarily concerned with an object that is 10 meters away. Rather, the robot behavior 250 may be concerned that it may reach the object in two seconds. Thus, the object may be within the event horizon when the object is 10 meters away and the robot is moving toward it at 5 meters/sec, whereas if the object is 10 meters away and the robot is moving at 2 meters/second, the object may not be within the event horizon.

This relativistic perception enables an adaptation to processing power and current task load. If the robot is very busy, for example processing video, it may need to reduce its frequency of processing each task. In other words, the amount of time to loop through all the cognitive conduct 270 and robot behaviors 250 may increase. However, with the RIK, the cognitive conduct 270 and robot behaviors 250 can adapt to this difference in frequency by modifying its behaviors. For example, if the time through a loop reduces from 200 Hz to 100 Hz, the behaviors and conducts will know about this change in loop frequency and may modify the way it makes a speed adjustment to avoid an object. For example, the robot may need a larger change in its speed of motion to account for the fact that the next opportunity to adjust the speed is twice more distant in the future at 100 Hz than it would be at 200 Hz. This becomes more apparent in the discussion below, regarding the guarded motion behavior.

To enable and control this temporal awareness, the RIK includes a global timing loop in which cognitive conduct 270 and robot behaviors 250 may operate. Using this global timing loop, each module can be made aware of information such as, for example, average time through a loop minimum and maximum time through a loop, and expected delay for next timing tick.

With this temporal awareness, the robot tends to modify its behavior by adjusting its motion, and motion of its manipulators, relative to its surroundings rather than adjusting its position relative to a distance to an object. Of course, with the wide array of perceptors, the robot is still very much aware of its pose and position relative to its environment and can modify its behavior based on this positional awareness. However, with the RIK, the temporal awareness is generally more influential on the cognitive conduct modules and robot behaviors than the positional awareness.

3.4. Dynamic Autonomy

To enhance the operator/robot tradeoff of control, the intelligence kernel provides a dynamic autonomy structure, which is a decomposition of autonomy levels, allowing methods for shared control to permeate all levels of the multi-level abstraction. Furthermore, the intelligence kernel creates an object-oriented software architecture, which may require little or no source code changes when ported to other platforms and low-level proprietary controllers.

The dynamic autonomy structure of the RIK provides a multi-level harmonization between human intervention and robot initiative 299 across robot behaviors. As capabilities and limitations change for both the human and the robot due to workload, operator expertise, communication dropout, and other factors, the RIK architecture enables shifts from one level of autonomy to another. Consequently, the ability of the robot to protect itself, make decisions, and accomplish tasks without human assistance may enable increased operator efficiency.

Figures 10A, 10B:
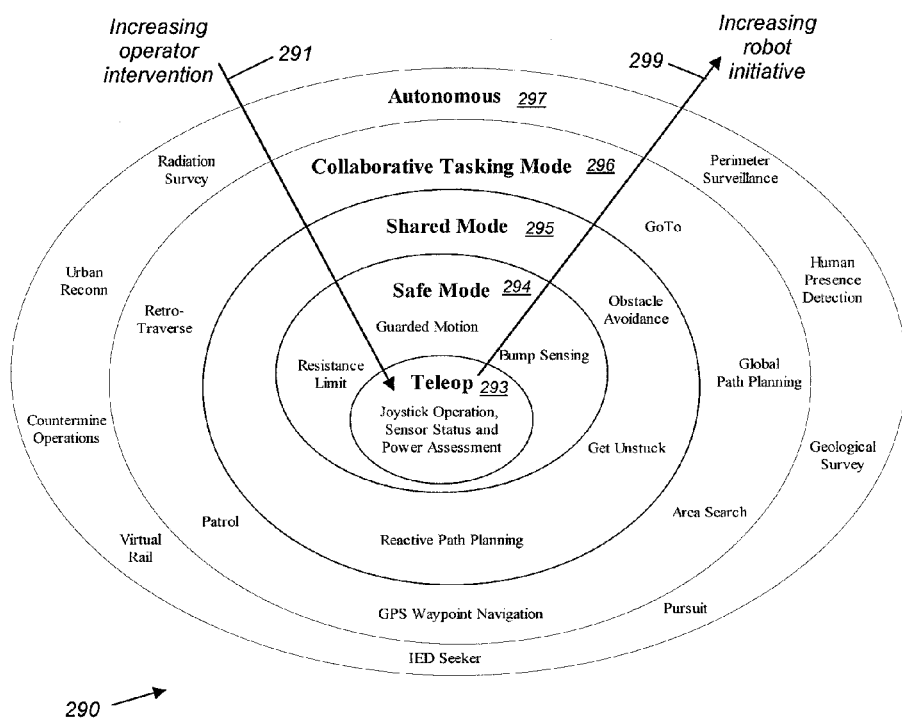
FIG. 10A illustrates how tasks may be allocated between an operator and a robot according to embodiments of the present invention.
FIG. 10B illustrates various cognitive conduct, robot behaviors, robot attributes, and hardware abstractions that may be available at different levels of robot autonomy.

FIGS. 10A and 10B are depictions of a representative embodiment of a dynamic autonomy structure illustrating different levels of interaction between operator intervention 291 and robot initiative 299. As referred to herein operator, or operator intervention 291, may include human operation via a remote computer in communication with the robot, remote operation by some other form of artificial intelligence operating on a remote computer in communication with the robot, or some combination thereof.

At the lowest level, referred to as teleoperation mode 293, the robot may operate completely under remote control and take no initiative to perform operations on its own. At the second level, referred to as safe mode 294, robot movement is dependent on manual control from a remote operator. However, in safe mode 294, the robot may be equipped with a level of initiative that prevents the operator from causing the robot to collide with obstacles. At the third level, referred to as shared mode 295, the robot can relieve the operator from the burden of direct control. For example, the robot may use reactive navigation to find a path based on the robot's perception of the environment. Shared mode 295 provides for a balanced allocation of roles and responsibilities. The robot accepts varying levels of operator intervention 291 and may support dialogue through the use of scripted suggestions (e.g., "Path blocked! Continue left or right?") and other text messages that may appear within a graphical interface. At the fourth level, referred to as collaborative tasking mode 296, a high level of collaborative tasking may be developed between the operator and the robot using a series of high-level tasks such as patrol, search region or follow path. In collaborative tasking mode 296, operator intervention 291 occurs on the tasking level, while the robot manages most decision-making and navigation. At the highest level, referred to as autonomous mode 297, a robot may behave in a substantially autonomous manner, needing nothing more than being enabled by an operator and perhaps given a very high-level command such as, for example, survey the area, or search for humans.

FIG. 10A illustrates a representative embodiment of how tasks may be allocated between the operator and the robot. For example, teleoperation mode 293 may be configured such that the operator defines tasks, supervises direction, motivates motion, and prevents collision, in such a way that the robot takes no initiative and the operator maintains control. In safe mode 294, the operator may still define tasks, supervise direction, and motivate motion, while allowing the robot to take the initiative to prevent collisions. In shared mode 295, the operator may still define tasks and supervise direction, while allowing the robot to motivate motion and prevent collisions. In collaborative tasking mode 296, the robot may possess the initiative to prevent collisions, motivate motion, and supervise direction, while relinquishing operator intervention 291 to define task goals. In autonomous mode 297, the robot's initiative may prevent collisions, motivate motion, supervise direction, and define task goals. Of course, those of ordinary skill in the art will recognize that this allocation of tasks between the operator and the robot is a representative allocation. Many other tasks and behaviors, and allocation of those tasks and behaviors, are contemplated within the scope of the present invention.

FIG. 10B illustrates various cognitive conduct, robot behaviors, robot attributes, and hardware abstractions that may be available at different levels of robot autonomy. In general, moving from the teleoperation mode 293 toward the autonomous mode 297 represents an increase in the amount of robot initiative 299 and a decrease in the amount of operator intervention 291. Conversely, moving from the autonomous mode 297 toward the teleoperation mode 293 represents a decrease in the amount of robot initiative 299 and an increase in the amount of operator intervention 291. Of course, those of ordinary skill in the art will recognize that FIG. 10B is a representative sample of available conduct, behaviors, attributes, and hardware, as well as a representative allocation between autonomy levels. The RIK is configured such that many modules may operate across different levels of autonomy by modifying the amount of operator intervention 291, modifying the amount of robot initiative 299, or combinations thereof.

The autonomy levels are structured in the intelligence kernel such that each new level of autonomy is built on, and encompasses, the subsequent level. For example, a guarded motion mode processing (explained more fully below) may include the behavior and representational framework utilized by the teleoperation mode 293 processing, but also include additional levels of robot initiative 299 based on the various robot attributes (e.g., related to directional motion) created in response to the teleoperation mode 293. Shared mode 295 may include all of the functionality and direct control of safe mode 294, but also allows robot initiative 299 in response to the abstractions produced through the guarded motion mode processing (e.g., fused range abstractions created in response to the direction motion abstractions). In addition, the collaborative tasking mode 296 may initiate robot responses to the abstractions created in shared mode 295 processing such as recognition that a box canyon has been entered or that a communication link has been lost.

For a robotic system to gracefully accept a full spectrum of intervention possibilities, interaction issues cannot be handled merely as augmentations to a control system. Therefore, opportunities for operator intervention 291 and robot initiative 299 are incorporated as an integral part of the robot's intrinsic intelligence. Moreover, for autonomous capabilities to evolve, the RIK is configured such that a robot is able to recognize when help is needed from an operator, other robot, or combinations thereof and learn from these interactions.

As an example, in one representative embodiment, the robot includes a Sony CCD camera that can pan, tilt and zoom to provide visual feedback to the operator in the teleoperation mode 293. The robot may also use this camera with increased robot initiative 299 to characterize the environment and even conduct object tracking.

In this embodiment, the RIK provides a graduated process for the robot to protect itself and the environment. To do so, the RIK may fuse a variety of range sensor information. A laser range finder may be mounted on the front, and sonar perceptors may be located around the mid-section of the robot. The robot also may include highly sensitive bump strips around its perimeter that register whether anything has been touched. To protect the top of the robot, especially the cameras and mission-specific sensors placed on top of the robot, infrared proximity sensors may be included to indicate when an object is less than a few inches from the robot. Additional infrared proximity sensors may be placed on the bottom of the robot and point ahead of the robot toward the ground in order to prevent the robot from traveling into open space (e.g., traveling off of a landing down a stairway). Together, these sensors provide a substantial field of protection around the robot and allow the operator to command the robot with increased confidence that the robot can take initiative to protect itself or its environment.

However, avoiding obstacles may be insufficient. Many adverse environments may include forms of uneven terrain, such as rubble. The robot should be able to recognize and respond to these obstacles. Inertial sensors may be used to provide acceleration data in three dimensions. This inertial information may be fused with information from the wheel encoders giving velocity and acceleration of the wheels, and electrical current draw from the batteries, to produce a measure of "unexpected" resistance that may be encountered by the robot. As part of the dynamic autonomy, the operator may be able to choose to set a resistance limit that will automatically stop the robot once the specified threshold has been exceeded. The resistance limit may be useful not only for rough terrain, but also in situations when the operator needs to override the "safe motion" capabilities (based on the obstacle avoidance sensors) to do things like push chairs and boxes out of the way and push doors open.

In addition, the RIK enables operators to collaborate with mobile robots, by defining an appropriate level of discourse, including a shared vocabulary and a shared cognitive workspace collaboratively constructed and updated on-the-fly through interaction with the real world. This cognitive workspace could consist of terrain overlaid with semantic abstractions generated through autonomous recognition of environmental features with point-and-click operator validation and iconographic insertion of map entities. Real-time semantic maps constructed collaboratively by humans, ground robots and air vehicles could serve as the basis for a spectrum of mutual human-robot interactions including tasking, situation awareness, human-assisted perception and collaborative environmental "understanding." Thus, the RIK enables human-robot communication within the context of a mission based on shared semantic maps between the robotic system and the operator.

With reference to FIGS. 10A and 10B, additional details of the dynamic autonomy structure 290 and corresponding operation modes can be discussed.

3.4.1. Teleoperation Mode

In teleoperation mode 293, the operator has full, continuous control of the robot at a low level. The robot takes little or no initiative except, for example, to stop after a specified time if it recognizes that communications have failed. Because the robot takes little or no initiative in this mode, the dynamic autonomy implementation provides appropriate situation awareness to the operator using perceptual data fused from many different sensors. For example, a tilt sensor may provide data on whether the robot is in danger of overturning. Inertial effects and abnormal torque on the wheels (i.e., forces not associated with acceleration) are fused to produce a measure of resistance as when, for example, the robot is climbing over or pushing against an obstacle. Even in teleoperation mode 293, the operator may be able to choose to activate a resistance limit that permits the robot to respond to high resistance and bump sensors. Also, a specialized interface may provide the operator with abstracted auditory, graphical and textual representations of the environment and task.

Some representative behaviors and attributes that may be defined for teleoperation mode 293 include joystick operation, perceptor status, power assessment, and system status.

3.4.2. Safe Mode

In safe mode 294, the operator directs movements of the robot, but the robot takes initiative to protect itself. In doing so, this mode frees the operator to issue motion commands with less regard to protecting the robot, greatly accelerating the speed and confidence with which the operator can accomplish remote tasks. The robot may assess its own status and surrounding environment to decide whether commands are safe. For example, the robot possesses a substantial self-awareness of its position and will attempt to stop its motion before a collision, placing minimal limits on the operator. In addition, the robot may be configured to notify the operator of environmental features (e.g., box canyon, corner, and hallway), immediate obstacles, tilt, resistance, etc., and also continuously assesses the validity of its diverse sensor readings and communication capabilities. In safe mode 294, the robot may be configured to refuse to undertake a task if it does not have the ability (i.e., sufficient power or perceptual resources) to safely accomplish it.

Some representative behaviors and attributes that may be defined for safe mode 294 include guarded motion, resistance limits, and bump sensing.

3.4.3. Shared Mode

In shared mode 295, the robot may take the initiative to choose its own path, responds autonomously to the environment, and work to accomplish local objectives. This initiative is primarily reactive rather than deliberative. In terms of navigation, shared mode 295 may be configured such that the robot responds only to its local (e.g., a two second event horizon or a six meter radius), sensed environment. Although the robot may handle the low-level navigation and obstacle avoidance, the operator may supply intermittent input, often at the robot's request, to guide the robot in general directions. For example, a "Get Unstuck" behavior enables the robot to autonomously extricate itself from highly cluttered areas that may be difficult for a remote operator to handle.

Some representative behaviors and attributes that may be defined for shared mode 295 include reactive planning, get unstuck behavior, and obstacle avoidance.

3.4.4. Collaborative Tasking Mode

In collaborative tasking mode 296, the robot may perform tasks such as, for example, global path planning to select its own route, requiring no operator input except high-level tasking such as "follow that target" or "search this area" (perhaps specified by drawing a circle around a given area on the map created by the robot). For all these levels, the intelligence resides on the robot itself, such that off-board processing is unnecessary. To permit deployment within shielded structures, a customized communication protocol enables very low bandwidth communications to pass over a serial radio link only when needed. The system may use multiple and separate communications channels with the ability to reroute data when one or more connection is lost.

Some representative cognitive conduct and robot behaviors, and robot attributes that may be defined for collaborative tasking mode 296 include waypoint navigation, global path planning, go to behavior, retro-traverse behavior, area search behavior, and environment patrol.

3.4.5. Autonomous Mode

In autonomous mode 297, the robot may perform with minimal to no operator intervention 291. For behaviors in autonomous mode 297, the operator may simply give a command for the robot to perform. Other than reporting status to the operator, the robot may be free to plan paths, prioritize tasks, and carry out the command using deliberative behaviors defined by the robot's initiative.

Some representative behaviors and attributes that may be defined for autonomous mode 297 include pursuit behaviors, perimeter surveillance, urban reconnaissance, human presence detection, geological surveys, radiation surveys, virtual rail behavior, countermine operations, and seeking improvised explosive devices.

3.5. RIK Examples and Communication

Conventionally, robots have been designed as extensions of human mobility and senses. Most seek to keep the human in substantially complete control, allowing the operator, through input from video cameras and other on-board sensors, to guide the robot and view remote locations. In this conventional "master-slave" relationship, the operator provides the intelligence and the robot is a mere mobile platform to extend the operator's senses. The object is for the operator, perched as it were on the robot's back, to complete some desired tasks. As a result, conventional robot architectures may be limited by the need to maintain continuous, high-bandwidth communications links with their operators to supply clear, real-time video images and receive instructions. Operators may find it difficult to visually navigate when conditions are smoky, dusty, poorly lit, completely dark or full of obstacles and when communications are lost because of distance or obstructions.

The Robot Intelligence Kernel enables a modification to the way humans and robots interact, from master-slave to a collaborative relationship in which the robot can assume varying degrees of autonomy. As the robot initiative 299 increases, the operator can turn his or her attention to the crucial tasks at hand (e.g., locating victims, hazards, dangerous materials; following suspects; measuring radiation and/or contaminant levels) without worrying about moment-to-moment navigation decisions or communications gaps.

The RIK places the intelligence required for high levels of autonomy within the robot. Unlike conventional designs, off-board processing is not necessary. Furthermore, the RIK includes low bandwidth communication protocols and can adapt to changing connectivity and bandwidth capabilities. By reducing or eliminating the need for high-bandwidth video feeds, the robot's real-world sensor information can be sent as compact data packets over low-bandwidth (<1 Kbs) communication links such as, for example, cell phone modems and long-range radio. The robot controller may then use these low bandwidth data packets to create a comprehensive graphical interface, similar to a computer game display, for monitoring and controlling the robot. Due to the low bandwidth needs enabled by the dynamic autonomy structure of the RIK, it may be possible to maintain communications between the robot and the operator over many miles and through thick concrete, canopy and even the ground itself.

Figure 11:
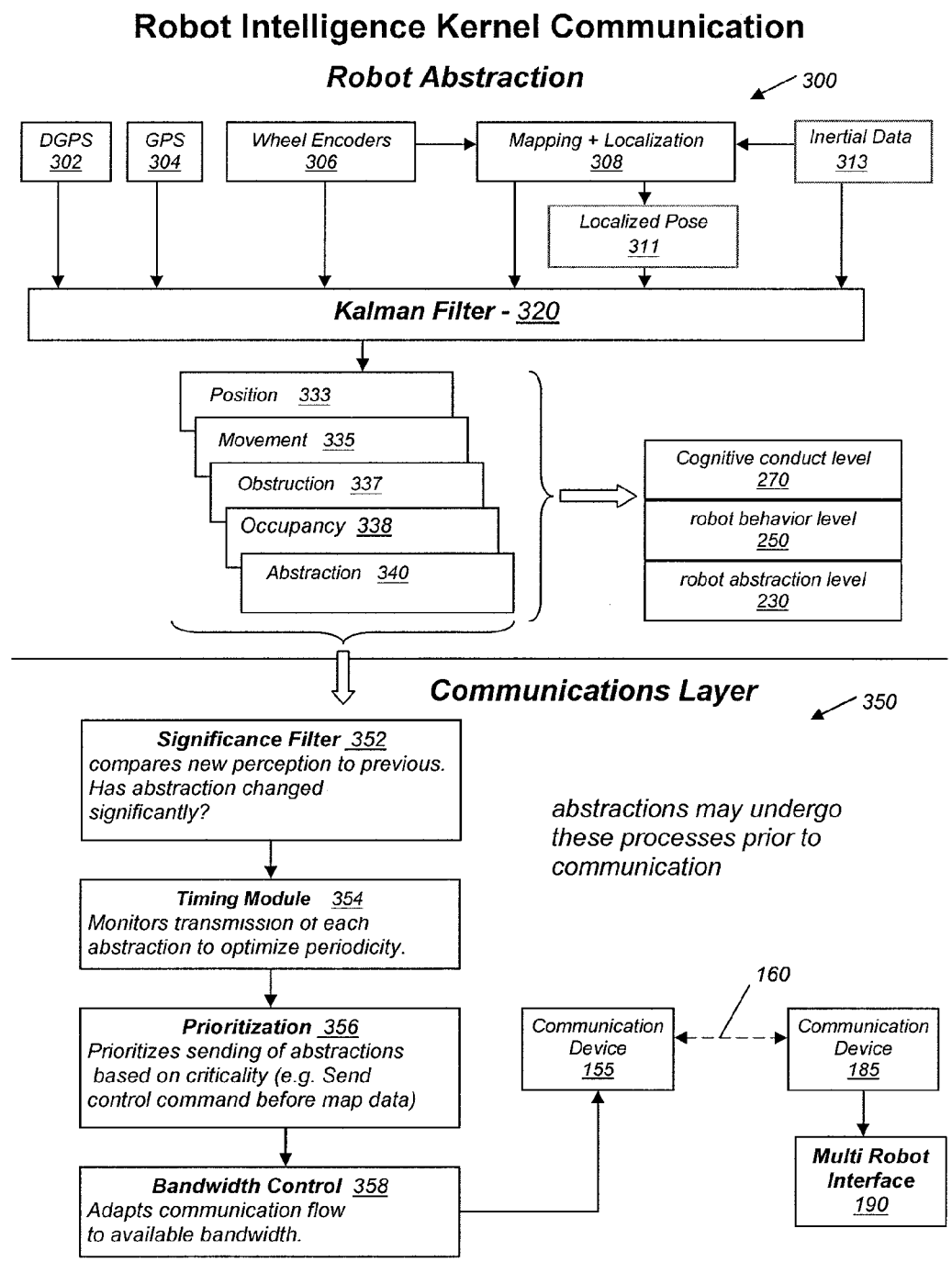
FIG. 11 illustrates a portion of representative processing that may occur in developing robot attributes and communicating those attributes.

FIG. 11 illustrates a representative embodiment of the RIK processing of robot abstractions 300 and communications operations 350 for communicating information about cognitive conduct, robot behaviors, robot attributes, and hardware abstractions to the robot controller or other robots. The upper portion 300 of FIG. 11 illustrates the robot abstractions, and hardware abstractions that may be fused to develop robot attributes. In the embodiment of FIG. 11, a differential GPS 302, a GPS 304, wheel encoders 306 and inertial data 313 comprise hardware abstractions that may be processed by a Kalman filter 320. The robot attributes for mapping and localization 308 and localized pose 311 may be developed by including information from, among other things, the wheel encoders 306 and inertial data 313. Furthermore, the localized pose 311 may be a function of the results from mapping and localization 308. As with the hardware abstractions, these robot attributes of mapping and localization 308 and localized pose 310 may be processed by a Kalman filter 320.

Kalman filters 320 are efficient recursive filters that can estimate the state of a dynamic system from a series of incomplete and noisy measurements. By way of example, and not limitation, many of the perceptors used in the RIK include an emitter/sensor combination, such as, for example, an acoustic emitter and a microphone array as a sensor. These perceptors may exhibit different measurement characteristics depending on the relative pose of the emitter and target and how they interact with the environment. In addition, to one degree or another, the sensors may include noise characteristics relative to the measured values. In robotic applications, Kalman filters 320 may be used in many applications for improving the information available from perceptors. As one example of many applications, when tracking a target, information about the location, speed, and acceleration of the target may include significant corruption due to noise at any given instant of time. However, in dynamic systems that include movement, a Kalman filter 320 may exploit the dynamics of the target, which govern its time progression, to remove the effects of the noise and get a substantially accurate estimate of the target's dynamics. Thus, a Kalman filter 320 can use filtering to assist in estimating the target's location at the present time, as well as prediction to estimate a target's location at a future time.

As a result of the Kalman filtering, or after being processed by the Kalman filter 320, information from the hardware abstractions and robot attributes may be combined to develop other robot attributes. As examples, the robot attributes illustrated in FIG. 11 include position 333, movement 335, obstruction 337, occupancy 338, and other abstractions 340.

With the robot attributes developed, information from these robot attributes may be available for other modules within the RIK at the cognitive level 270, the robot behavior level 250, and the robot abstraction level 230.

In addition, information from these robot attributes may be processed by the RIK and communicated to the robot controller or other robots, as illustrated by the lower portion of FIG. 11. Processing information from the robot conduct, behavior, and attributes, as well as information from hardware abstractions serves to reduce the required bandwidth and latency such that the proper information may be communicated quickly and concisely. Processing steps performed by the RIK may include a significance filter 352, a timing module 354, prioritization 356, and bandwidth control 358.

The significance filter 352 may be used as a temporal filter to compare a time varying data stream from a given RIK module. By comparing current data to previous data, the current data may not need to be sent at all or may be compressed using conventional data compression techniques such as, for example, run length encoding and Huffman encoding. Another example would be imaging data, which may use data compression algorithms such as Joint Photographic Experts Group (JPEG) compression and Moving Picture Experts Group (MPEG) compression to significantly reduce the needed bandwidth to communicate the information.

The timing module 354 may be used to monitor information from each RIK module to optimize the periodicity at which it may be needed. Some information may require periodic updates at a faster rate than others. In other words, timing modulation may be used to customize the periodicity of transmissions of different types of information based on how important it may be to receive high frequency updates for that information. For example, it may be more important to notify an operator, or other robot, of the robot's position more often than it would be to update the occupancy grid map 390, as shown in FIG. 7.

The prioritization 356 operation may be used to determine which information to send ahead of other information based on how important it may be to minimize latency from when data is available to when it is received by an operator or another robot. For example, it may be more important to reduce latency on control commands and control queries relative to map data. As another example, in some cognitive conduct modules where there may be significant collaboration between the robot and an operator, or in teleoperation mode where the operator is in control, it may be important to minimize the latency of video information so that the operator does not perceive a significant time delay between what the robot is perceiving and when it is presented to the operator.

These examples illustrate that for prioritization 356, as well as the significance filter 352, the timing modulation 354, and the bandwidth control 358, communication may be task dependent and autonomy mode dependent. As a result, information that may be a high priority in one autonomy mode may receive a lower priority in another autonomy mode.

The bandwidth control operation may be used to limit bandwidth based on the communication channel's bandwidth and how much of that bandwidth may be allocated to the robot. An example here might include progressive JPEG wherein a less detailed (i.e., coarser) version of an image may be transmitted if limited bandwidth is available. For video, an example may be to transmit at a lower frame rate.

After the communication processing is complete, the resultant information may be communicated to, or from, the robot controller, or another robot. For example, the information may be sent from the robot's communication device 155, across the communication link 160, to a communication device 185 on a robot controller, which includes a multi-robot interface 190.

Figure 12:
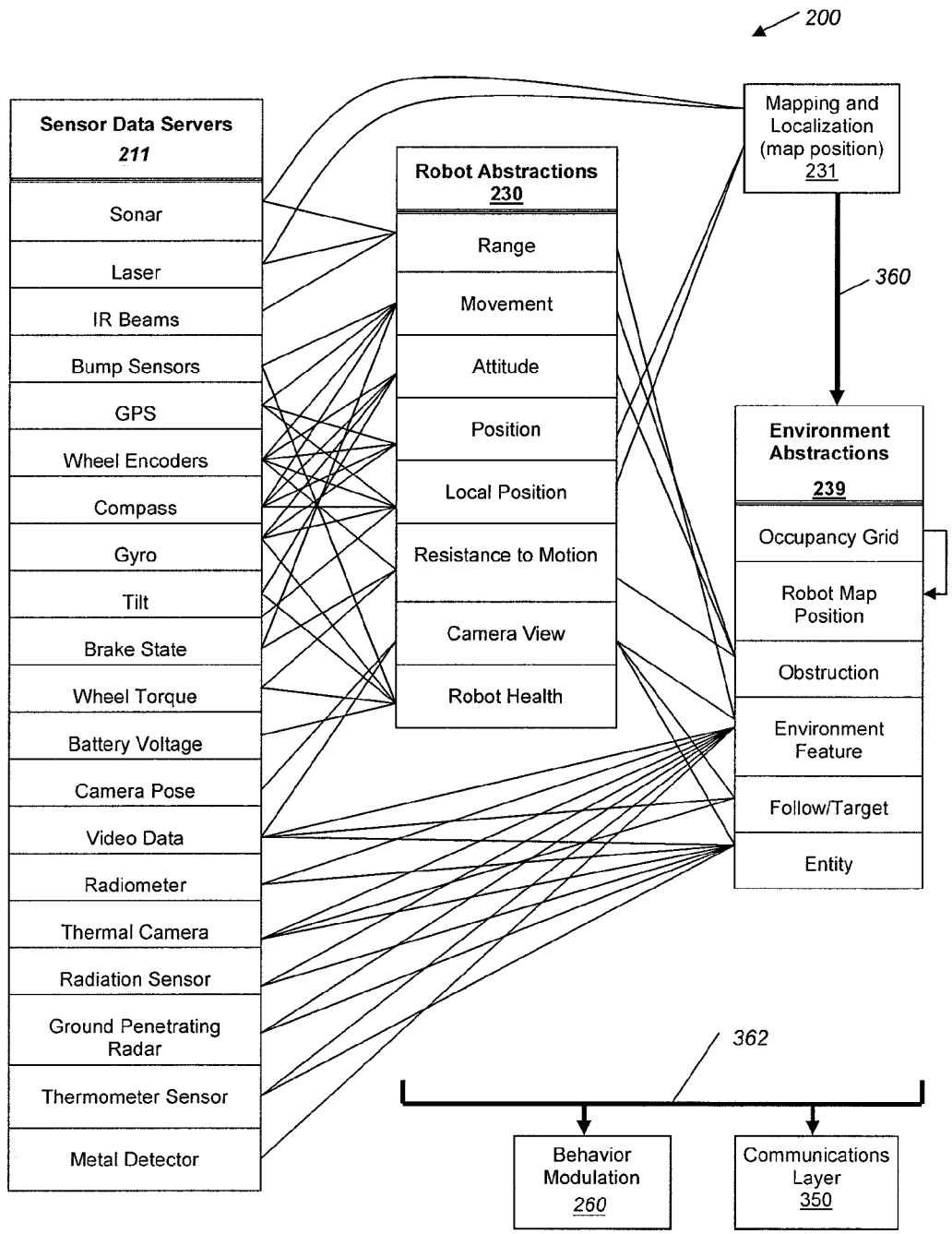
FIG. 12 illustrates a representative example of communication paths between various hardware abstraction, robot abstraction, and environment abstractions.
Figure 13:
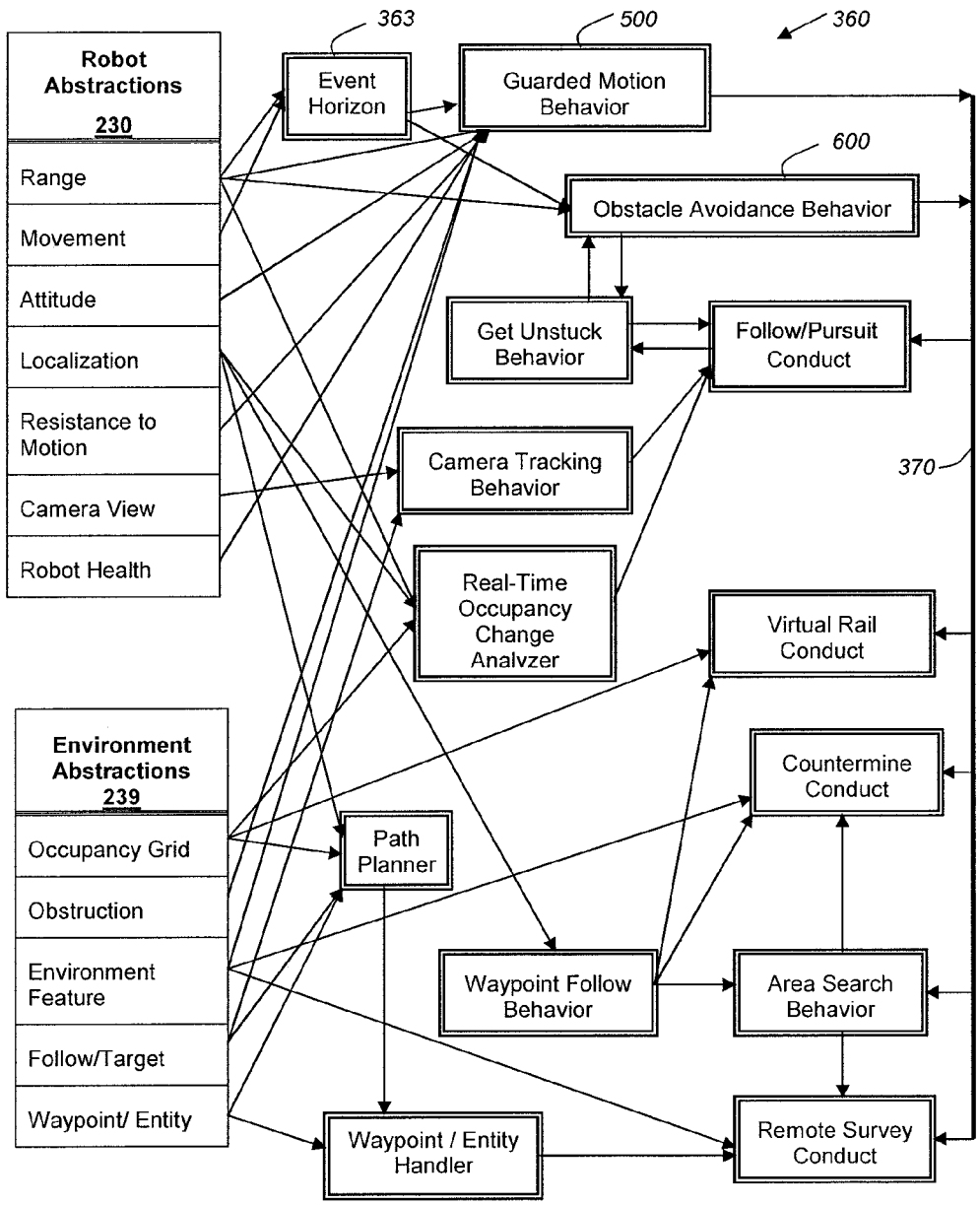
FIG. 13 illustrates a representative example of communication paths between robot abstractions, environment abstractions, robot behaviors, and robot conduct.

FIGS. 12 and 13 illustrate a more general interaction between hardware abstractions, robot abstractions, environment abstractions, robot behaviors, and robot conduct. FIG. 12 illustrates a diagram 200 of general communication between the hardware abstractions associated with sensor data servers 211 (also referred to as hardware abstractions), the robot abstractions 230 (also referred to as robot attributes), and environment abstractions 239. Those of ordinary skill in the art will recognize that FIG. 12 is intended to show general interactions between abstractions in a representative embodiment and is not intended to show every interaction possible within the GRA and RIK. Furthermore, it is not necessary to discuss every line between every module. Some example interactions are discussed to show general issues involved and describe some items from FIG. 12 that may not be readily apparent from simply examining the drawing. Generally, the robot abstractions 230 may receive and fuse information from a variety of sensor data servers 211. For example, in forming a general abstraction about the robot's current movement attributes, the movement abstraction may include information from bump sensors, GPS sensors, wheel encoders, compass sensors, gyroscopic sensors, tilt sensors, and the current brake state.

Some robot attributes 230, such as the mapping and localization attribute 231 may use information from a variety of hardware abstractions 210 as well as other robot attributes 230. The mapping and localization attribute 231 may use sonar and laser information from hardware abstractions 210 together with position information and local position information to assist in defining maps of the environment, and the position of the robot on those maps. Line 360 is bold to indicate that the mapping and localization attribute 231 may be used by any or all of the environment abstractions 239. For example, the occupancy grid abstraction uses information from the mapping and localization attribute 231 to build an occupancy grid as is explained, among other places, above with respect to FIG. 7. Additionally, the robot map position attribute may use the mapping and localization attribute 231 and the occupancy grid attribute to determine the robot's current position within the occupancy grid.

Bold line 362 indicates that any or all of the robot abstractions 230 and environment abstractions 239 may be used at higher levels of the RIK such as the communications layer 350, explained above with respect to FIG. 11, and the behavior modulation 260, explained below with respect to FIG. 13.

FIG. 13 illustrates general communication between the robot abstractions 230 and environment abstractions 239 with higher level robot behaviors and cognitive conduct. As with FIG. 12, those of ordinary skill in the art will recognize that FIG. 13 is intended to show general interactions between abstractions, behaviors, and conduct in a representative embodiment and is not intended to show every interaction possible within the GRA and RIK. Furthermore, it is not necessary to discuss every line between every module. Some example interactions are discussed to show general issues involved and describe some items from FIG. 13 that may not be readily apparent from simply examining the drawing.

As an example, the event horizon attribute 363 may utilize and fuse information from robot abstractions 230 such as range and movement. Information from the event horizon attribute 363 may be used by behaviors, such as, for example, the guarded motion behavior 500 and the obstacle avoidance behavior 600. Bold line 370 illustrates that the guarded motion behavior 500 and the obstacle avoidance behavior 600 may be used by a variety of other robot behaviors and cognitive conduct, such as, for example, follow/pursuit conduct, virtual rail conduct, countermine conduct, area search behavior, and remote survey conduct.

4. Representative Behaviors and Conduct

The descriptions in this section illustrate representative embodiments of robot behaviors and cognitive conduct that may be included in embodiments of the present invention. Of course, those of ordinary skill in the art will recognize these robot behaviors and cognitive conduct are illustrative embodiments and are not intended to be a complete list or complete description of the robot behaviors and cognitive conduct that may be implemented in embodiments of the present invention.

In general, in the flow diagrams illustrated herein, T indicates an angular velocity of either the robot or a manipulator and V indicates a linear velocity. Also, generally, T and V are indicated as a percentage of a predetermined maximum. Thus V=20% indicates 20% of the presently specified maximum velocity (which may be modified depending on the situation) of the robot or manipulator. Similarly, T=20% indicates 20% of the presently specified maximum angular velocity of the robot or manipulator. It will be understood that the presently specified maximums may be modified over time depending on the situations encountered. In addition, those of ordinary skill in the art will recognize that the values of linear and angular velocities used for the robot behaviors and cognitive conduct described herein are representative of a specific embodiment. While this specific embodiment may be useful in a wide variety of robot platform configurations, other linear and angular velocities are contemplated within the scope of the present invention.

Furthermore, those of ordinary skill in the art will recognize that the use of velocities, rather than absolute directions, is enabled largely by the temporal awareness of the robot behaviors and cognitive conduct in combination with the global timing loop. This gives the robot behaviors and cognitive conduct an opportunity to adjust velocities on each timing loop, enabling smoother accelerations and decelerations. Furthermore, the temporal awareness creates a behavior of constantly moving toward a target in a relative sense, rather than attempting to move toward an absolute spatial point.

4.1. Autonomous Navigation

Autonomous navigation may be a significant component for many mobile autonomous robot applications. Using autonomous navigation, a robot may effectively handle the task of traversing varied terrain while responding to positive and negative obstacles, uneven terrain, and other hazards. Embodiments of the present invention enable the basic intelligence necessary to allow a broad range of robotic vehicles to navigate effectively both indoors and outdoors.

Many proposed autonomous navigation systems simply provide GPS waypoint navigation. However, GPS can be jammed and may be unavailable indoors or under forest canopy. A more autonomous navigation system includes the intrinsic intelligence to handle navigation even when external assistance (including GPS and communications) has been lost. Embodiments of the present invention include a portable, domain-general autonomous navigation system, which blends the responsiveness of reactive, sensor based control with the cognitive approach found through waypoint following and path planning. Through its use of the perceptual abstractions within the robot attributes of the GRA, the autonomous navigation system can be used with a diverse range of available sensors (e.g., range, inertial, attitude, bump) and available positioning systems (e.g., GPS, laser, RF, etc.).

The autonomous navigation capability may scale automatically to different operational speeds, may be configured easily for different perceptor suites and may be easily parameterized to be portable across different robot geometries and locomotion devices. Two notable aspects of autonomous navigation are a guarded motion behavior wherein the robot may gracefully adjust its speed and direction near obstacles without needing to come to a full stop and an obstacle avoidance behavior wherein the robot may successfully navigate around known obstacles in its environment. Guarded motion and obstacle avoidance may work in synergy to create an autonomous navigation capability that adapts to the robot's currently perceived environment. Moreover, the behavior structure that governs autonomous navigation allows the entire assembly of behaviors to be used not only for obstacles but for other aspects of the environment which require careful maneuvering such as landmine detection.

The robot's obstacle avoidance and navigation behaviors are derived from a number of robot attributes that enable the robot to avoid collisions and find paths through dense obstacles. The reactive behaviors may be configured as nested decision trees comprising rules which "fire" based on combinations of these perceptual abstractions.

The first level of behaviors, which may be referred to as action primitives, provide the basic capabilities important to most robot activity. The behavior framework enables these primitives to be coupled and orchestrated to produce more complex navigational behaviors. In other words, combining action primitives may involve switching from one behavior to another, subsuming the outputs of another behavior or layering multiple behaviors. For example, when encountering a dense field of obstacles that constrain motion in several directions, the standard confluence of obstacle avoidance behaviors may give way to the high-level navigational behavior "Get-Unstuck," as is explained more fully below. This behavior involves rules which, when activated in response to combinations of perceptual abstractions, switch between several lower level behaviors including "Turn-till-head-is-clear" and "Backout."

4.1.1. Guarded Motion Behavior

FIG. 14 is a software flow diagram illustrating components of an algorithm for the guarded motion behavior 500 according to embodiments of the present invention. Guarded motion may fuse information from a variety of robot attributes and hardware abstractions, such as, for example, motion attributes, range attributes, and bump abstractions. The guarded motion behavior 500 uses these attributes and abstractions in each direction (i.e., front, left, right, and back) around the robot to determine the distance to obstacles in all directions around the robot.

The need for guarded motion has been well documented in the literature regarding unmanned ground vehicles. A goal of guarded motion is for the robot to be able to drive at high speeds, either in response to the operator or software directed control through one of the other robot behaviors or cognitive conduct modules, while maintaining a safe distance between the vehicle and obstacles in its path. The conventional approach usually involves calculating this safe distance as a product of the robot's speed. However, this means that the deceleration and the distance from the obstacle at which the robot will actually stop may vary based on the low-level controller responsiveness of the low-level locomotor controls and the physical attributes of the robot itself (e.g., wheels, weight, etc.). This variation in stopping speed and distance may contribute to confusion on the part of the operator who may perceive inconsistency in the behavior of the robot.

The guarded motion behavior according to embodiments of the present invention enables the robot to come to a stop at a substantially precise, specified distance from an obstacle regardless of the robot's initial speed, its physical characteristics, and the responsiveness of the low-level locomotor control schema. As a result, the robot can take initiative to avoid collisions in a safe and consistent manner.

In general, the guarded motion behavior uses range sensing (e.g., from laser, sonar, infrared, or combinations thereof) of nearby obstacles to scale down its speed using an event horizon calculation. The event horizon determines the maximum speed the robot can safely travel and still come to a stop, if needed, at a specified distance from the obstacle. By scaling down the speed by many small increments, perhaps hundreds of times per second, it is possible to ensure that regardless of the commanded translational or rotational velocity, guarded motion will stop the robot at substantially the same distance from an obstacle. As an example, if the robot is being driven near an obstacle rather than directly towards it, guarded motion will not stop the robot, but may slow its speed according to the event horizon calculation. This improves the operator's ability to traverse cluttered areas and limits the potential for operators to be frustrated by robot initiative.

The guarded motion algorithm is generally described for one direction, however, in actuality it is executed for each direction. In addition, it should be emphasized that the process shown in FIG. 14 operates within the RIK framework of the global timing loop. Therefore, the guarded motion behavior 500 is re-entered, and executes again, for each timing loop.

To begin, decision block 510 determines if guarded motion is enabled. If not, control transitions to the end of the guarded motion behavior.

If guarded motion is enabled, control transfers to decision block 520 to test whether sensors indicate that the robot may have bumped into an obstacle. The robot may include tactile type sensors that detect contact with obstacles. If these sensors are present, their hardware abstractions may be queried to determine if they sense any contact. If a bump is sensed, it is too late to perform guarded motion. As a result, operation block 525 causes the robot to move in a direction opposite to the bump at a reduced speed that is 20% of a predefined maximum speed without turning, and then exits. This motion is indicated in operation block 525 as no turn (i.e., T=0) and a speed in the opposite direction (i.e., V=−20%).

If no bump is detected, control transfers to decision block 530 where a resistance limit determination is performed. This resistance limit measures impedance to motion that may be incongruous with normal unimpeded motion. In this representative embodiment, the resistance limit evaluates true if the wheel acceleration equals zero, the force on the wheels is greater than zero, the robot has an inertial acceleration that is less than 0.15, and the resulting impedance to motion is greater than a predefined resistance limit. If this resistance limit evaluation is true, operation block 535 halts motion in the impeded direction, then exits. Of course, those of ordinary skill in the art will recognize that this is a specific implementation for an embodiment with wheels and a specific inertial acceleration threshold. Other embodiments, within the scope of the present invention, may include different sensors and thresholds to determine if motion is being impeded in any given direction based on that embodiment's physical configuration and method of locomotion.

If motion is not being impeded, control transfers to decision block 540 to determine if any obstacles are within an event horizon. An event horizon is calculated as a predetermined temporal threshold plus a speed adjustment. In other words, obstacles inside of the event horizon are obstacles that the robot may collide with at the present speed and direction. Once again, this calculation is performed in all directions around the robot. As a result, even if an obstacle is not directly in the robot's current path, which may include translational and rotational movement, it may be close enough to create a potential for a collision. As a result, the event horizon calculation may be used to decide whether the robot's current rotational and translational velocity will allow the robot time to stop before encroaching the predetermined threshold distance. If there are no objects sensed within the event horizon, there is no need to modify the robot's current motion and the algorithm exits.

If an obstacle is sensed within the event horizon, operation block 550 begins a "safety glide" as part of the overall timing loop to reduce the robot's speed. As the robot's speed is reduced, the event horizon, proportional to that of the speed, is reduced. If the reduction is sufficient, the next time through the timing loop, the obstacle may no longer be within the event horizon even though it may be closer to the robot. This combination of the event horizon and timing loop enables smooth deceleration because each loop iteration where the event horizon calculation exceeds the safety threshold, the speed of the robot (either translational, rotational, or both) may be curtailed by a small percentage. This enables a smooth slow down and also enables the robot to proceed at the fastest speed that is safe. The new speed may be determined as a combination of the current speed and a loop speed adjustment. For example and not limitation, New_speed=current_speed*(0.75−loop_speed_adjust). The loop_speed_adjust variable may be modified to compensate for how often the timing loop is executed and the desired maximum rate of deceleration. Of course, those of ordinary skill in the art will recognize that this is a specific implementation. While this implementation may encompass a large array of robot configurations, other embodiments within the scope of the present invention may include different scale factors for determining the new speed based on a robot's tasks, locomotion methods, physical attributes, and the like.

Next, decision block 560 determines whether an obstacle is within a danger zone. This may include a spatial measurement wherein the range to the obstacle in a given direction is less than a predetermined threshold. If not, there are likely no obstacles in the danger zone and the process exits.

If an obstacle is detected in the danger zone, operation block 570 stops motion in the current direction and sets a flag indicating a motion obstruction, which may be used by other attributes, behaviors or conduct.

As mentioned earlier, the guarded motion behavior 500 operates on a global timing loop. Consequently, the guarded motion behavior 500 will be re-entered and the process repeated on the next time tick of the global timing loop.

4.1.2. Obstacle Avoidance Behavior

Figure 15:
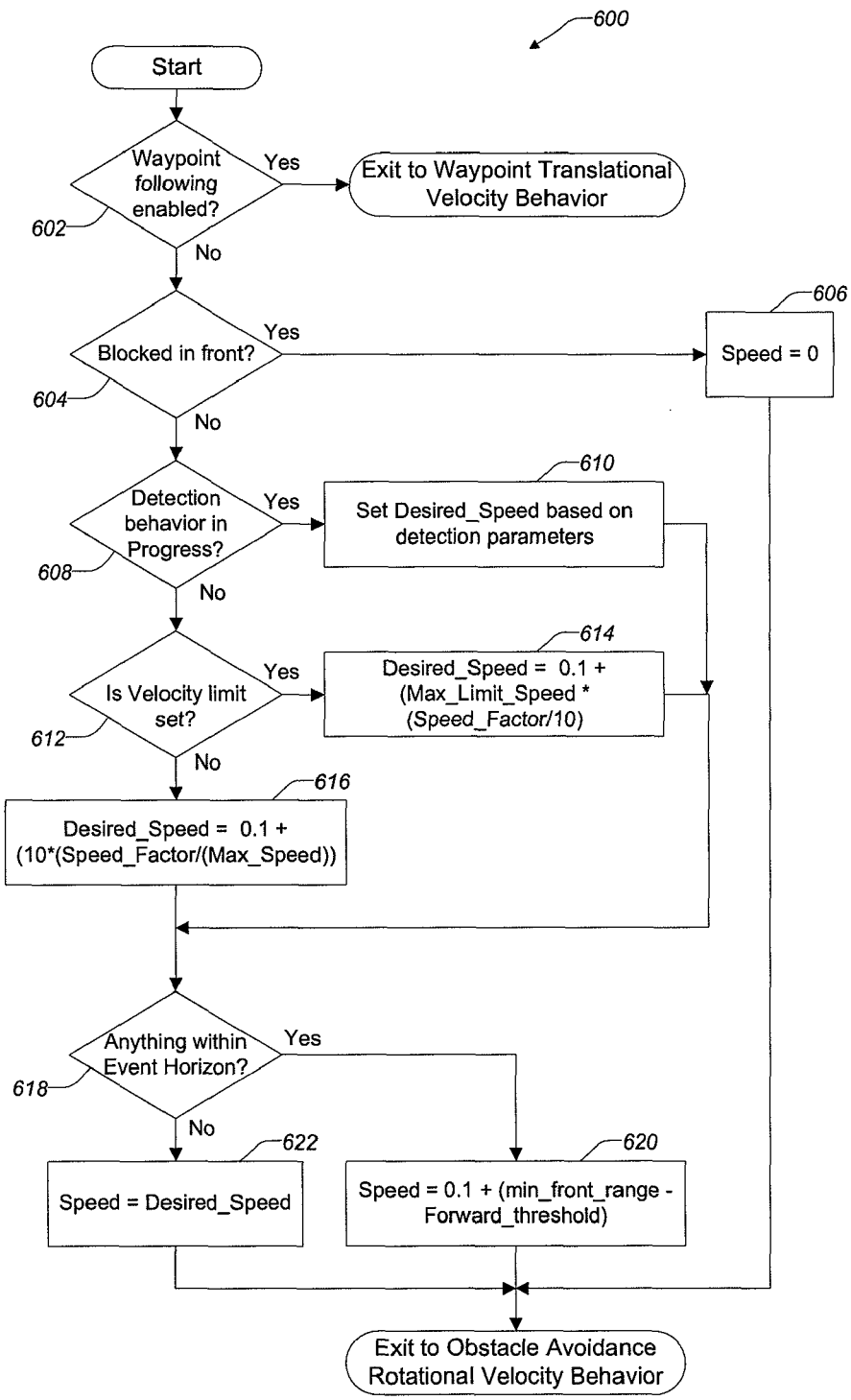
FIG. 15 is a software flow diagram illustrating components of an algorithm for performing translational portions of an obstacle avoidance behavior.
Figure 16:
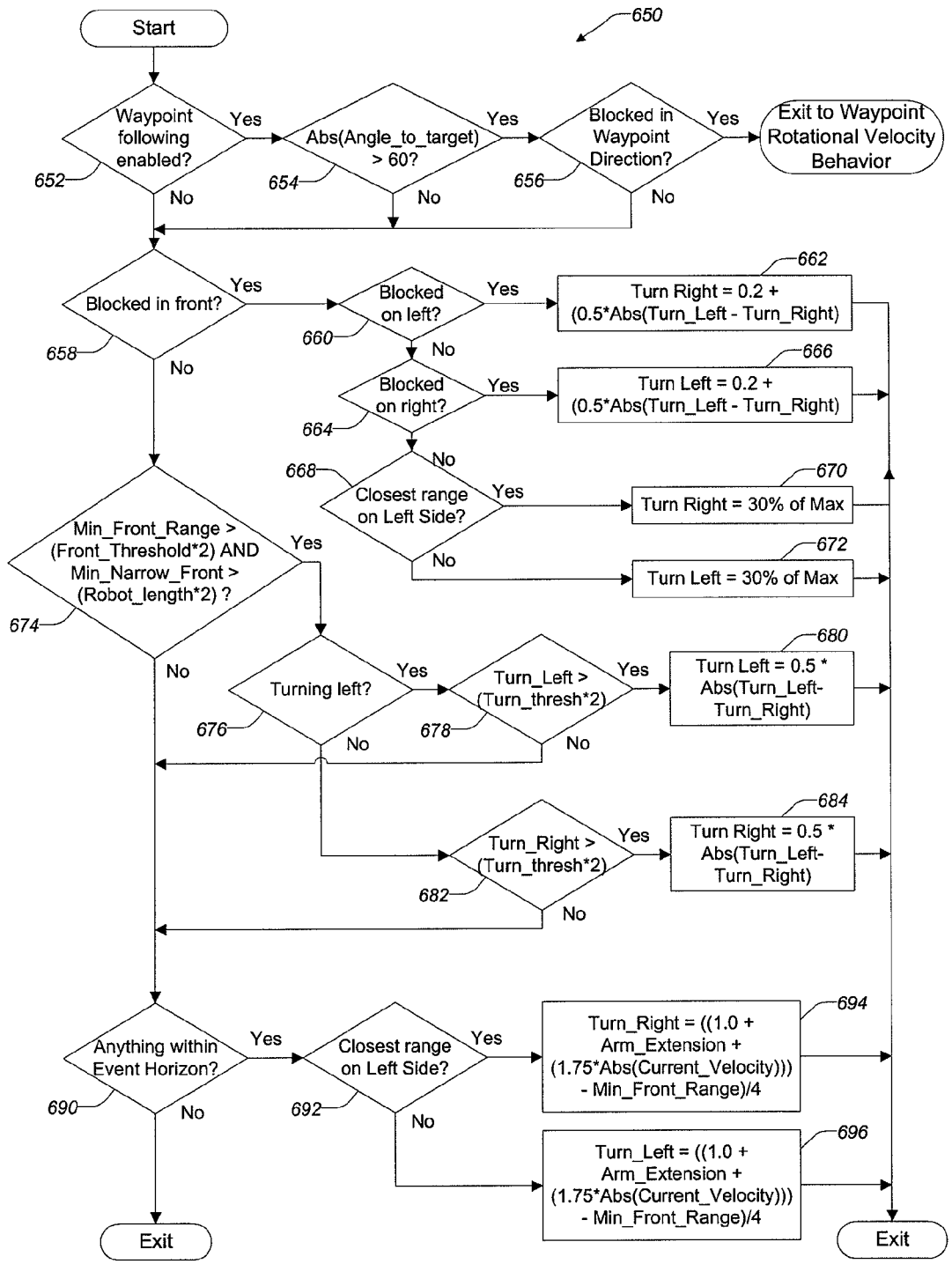
FIG. 16 is a software flow diagram illustrating components of an algorithm for performing rotational portions of the obstacle avoidance behavior.

FIG. 15 is a software flow diagram illustrating components of an algorithm for the obstacle voidance behavior 600 that governs translational velocity of the robot according to embodiments of the present invention. Similarly, FIG. 16 is a software flow diagram illustrating components of an algorithm for the obstacle voidance behavior that governs rotational velocity 650 of the robot. Obstacle avoidance may fuse information from a variety of robot attributes and hardware abstractions, such as, for example, motion attributes, range attributes, and bump abstractions. In addition, the obstacle avoidance behavior may use information from other robot behaviors such as, for example, the guarded motion behavior and a get unstuck behavior. The obstacle avoidance behavior uses these attributes, abstractions, and behaviors to determine a translational velocity and a rotational velocity for the robot such that it can safely avoid known obstacles.

In general, the obstacle avoidance behavior uses range sensing (e.g., from laser, sonar, infrared, or combinations thereof) of nearby obstacles to adapt its translational velocity and rotation velocity using the event horizon determinations explained earlier with respect to the guarded motion behavior. As stated earlier, the obstacle avoidance behavior works with the guarded motion behavior as building blocks for full autonomous navigation. In addition, it should be emphasized that the processes shown in FIGS. 15 and 16 operate within the RIK framework of the global timing loop. Therefore, the obstacle avoidance behavior is re-entered, and executes again, for each timing loop.

To begin the translational velocity portion of FIG. 15, decision block 602 determines if waypoint following is enabled. If so, control transfers out of the obstacle avoidance behavior to a waypoint following behavior, which is explained more fully below.

If waypoint following is not enabled, control transfers to decision block 604 to first test to see if the robot is blocked directly in front. If so, control transfers to operation block 606 to set the robot's translational speed to zero. Then, control transfers out of the translational velocity behavior and into the rotational velocity behavior so the robot can attempt to turn around the object. This test at decision block 604 checks for objects directly in front of the robot. To reiterate, the obstacle avoidance behavior, like most behaviors and conducts in the RIK, is temporally based. In other words, the robot is most aware of its velocity and whether objects are within an event horizon related to time until it may encounter an object. In the case of being blocked in front, the robot may not be able to gracefully slow down through the guarded motion behavior. Perhaps because the object simply appeared in front of the robot, without an opportunity to follow typical slow down procedures that may be used if an object is within an event horizon. For example, the object may be another robot or a human that has quickly moved in front of the robot so that the guarded motion behavior has not had an opportunity to be effective.

If nothing is blocking the robot in front, decision block 608 tests to see if a detection behavior is in progress. A detection behavior may be a behavior where the robot is using a sensor in an attempt to find something. For example, the countermine conduct is a detection behavior that is searching for landmines. In these types of detection behaviors, obstacle avoidance may want to approach much closer to objects, or may want to approach objects with a much slower speed to allow time for the detection function to operate. Thus, if a detection behavior is active, operation block 610 sets a desired speed variable based on detection parameters that may be important. By way of example and not limitation, in the case of the countermine conduct this desired speed may be set as: Desired_Speed=Max_passover_rate−(Scan_amplitude/Scan_Speed). In this countermine conduct example, the Max_passover_rate may indicate a maximum desired speed for passing over the landmine. This speed may be reduced by other factors. For example, the (Scan_amplitude/Scan_Speed) term reduces the desired speed based on a factor of how fast the mine sensor sweeps an area. Thus, the Scan_amplitude term defines a term of the extent of the scan sweep and the Scan_Speed defines the rate at which the scan happens. For example, with a large Scan_amplitude and a small Scan_Speed, the Desired_Speed will be reduced significantly relative to the Max_passover_rate to generate a slow speed for performing the scan. While countermine conduct is used as an example of a detection behavior, those of ordinary skill in the art will recognize that embodiments of the present invention may include a wide variety of detection behaviors, such as, for example, radiation detection, chemical detection, and the like.

If a detection behavior is not in progress, decision block 612 tests to see if a velocity limit is set. In some embodiments of the invention, it may be possible for the operator to set a velocity limit that the robot should not exceed, even if the robot believes it may be able to safely go faster. For example, if the operator is performing a detailed visual search, the robot may be performing autonomous navigation, while the operator is controlling a camera. The operator may wish to keep the robot going slow to have time to perform the visual search.

If a velocity limit is set, operation block 614 sets the desired speed variable relative to the velocity limit. The equation illustrated in operation block 614 is a representative equation that may be used. The 0.1 term is a term used to ensure that the robot continues to make very slow progress, which may be useful to many of the robot attributes, behaviors, and conduct. In this equation, the Speed_Factor term is a number from one to ten, which may be set by other software modules, for example the guarded motion behavior, to indicate a relative speed at which the robot should proceed. Thus, the desired speed is set as a fractional amount (between zero and one in 0.1 increments) of the Max_Limit_Speed.

If a velocity limit is not set, operation block 616 sets the desired speed variable relative to the maximum speed set for the robot (i.e., Max_Speed) with an equation similar to that for operation block 614 except Max_Speed is used rather than Max_Limit_Speed.

After the desired speed variable is set by block 610, 614, or 616, decision block 618 tests to see if anything is within the event horizon. This test may be based on the robot's physical dimensions, including protrusions from the robot such as an arm, relative to the robot's current speed. As an example using an arm extension, something inside the event horizon may be determined by the equation:

$$\text{Min\_Front\_Range} < 1.0 + \text{Arm\_Extension} + (1.75 * \text{Abs}(\text{Current\_Velocity}))$$

Where the Min_Front_Range indicates a range to an obstacle in front, 1.0 is a safety factor, Arm_Extension indicates the distance beyond the robot that the arm currently extends, and Current_Velocity indicates the robot's current translational velocity.

If there is something detected within the event horizon, operation block 620 sets the current speed based on the distance to the obstacle. Thus, the example equation in block 620 sets the speed based on the range to the object less a Forward_Threshold set as a safety factor. With this speed, guarded motion has an opportunity to be effective and the speed may be reduced further on the next iteration of the timing loop if the object is still within the event horizon. After setting the speed, control transfers out of the translational velocity behavior, and into the rotational velocity behavior.

If there is nothing detected within the event horizon, operation block 622 sets the robot's current speed to the desired speed variable that was set previously by operation block 614, 616, or 618. After setting the speed, control transfers out of the translational velocity behavior 600, and into the rotational velocity behavior 650.

FIG. 16 illustrates a representative software flow diagram illustrating components of an algorithm for the obstacle voidance behavior that governs rotational velocity behavior 650 of the robot. To begin the rotational velocity behavior of FIG. 16, decision block 652 determines if waypoint following is enabled. If so, control transfers to decision block 654 to determine if the angle to a target exceeds a predefined threshold. If so, control transfers to decision block 656 to determine if the robot is blocked in the waypoint direction.

At decision block 658, the process checks to see if the robot is blocked in front. If so, the process performs a series of checks to see where other obstacles may be to determine a desired rotational velocity and direction. This obstacle checking process begins with decision block 660 testing to see if the robot is blocked on the left side. If the robot is blocked on the left side, and also in front, operation block 662 sets a new value for a turn velocity to the right. In the representative embodiment illustrated in FIG. 16 a positive rotational velocity is defined as a turn to the left and a negative rotational velocity is defined as a turn to the right. Thus, generally, Turn_left is a positive value indicating a rotational velocity to the left and Turn_right is a negative value indicating a rotational velocity to the right. Thus, operation block 662 reduces the rotational velocity in the current direction by about one half plus a small offset used to ensure that the rotational velocity does not reach zero. After setting the new rotation velocity, the process exits.

If the robot is not blocked on the left, decision block 664 tests to see if the robot is blocked on the right. If so, operation block 666 sets a new value for a turn velocity to the right similar to that velocity setting in operation block 662. In other words, set the rotational velocity to the left to about one half plus a small offset used to ensure that the rotational velocity does not reach zero. After setting the new rotation velocity, the process exits.

If the robot is blocked in the front, but not on the left or right, the process then decides which way to turn to get around the blockage by checking to see whether the nearest obstacle in a measurable range is to the right or left and adjusting the rotational velocity to be away from the obstacle. Operation block 668 checks to see if the nearest obstacle is to the left. If so, operation block 670 sets the rotational velocity to the right (i.e., away from the obstacle) at a velocity of 30% of a maximum defined rotational velocity. If the nearest obstacle is not to the left, operation block 672 sets the rotational velocity to the left at a velocity of 30% of a maximum defined rotational velocity. After setting the new rotation velocity by either operation block 670 or 672, the process exits.

If the robot was not blocked in front, based on decision block 658, then decision block 674 performs a "threading the needle process." This starts with decision block 674 determining a range to obstacles that may still be in front of the robot but not directly blocking the robot. To do this, decision block 674 tests to see if Min_Front_Range is greater than two times a predefined threshold for the front direction, and to see if Min_Narrow_Front is greater than two times the robot's length. If both these tests are true, it may be relatively clear in front and the process decides to reduce the rotational velocity in the current direction to make the direction more straight ahead until the next global timing loop. Therefore, decision block 676 tests to see if the current rotational direction is left. If so, decision block 678 tests to see if the magnitude of the left rotational velocity is greater than twice a turn threshold. If so, operation block 680 reduces the rotational velocity in the left direction by one half, and the process exits. If the current rotational direction is not left, decision block 682 tests to see if the magnitude of the right rotational velocity is greater than twice a turn threshold. If so, operation block 684 reduces the rotational velocity in the right direction by one half, and the process exits.

If decision block 674, 678, or 682 evaluates false, decision block 690 tests to see if anything is currently within the event horizon.

This test may be based on the robot's physical dimensions, including protrusions from the robot such as an arm, relative to the robot's current speed. In addition, this test is likely the same as the event horizon described above for the translational velocity when discussing decision block 618 in FIG. 15. In other words, is the Minimum_Front_Range less than an Event_Range? Wherein the Event_Range=1.0+Arm_Extension+(1.75*Abs(Current_Velocity)).

If there is nothing within the event horizon (i.e., decision block 690 evaluates false), there is likely no need to change the current rotational velocity so the process exits. If there is something within the event horizon, but not within the threading the needle process or blocking the robot in front, the rotational velocity may be adjusted at a more gradual rate. Thus, if decision block 690 evaluates true, decision block 692 tests to see if the closest object is on the left side. If so, operation block 694 sets a new rotational velocity to the right. If the closest object is not on the left, operation block 696 sets a new rotational velocity to the left. The rotational velocity that is set in operation blocks 694 and 696 are similar except for direction. In this representative embodiment, the rotational velocity may be set as a function of the Event Range from the event horizon test of decision block 690. Thus, the rotational velocity may be set as:

$$(Event\_Range - Min\_Front\_Range)/4.$$

After setting the rotational velocity in either operation block 694 or 696, the process exits.

As mentioned earlier, the obstacle avoidance behavior 600 operates on the global timing loop. Consequently, both the translational velocity and rotational velocity may be adjusted again on the next time tick of the global timing loop, allowing for relatively quick periodic adjustments to the velocities.

4.2. Get Unstuck Behavior

Figure 17:
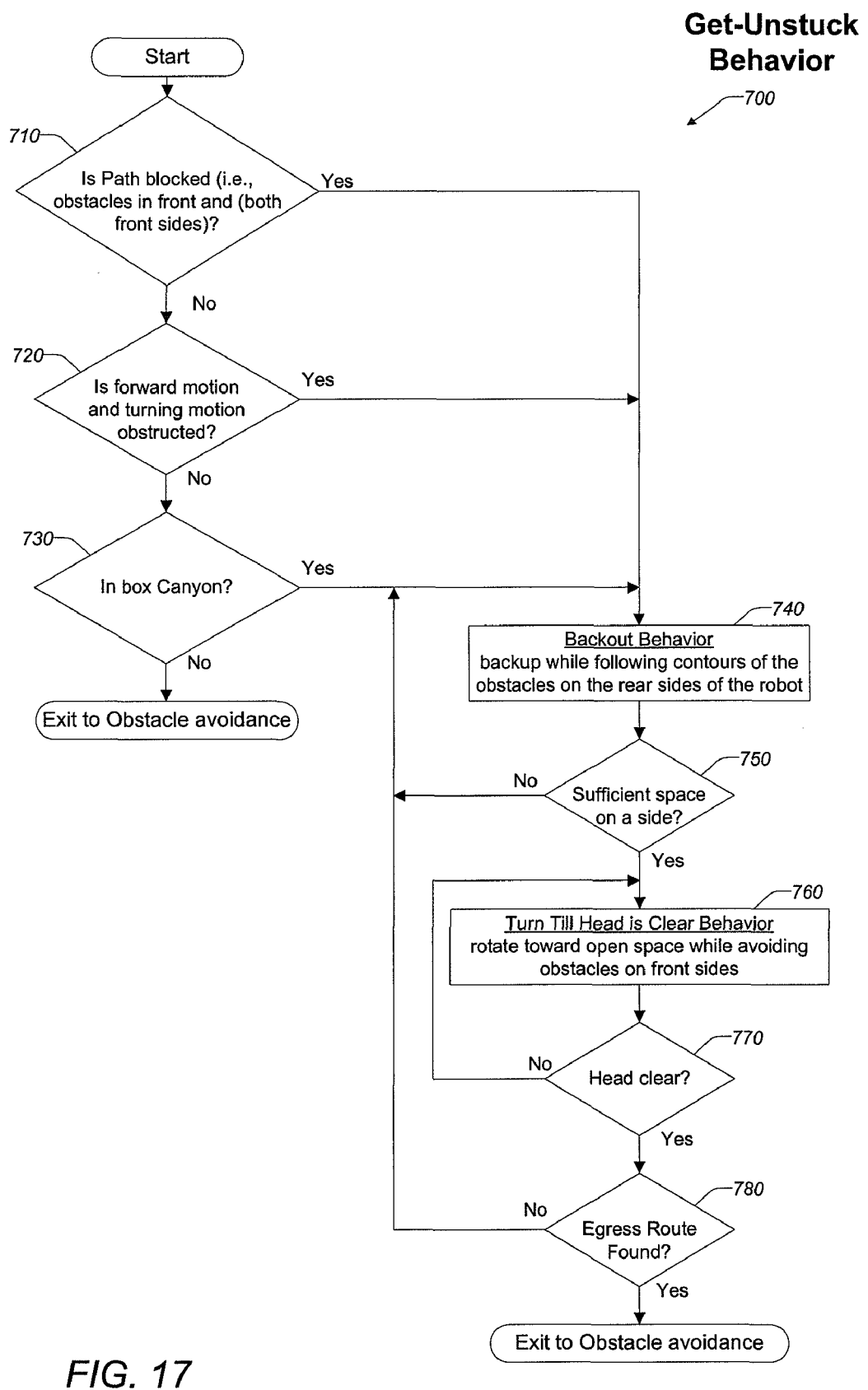
FIG. 17 is a software flow diagram illustrating components of an algorithm for performing a get unstuck behavior.

A get unstuck behavior 700, as illustrated in FIG. 17, includes significant robot initiative to extricate itself from the stuck position with little or no help from the operator. Sometimes, when a robot is operating under its own initiative, or even under operator control, the robot may get stuck and have difficulty getting free from that position. Often times, the operator may have limited understanding of the robot's position relative to the robot's understanding with its wide variety of perceptors. In general, the get unstuck behavior 700 may use range sensing (e.g., from laser, sonar, infrared, or combinations thereof) to determine nearby obstacles and their position relative to the robot.

The get unstuck behavior 700 begins at decision block 710 by determining if the current path is blocked. This blocked situation may be defined as an obstacle present in front, on the front-right side, and on the front-left side. If the path is blocked, control transfers to operation block 740, which is explained below. For an example, and using the range definitions defined above under the description of the range attribute, a blocked path may be defined by the Boolean equation:

Blocked=((right_in_front<(robot->forward_thresh+
0.2))||FRONT_BLOCKED)&& (l_front<(robot-
>forward_thresh*2))&& (r_front<(robot->for-
ward_thresh*2))&& (left_front<(robot-
>forward_thresh*2))&& (right_front<(robot-
>forward_thresh*2))

Wherein: (robot->forward_thresh) is a predetermined threshold parameter, that may be robot specific, to define a safety distance, or maneuverability distance, away from the robot.

If the path is not blocked, decision block 720 determines if forward motion and turning motion is obstructed. If motion is obstructed, control transfers to operation block 740, which is explained below. For an example, this motion obstruction may be determined by the Boolean equation:

Obstructed_motion=
(FR_LEFT_BLOCKED||R_RIGHT_BLOCKED)
&&
(FR_RIGHT_BLOCKED||L_LEFT_BLOCKED)
&& FRONT_BLOCKED If motion is not obstructed, decision block 730 determines if the robot is in a box canyon. If the robot is not in a box canyon, the get unstuck behavior exits because it appears the robot is not in a stuck situation. If the robot is in a box canyon, control transfers to operation block 740. For an example, this box canyon situation may be defined by the Boolean equation:

Box_canyon=(right_in_front<(robot->forward-
_thresh+0.2))&& (right_front<(robot->forward-
_thresh*2.0))&& (left_front<(robot->forward-
_thresh*2.0))&& ((right_side+left_side)<(robot-
>turn_thresh*3.0))&& (BACK_BLOCKED=0)

Wherein: (robot->turn_thresh) is a predetermined threshold parameter, which may be robot specific, to define a maneuverability distance that enables the robot to turn around.

Once the determination has been made that the robot may be stuck, operation block 740 begins the process of attempting to get unstuck. Operation block 740 performs a back-out behavior. This back-out behavior causes the robot to backup from its present position while following the contours of obstacles near the rear sides of the robot. In general, the back-out behavior uses range sensing (e.g., from laser, sonar, infrared, or combinations thereof) of nearby obstacles near the rear sides to determine distance to the obstacles and provide assistance in following the contours of the obstacles. However, the back-out behavior may also include many robot attributes, including perception, position, bounding shape, and motion, to enable the robot to turn and back up while continuously responding to nearby obstacles. Using this fusion of attributes, the back-out behavior doesn't merely back the robot up, but rather allows the robot to closely follow the contours of whatever obstacles are around the robot.

For example movements, the robot may attempt to equalize the distance between obstacles on both sides, keep a substantially fixed distance from obstacles on the right side, or keep a substantially fixed distance between obstacles on the right side. As the back-out behavior progresses, decision block 750 determines if there is sufficient space on a side to perform a maneuver other than backing out. If there is not sufficient space, control transfers back to operation block 740 to continue the back-out behavior. If there is sufficient space on a side, control transfers to operation block 760. As an example, the sufficient space on a side decision may be defined by the Boolean equation:

Space_on_side=space_on_left||space_on_right,
    wherein:

Space_on_left=(l_front>(robot->forward_thresh+0.2))
    && (turn_left>(robot->arm_length+robot->turn-
    _thresh+0.2))&& (turn_left>=turn_right)

Space_on_right=(r_front>(robot->forward_thresh+
    0.2))&& (turn_right>(robot->arm_length+robot-
    >turn_thresh+0.2))&& (turn_right>=turn_left))

Once sufficient space has been perceived on the right or left, operation block 760 performs a turn-until-head-is-clear behavior. This behavior causes the robot to rotate in the sufficient space direction while avoiding obstacles on the front side. As the turn-until-head-is-clear behavior progresses, decision block 770 determines if, and when, the head is actually clear. If the head is not clear, control transfers back to the operation block 760 to continue the turn-until-head-is-clear behavior. If the head is clear, control transfers to operation block 760.

Once the head is clear, decision block 780 determines whether an acceptable egress route has been found. This egress route may be defined as an acceptable window of open space that exists for the robot to move forward. To avoid potential cyclical behavior, the acceptable window may be adjusted such that the robot does not head back toward the blocked path or box canyon. If an acceptable egress route has not been found, control transfers back to operation block 740 to attempt the back-out behavior again. If an acceptable egress route is found, the unstuck behavior exits. As a specific example, the window may be defined by the equation:

window=1.25 meters−(seconds-in-behavior/10.0); and
    the egress route may be defined as true if the
    window<(robot->forward_thresh*2.5).

As with the guarded motion behavior, the get-unstuck behavior 700 operates on a global timing loop. Consequently, the get-unstuck behavior 700 will be re-entered and the process repeated on the next time tick.

4.3. Real-Time Occupancy Change Analysis

Figure 18:
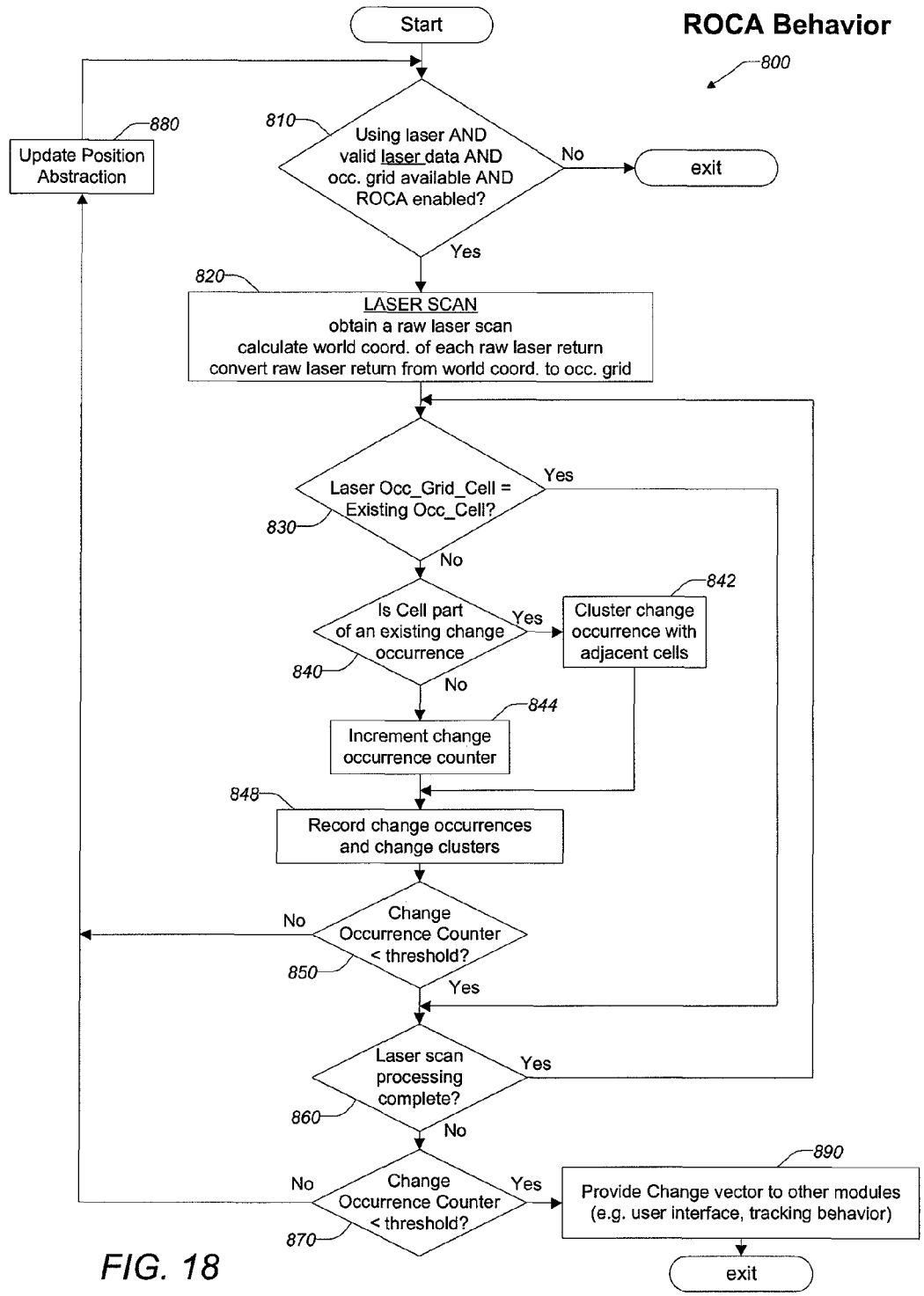
FIG. 18 is a software flow diagram illustrating components of an algorithm for performing a real-time occupancy change analysis behavior.

FIG. 18 is a software flow diagram illustrating representative components of an algorithm for performing a real-time occupancy change analysis behavior 800. Despite the much discussed potential for robots to play a critical role in security applications, the reality is that many human presence and motion tracking techniques require that the sensor used in tracking be stationary, removing the possibility for placement on a mobile robot platform. In addition, there is a need to determine substantially accurate positions for changes to recognized environmental features within a map. In other words, it may not be enough to know that something has moved or even the direction of movement. For effective change detection, a system should provide a substantially accurate position of the new location.

The Real-Time Occupancy Change Analyzer (ROCA) algorithm compares the state of the environment to its understanding of the world and reports to an operator, or supporting robotic sensor, the position of and the vector to any change in the environment. The ROCA robot behavior 800 includes laser-based tracking and positioning capability which enables the robot to precisely locate and track static and mobile features of the environment using a change detection algorithm that continuously compares current laser scans to an occupancy grid map. Depending on the laser's range, the ROCA system may be used to detect changes up to 80 meters from the current position of the laser range finder. The occupancy grid may be given a priori by an operator, built on-the-fly by the robot as it moves through its environment, or built by a combination of robot and operator collaboration. Changes in the occupancy grid may be reported in near real-time to support a number of tracking capabilities, such as camera tracking or a robotic follow capability wherein one or more robots are sent to the map location of the most recent change. Yet another possible use for the ROCA behavior is for target acquisition.

A notable aspect of the ROCA behavior is that rather than only providing a vector to the detected change, it provides the actual X, Y position of the change. Furthermore, the ROCA behavior can operate "on-the-move" meaning that unlike most human presence detection systems which must be stationary to work properly, it can detect changes in the features of the environment around it apart from of its own motion. This position identification and on-the-move capability enable tracking systems to predict future movement of the target and effectively search for a target even if it becomes occluded.

In general, once the robot has identified a change, the change may be processed by several algorithms to filter the change data to remove noise and cluster the possible changes. Of the clustered changes identified, the largest continuous cluster of detected changes (i.e., "hits") may be defined as locations of a change (e.g., possible intruder) within either the global coordinate space, as a vector from the current pose of the robot, other useful coordinate systems, or combinations thereof. This information then may be communicated to other robot attributes, robot behaviors, and cognitive conduct within the RIK as well as to other robots or an operator on a remote system.

As discussed earlier when discussing the range attribute, a variety of coordinate systems may be in use by the robot and an operator. By way of example, a local coordinate system may be defined by an operator relative to a space of interest (e.g., a building) or a world coordinate system defined by sensors such as a GPS unit, an iGPS unit, a compass, an altimeter, and the like. A robot coordinate system may be defined in Cartesian coordinates relative to the robot's orientation such that, for example, the X-axis is to the right, the Y-axis is straight ahead, and the Z-axis is up. Another robot coordinate system may be cylindrical coordinates with a range, angle, and height relative to the robot current orientation.

The software flow diagram shown in FIG. 18 includes representative components of an algorithm for performing the ROCA behavior 800. As stated earlier, the ROCA process 800 assumes that at least some form of occupancy grid has been established. However, due to the global timing loop execution model, details, probabilities, and new frontiers of the occupancy grid may be built in parallel with the ROCA process 800. The ROCA process 800 begins at decision block 810 by testing to determine if the robot includes lasers, the laser data is valid, an occupancy grid is available, and the ROCA process 800 is enabled. If not, the ROCA process 800 ends.

If decision block 810 evaluates true, process block 820 performs a new laser scan, which includes obtaining a raw laser scan, calculating world coordinates for data included in the raw laser scan, and converting the world coordinates to the current occupancy grid. The raw laser scan includes an array of data points from one or more laser sweeps with range data to objects encountered by the laser scan at various points along the laser sweep. Using the present occupancy grid and present robot pose, the array of range data may be converted to an occupancy grid (referred to as laser-return occupancy grid) similar to the present occupancy grid map.

Next, decision block 830 tests to see if the current element of the array of range data shows an occupancy element that is the same as the occupancy element for the occupancy grid map. If so, control passes to decision block 860 at the bottom of the range data processing loop, which is discussed later.

If there is a difference between the laser-return occupancy cell and the corresponding cell for the occupancy grid map, decision block 840 tests the laser-return occupancy cell to see if it is part of an existing change occurrence. In other words, if this cell is adjacent to another cell that was flagged as containing a change, it may be part of the same change. This may occur, for example, for an intruder, that is large enough to be present in more than one occupancy grid. Of course, this test may vary depending on, for example, the granularity of the occupancy grid, accuracy of the laser scans, and size of the objects of concern. If decision block 840 evaluates true, operation block 842 clusters this presently evaluated change with other change occurrences that may be adjacent to this change. Then control will transfer to operation block 848.

If decision block 840 evaluates false, the presently evaluated change is likely due to a new change from a different object. As a result, operation block 844 increments a change occurrence counter to indicate that there may be an additional change in the occupancy grid.

Operation block 848 records the current change occurrences and change clusters whether from an existing cluster or a new cluster, then control transfers to decision block 850.

Decision block 850 tests to see if the change occurrence counter is still below a predetermined threshold. If there are a large number of changes, the changes may be due to inaccuracies in the robot's current pose estimate. For example, if the pose estimate indicates that the robot has turned two degrees to the left, but in reality, the robot has turned five degrees to the left, there may be a large number of differences between the laser-return occupancy grid and the occupancy grid map. These large differences may be caused by the inaccuracies in the pose estimate, which would cause inaccuracies in the conversion of the laser scans to the laser-return occupancy grid. In other words, skew in the alignment of the laser scan onto the occupancy grid map due to errors in the robot's pose estimation, from rotation or translation, may cause a large number of differences. If this is the case, control transfers to operation block 880 to update the position abstraction in an attempt to get a more accurate pose estimate. After receiving a new pose estimate from the position abstraction, the ROCA process begins again at decision block 810.

If decision block 850 evaluates true or decision block 860 was entered from decision block 830, decision block 860 tests to see if there are more data points in the laser scan to process. If so, control transfers back to decision block 830 to process the next element in the laser scan array.

If decision block 850 evaluates false, all the data in the laser scan array has been processed and decision block 870 again tests to see if the change occurrence counter is still below a predetermined threshold. As discussed earlier, if the change occurrence counter is not below the predetermined threshold, operation block 880 updates the position abstraction in an attempt to get a more accurate pose estimate, the ROCA process begins again at decision block 810.

If decision block 870 evaluates true, then processing for this laser scan is complete and operation block 890 updates a change vector and information regarding change occurrences and change clusters is made available to other robot attributes, robot behaviors, and cognitive conduct modules.

By way of example, and not limitation, the ROCA results may be sent to the user interface, used by a tracking behavior, and combinations thereof. For example, ROCA results may be used with additional geometric calculations to pan a visual camera, a thermal camera, or combination thereof to fixate on one or more of the identified changes. Similarly, a manipulator, such as, for example, a weapon may be panned to acquire a target identified as one of the changes. If the detected change is moving, tracking position updates may arrive in near real time (the actual rate may depend on the speed and latency of the communication channel), allowing various sensors to continuously track the target. If desired, the robot may also continuously move to the new location identified by the change detection system to provide a mobile tracking capability.

When coupled with an operator interface, the tracked entity's movements may be indicated to an operator in near real time and visual data from a camera can be used by the operator to identify the tracked entity.

As with other behaviors, the ROCA behavior 800 operates on the global timing loop. Consequently, the ROCA behavior 800 will be re-entered and the process repeated on the next time tick.

5. Seamless Autonomy

Embodiments of the present invention may include methods and systems that provide a more intuitive approach for the user to direct a robot's activities without having to understand the available robot behaviors and autonomy levels. This intuitive approach provides a bridge between a user's intentions and a robot's behaviors by creating a new user interface and adjustments to robot initiative and behavior that do not need to be directly controlled by the user.

This approach provides a means to control a remote robot via a continuous range of autonomy levels without requiring the operator to explicitly change the autonomy level on the robot. Conventional approaches have distinct autonomy modes or levels and the operator generally chooses a mode and then the robot navigates according to the dictated level of autonomy.

In contrast, in embodiments of the present invention, the operator is no longer responsible for directly choosing the mode of autonomy. Rather, the operator places a navigational "target" and the robot moves towards the target. This target may also be referred to herein as a hotspot, a task designator, and a task-oriented target.

Efficient use of the robot often depends on the interactions between the operator and the robot as interacting members of a human-robot team. As tasks change, the requirements of the user and the robot should also change in order to ensure efficiency. The responsibilities of the robot are often referred to as the autonomy of the robot, and when multiple levels of autonomy are available, conventionally, the operator has the responsibility of choosing the appropriate level of autonomy. The challenge with this user-selected approach is that operators often do not realize when they are in a situation where the autonomy of the robot should be changed in order to maintain high performance. Furthermore, as new behaviors and intelligence are added to the robot, the traditional approach requires the operator to maintain appropriate mental models of what all the modes are and how they should all be used.

Leaving the autonomy switching and mode switching responsibility to the operator means that mistakes will be made from not recognizing the need to switch, or switching to the wrong autonomy level. In general, requiring the operator to have an understanding of the appropriate context for each autonomy mode is cognitively challenging and prone to error because of the requirement for the operator to make the decision about autonomy modes. Despite this, most solutions to adjustable autonomy are to create various "levels" of autonomy from which the user must choose. Even when the robot is given the ability to automatically switch between the discrete autonomy modes based on its own assessment of the situation, the operator often feels frustrated and confused about what the robot is doing and why it usurped control, which usually results in a fight for control between the operator and the robot. This fight for control generally emanates from poor communications between the robot and the human as to why the decision was made and how the decision is being put into action.

Embodiments of the present invention solve many of these problems by supporting seamless levels of interaction based on the operator indirectly controlling the robot. This indirect control is performed by allowing the operator to specify the intent of the user from a human-centered reference frame. Instead of selecting discrete levels of autonomy, the operator uses defined intentions in the form of the task-oriented targets. By using indirect control through specifying intent, the "fight-for-control" problem present in direct control approaches may be eliminated because issues with communications latency and bandwidth requirements are mitigated and the user may experience a more intuitive feel for what the robot is doing.

Figure 19:
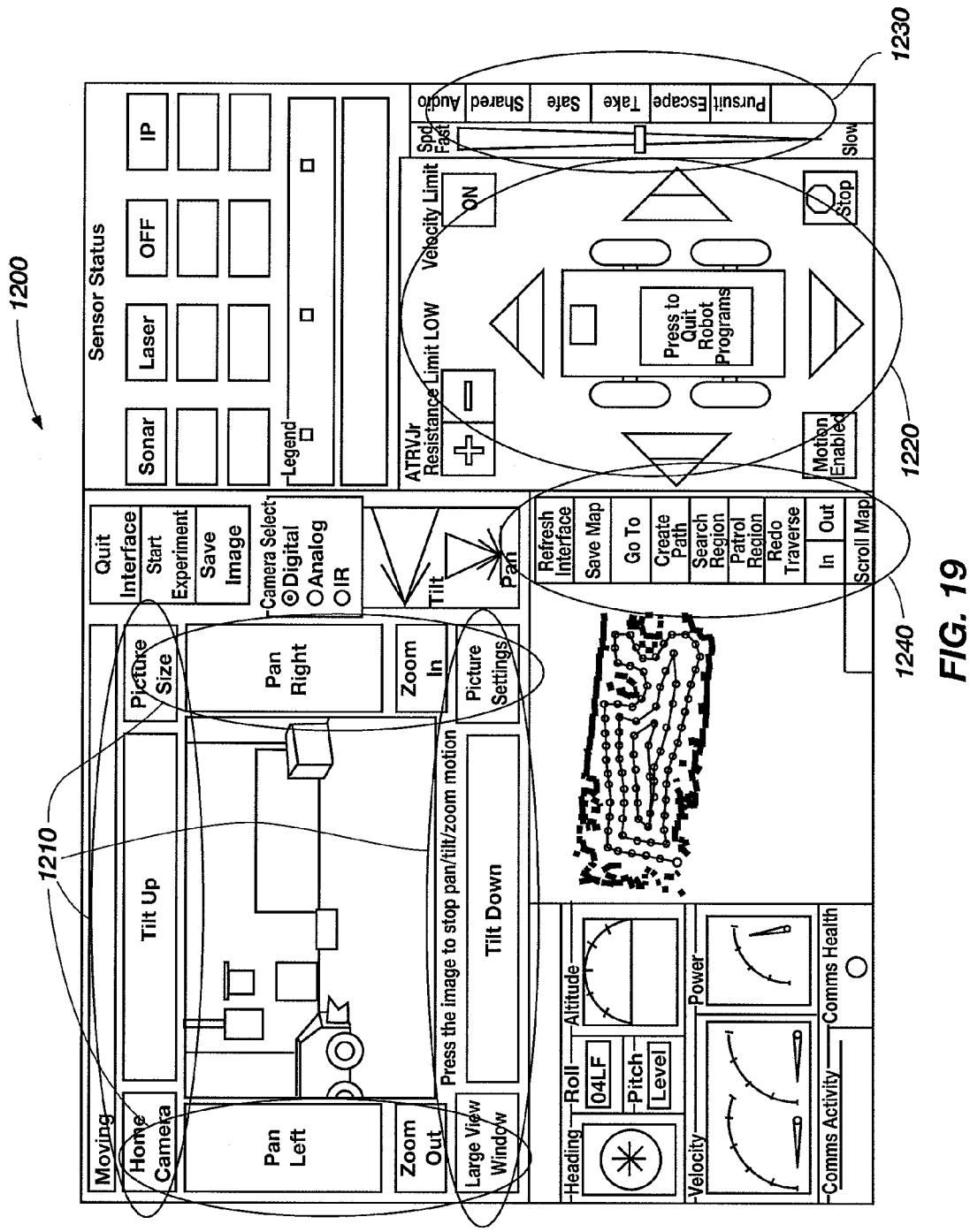
FIG. 19 is a user interface window showing controls that a user may need to operate in order to direct actions of a robot in a conventional user interface.

FIG. 19 is a user interface window showing controls that a user may need to operate in order to direct actions of a robot in a conventional user interface 1200. In this conventional user interface 1200, the user may need to control where a camera is looking using a set of camera controls 1210 to perform operations such as zoom, tilt, and pan. The user may also have another set of navigation controls 1220 for navigating the robot when the robot is operating in a low initiative mode such as, for example, teleoperation mode or safe mode. The user may also have autonomy controls 1230 to directly set autonomy levels. For example, the user may need to set the autonomy level to teleoperation mode or safe mode in order for the navigation controls 1220 to be effective. As another example, the user may also have another set of controls 1240 for selecting intelligent behaviors. These intelligent behaviors may include go-to points, waypoints, path-planning, search region, patrol region, and retro-traverse.

FIGS. 20A-20D are user interface windows 1300 in accordance with one or more embodiments of the present invention. The user interface windows 1300 include an environment map 1390, a robot position (1310A, 1310B, 1310C, and 1310D), task-oriented targets (imaging target 1320 and navigation target 1330), a planned path 1315, and an imaging window or camera (1325A, 1325B, 1325C, and 1325D).

As a non-limiting example, seamless autonomy changes using task-oriented targets may be incorporated within the GRA, RIK, robot behaviors, and robot conduct described herein. However, embodiments of the present invention are not so limited. Task-oriented targets and seamless autonomy according to embodiments of the present invention may be practiced in other robot architectures that define specific behaviors for the robot to accomplish and include a general rubric of varying autonomy levels.

Using the seamless autonomy and task-oriented targets, embodiments of the present invention allow the operator to specify a goal for the robot to achieve with the use of a target icon. In some instances, the robot is then free to determine, on its own, how to get to the destination. However, in other instances, such as, for example, when the task-oriented target is placed closer to the robot, when the task-oriented target is moving relatively frequently, or when the task-oriented target is inside some event horizons, the robot is more directly controlled. In these direct control situations, where the robot has a low robot initiative, the user more directly controls the robot's operation by placement, movement, or modification of the task-oriented target.

In a very general sense, when the target is placed farther from the robot, it is as if there is lots of "play in a leash," so to say, between the user and the robot and the navigational responsibilities fall more on the robot. In this approach, the operator is less concerned with how the robot will get to the destination. Consequently, the user's attention can be focused more on managing the overall task or mission as opposed to the actual movement of the robot. The end effect is that the operator's cognitive capabilities are freed from the navigation responsibility and allowed to concentrate on tasks more appropriate for the human to consider.

The environment map 1390 depicts the portions of an interior space that the robot comprehends up to this point in time. As the robot progresses through the environment, it may fill out more details of the environment map 1390. In addition, details of the environment map 1390 may be filled in from other sources, such as, for example, GPS information, or other information that may be supplied by the user interface. An occupancy grid-based map may be a good choice of a map because it provides a higher resolution for tasking, however, any map representation can work as long as the robot is localized with respect to the map. Furthermore, the map may depict any environment that the robot is in, not just an interior space as depicted in FIGS. 20A-20D, and 21.

Figure 20A:
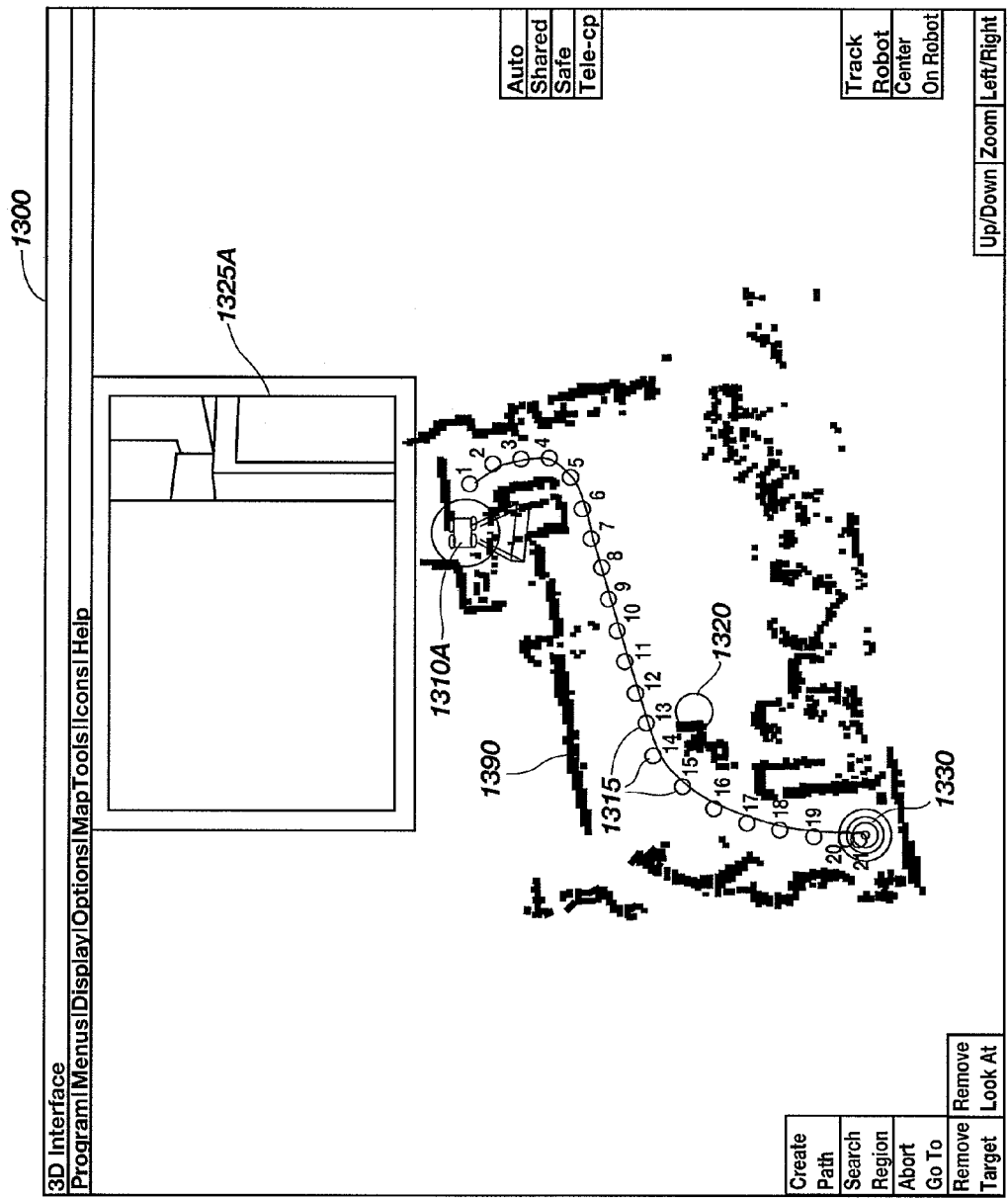
FIGS. 20A-20D are user interface windows showing task-oriented targets, a robot position, and a path plan in accordance with one or more embodiments of the present invention.

In FIG. 20A, the robot's current position and pose 1310A is shown in the upper-right corner of the environment map 1390. A task-oriented target is shown in the lower-left corner of the environment map 1390. The task-oriented target is placed by the user to designate a specific task that the user wants the robot to achieve. In this case, the task-oriented target is a navigation target 1330 that the robot should go to. With this placement of the navigation target 1330, the distance between the robot and the navigation target 1330 is large enough that the user interface directs the robot to achieve the navigation target 1330 with a high degree of autonomy. In other words, the user interface may send instructions to develop a robot plan. The robot plan may include planning a path to the navigation target 1330 and to begin moving toward the navigation target 1330 along the planned path 1315. The robot reports the planned path 1315 back to the user interface and the user interface displays the planned path 1315 as a series of waypoints in the environment map 1390. Once planned and displayed, the user may adjust the waypoints if the user believes there may be a better way to approach the navigation target 1330. Thus, the robot can still achieve the navigation target 1330 with a high degree of autonomy and the user is free to concentrate on other operations.

Figure 20B:
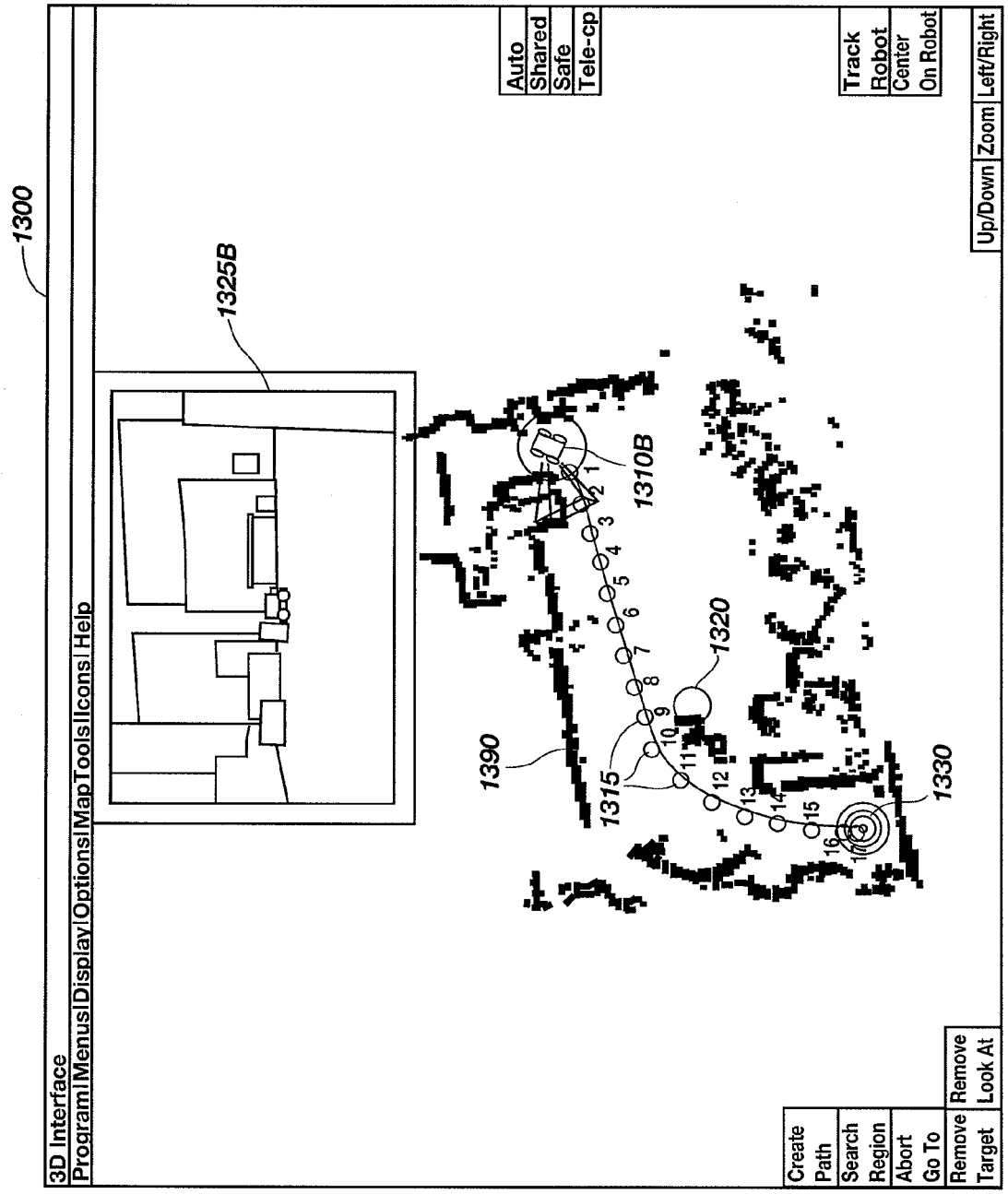
Figure 20C:
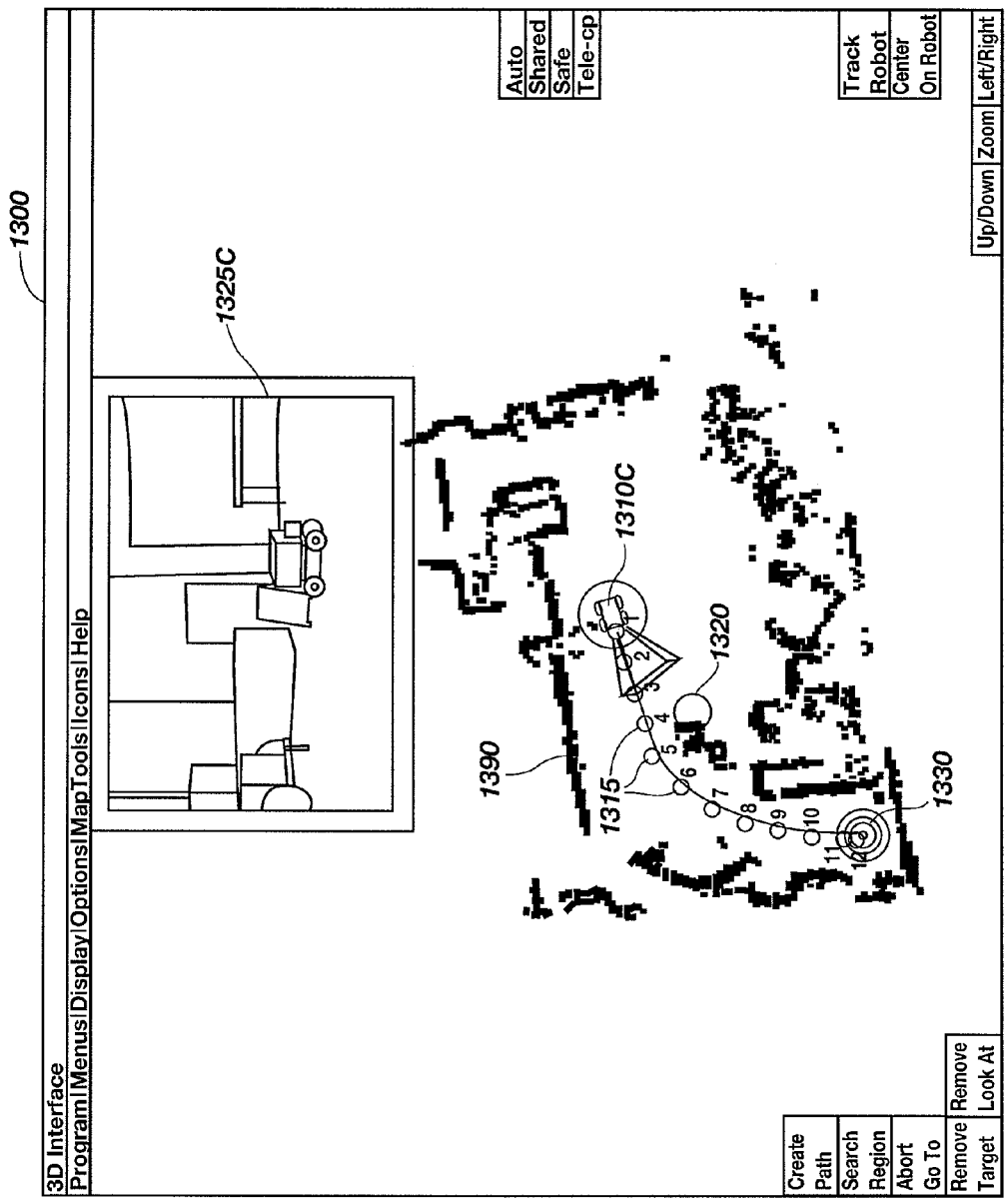
Figure 20D:
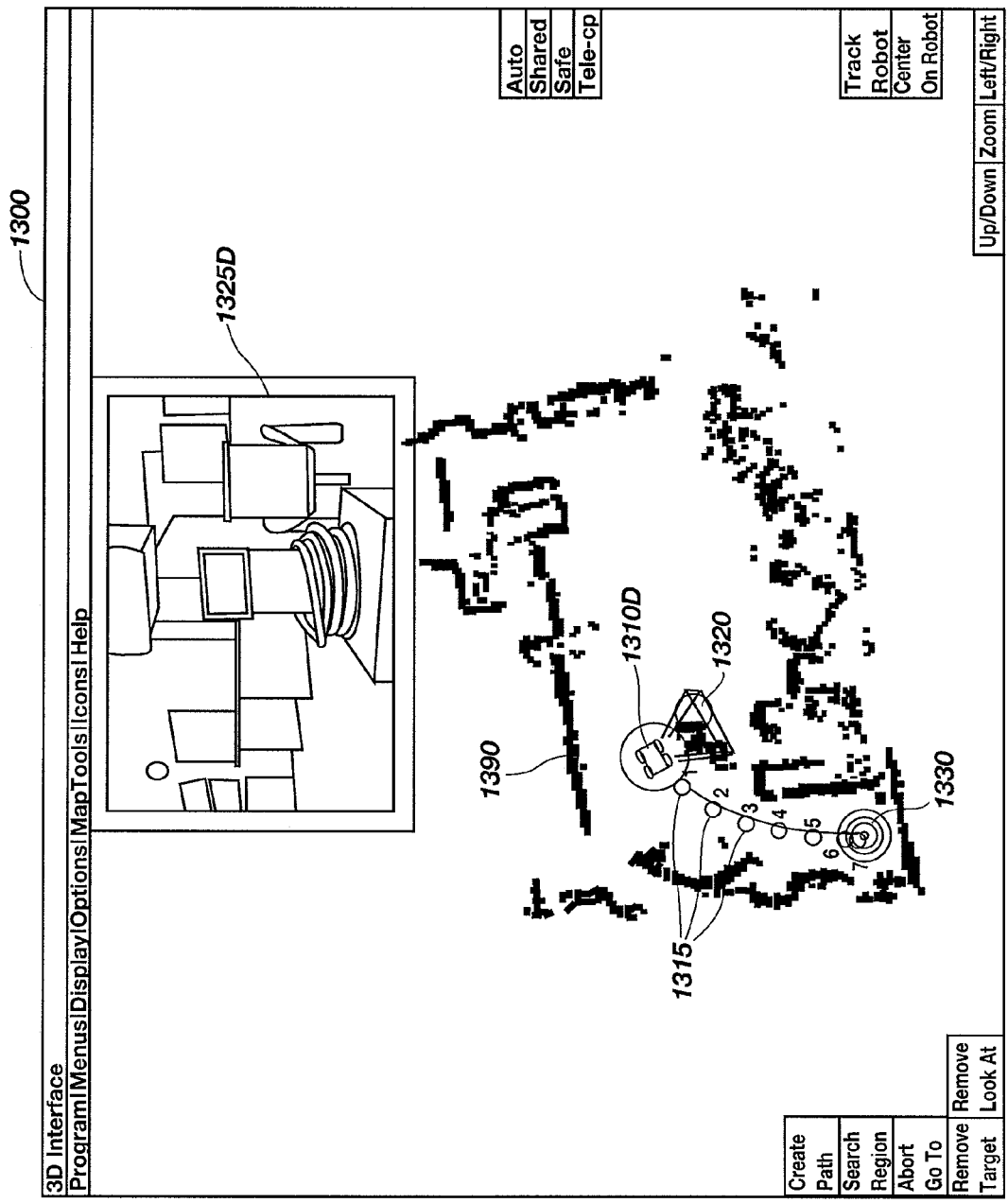

Also illustrated in FIG. 20A is another task-oriented target positioned near the center of the environment map 1390. This task-oriented target is an imaging target 1320. Thus, the user interface sends instructions to the robot to carry out robot behaviors to point an imaging device (e.g., a camera) toward the imaging target 1320 and to keep pointing at the imaging target 1320. As the robot moves, the imaging device will automatically develop a robot plan to adjust the imaging device (e.g., pan, tilt, focus) to stay on the imaging target 1320 with a high degree of autonomy requiring little or no intervention from the user. Also illustrated in FIG. 20A is an imaging window 1325A. The imaging window 1325A shows the current view of the camera, which is pointed at, or moving to achieve, the imaging target 1320. FIGS. 20B, 20C, and 20D illustrate the same user interface window 1300 with the environment map 1390, navigation target 1330, planned path 1315, and imaging target 1320.

The robot plans for achieving the various task-oriented targets may include using a variety of robot conduct and robot behaviors available within the robot software architecture. As non-limiting examples, the conduct and behaviors may include focus behaviors, manipulation behaviors, go-to points, waypoints, path-planning, search regions, patrol regions, retro-traverse, and laser tracking.

FIGS. 20B, 20C, and 20D also illustrate various robot positions and pose icons 1310B, 1310C, and 1310D, respectively, as the robot traverses along the planned path 1315. Finally, FIGS. 20B, 20C, and 20D also illustrate various images perceived by the camera 1325B, 1325C, and 1325D, respectively, as the robot traverses along the planned path 1315 while the camera 1325B, 1325C, and 1325D autonomously adjusts to point at the imaging target 1320.

Figure 21:
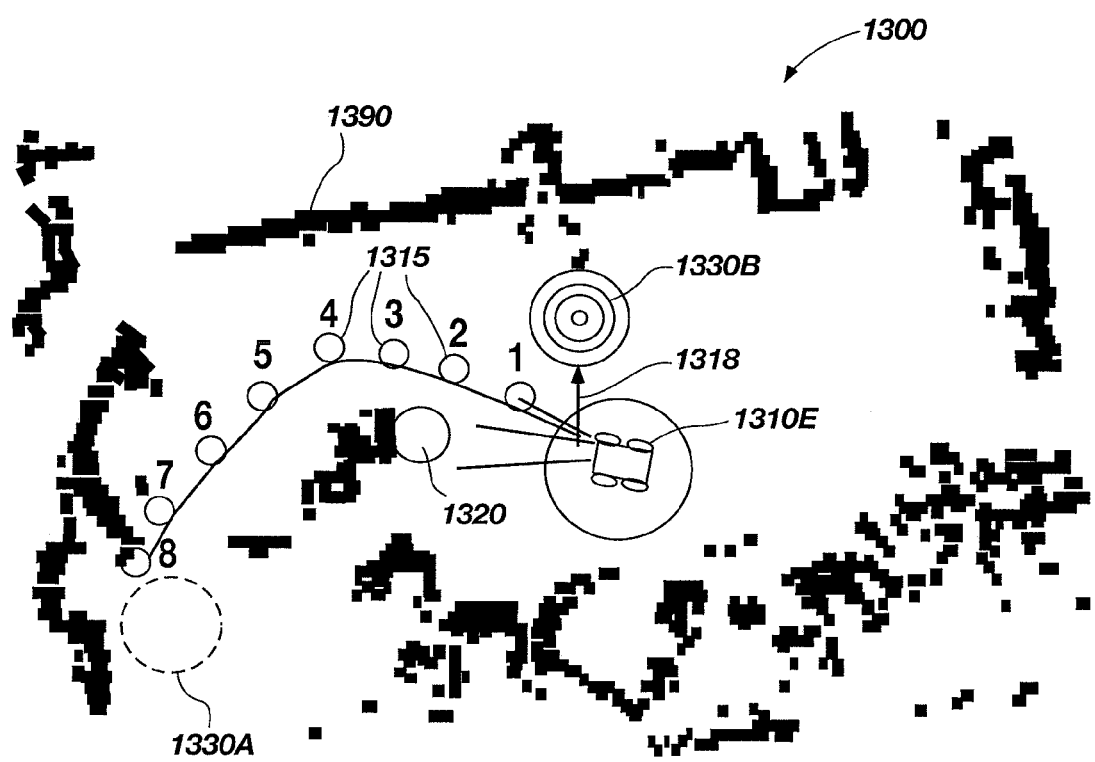
FIG. 21 is a user interface window showing task-oriented targets with user interface intervention of the robot's behavior in accordance with one or more embodiments of the present invention.

FIG. 21 is a user interface window 1300 showing the environment map 1390, a robot position and pose icon 1310E, an imaging target 1320, and a planned path 1315. However, in FIG. 21, the user has moved the navigation target from a first position 1330A to a second position 1330B. This new second position 1330B of the navigation target is much closer to the current position of the robot, as is indicated by vector 1318. With this movement, the user interface will direct the robot to abandon the currently planned path 1315. Since the second target is much closer to the robot, rather than telling the robot to plan a path, the user interface will instruct the robot to enter a lower initiative mode and follow instructions from the user interface. Note that the instructions are still not coming directly from the user as in instructions that may be generated by a user using a joystick to control the robot's movements. Rather, the instructions are generated by the user interface based on the vector 1318 between the robot and the second position 1330B of the navigation target. In this low initiative mode for the robot, one can view the second position 1330B of the navigation target from the user's perspective as a "carrot" for the robot to follow. The user may drag the second position 1330B of the navigation target around and as the second position 1330B of the navigation target moves, the user interface determines a new vector 1318 and sends new instructions to the robot on how to move to achieve the new second position of the navigation target. This moving of a target for the robot to chase after may be much more intuitive for a user and the robot can proceed more directly to the intended point in the environment map 1390. Thus, the second position 1330B of the navigation target may eliminate, or greatly reduce, the possibility of missing the intended point by being off to one side, going too far, or stopping short, all of which can easily happen if the user is in direct control of driving the robot with a joystick. In other words, the performance in achieving a target is better using the second position 1330B of the navigation target because the users perception is map centric (i.e., where on the map the target is), rather than view centric (i.e., where in my field of view am I trying to get the robot to go).

The instruction from the user interface for achieving the task-oriented target in these lower initiative modes may include using a variety of robot conduct and robot behaviors available within the robot software architecture. As non-limiting examples, the conduct and behaviors may include focus behaviors, manipulation behaviors, go-to points, waypoints, path-planning, search regions, patrol regions, retro-traverse, and laser tracking.

With these task-oriented targets, a user with less trust in the robot can keep direct control of the robot by keeping the target relatively close to the robot and moving the target as the robot moves, similar to leading the robot on a tight leash. If the user has more trust in the robot's ability to achieve the target on its own, or the user does not care how the robot achieves the target, the user can place the target farther away from the robot and move the target less often. Consequently, the changes in autonomy level for the robot are indirectly controlled by the user based on where a task-oriented target is placed, how often it moves, and whether it is inside an event horizon. Event horizons were explained earlier and also will be discussed later when discussing the robot's actions in the seamless autonomy system.

Navigation targets 1330 and imaging targets 1320 have been illustrated and discussed. However, other task-oriented targets are contemplated within the scope of the present invention. As non-limiting examples, the task-oriented target may be a navigation target, an imaging target, an artillery target, a sensor target, a manipulator target, and the like.

In addition, as illustrated in FIGS. 20A-20D and 21, multiple task-oriented targets may be used at any given time. As a non-limiting example of multiple task-oriented targets, a user may use a navigation target to direct the robot toward a certain point in the environment, a sensor target to direct the robot to sense for a parameter of interest near the robot, and an imaging target to direct the robot to look behind, so the user can determine if anything is approaching near the robot.

Task-oriented targets may be placed in a two-dimensional map or a three-dimensional map and include two-dimensional or three-dimensional coordinates. In addition, task-oriented targets may include task attribute information beyond just location within an environment map. As a non-limiting example, a task-oriented target may be associated with a manipulator as a manipulator target. This manipulator target may be placed, for example, on a door handle. Thus, the user interface will direct the robot to use the manipulator to achieve the manipulator target on the door handle. Other task attribute information assigned to the manipulator target may include information such as which way to turn the door handle, which way to push the door, and similar attributes associated with the manipulator in question. As another non-limiting example, a bomb sniffer element may be capable of detecting different types of bombs based on metal content, chemical content, and the like. The specific types of attributes that the bomb sniffer is searching for may be defined as attributes attached to a bomb-sniffer target. As another non-limiting example, a navigation target may be defined as a center-point around which the robot should circle. Thus, task attributes for a navigation target may include an orbit attribute and a radius attribute for the orbit. As yet another example, offsets and pose information may be defined relative to a navigation target. The offset may define where the robot should stop when it has achieved the target. For example, an offset attribute may define that the robot should stop one meter in front of the target, to the side of the target, or centered on the target. As an example, the robot may include a manipulator or sensor that extends one meter in front of the robot. Thus, if the offset attribute is set to one meter in front of the robot, the robot stops in an optimal position for using the manipulator without additional requirements from the user to fine-tune the robot's position before using the manipulator.

In addition, task-oriented targets may be used in a wide variety of robot platforms, such as, for example, Unmanned Ground Vehicles (UGVs), Unmanned Air Vehicles (UAVs), Unattended Ground Sensors (UGSs), and Unmanned Water Vehicles such as Unmanned Surface Vehicles (USVs) and Unmanned Underwater vehicles (UUVs).

As an example of the strength of task-oriented targets, in a UAV an image target may be placed on a specific location on the ground. Then the user can direct the UAV to circle, or directly navigate the UAV using a navigation target. All the while the user is directing navigation, possibly with high user intervention and low robot initiative, the user interface and robot are cooperating to keep the camera directed at and focused on the image target with low user intervention and high robot initiative.

5.1. User Interface

Figure 22:
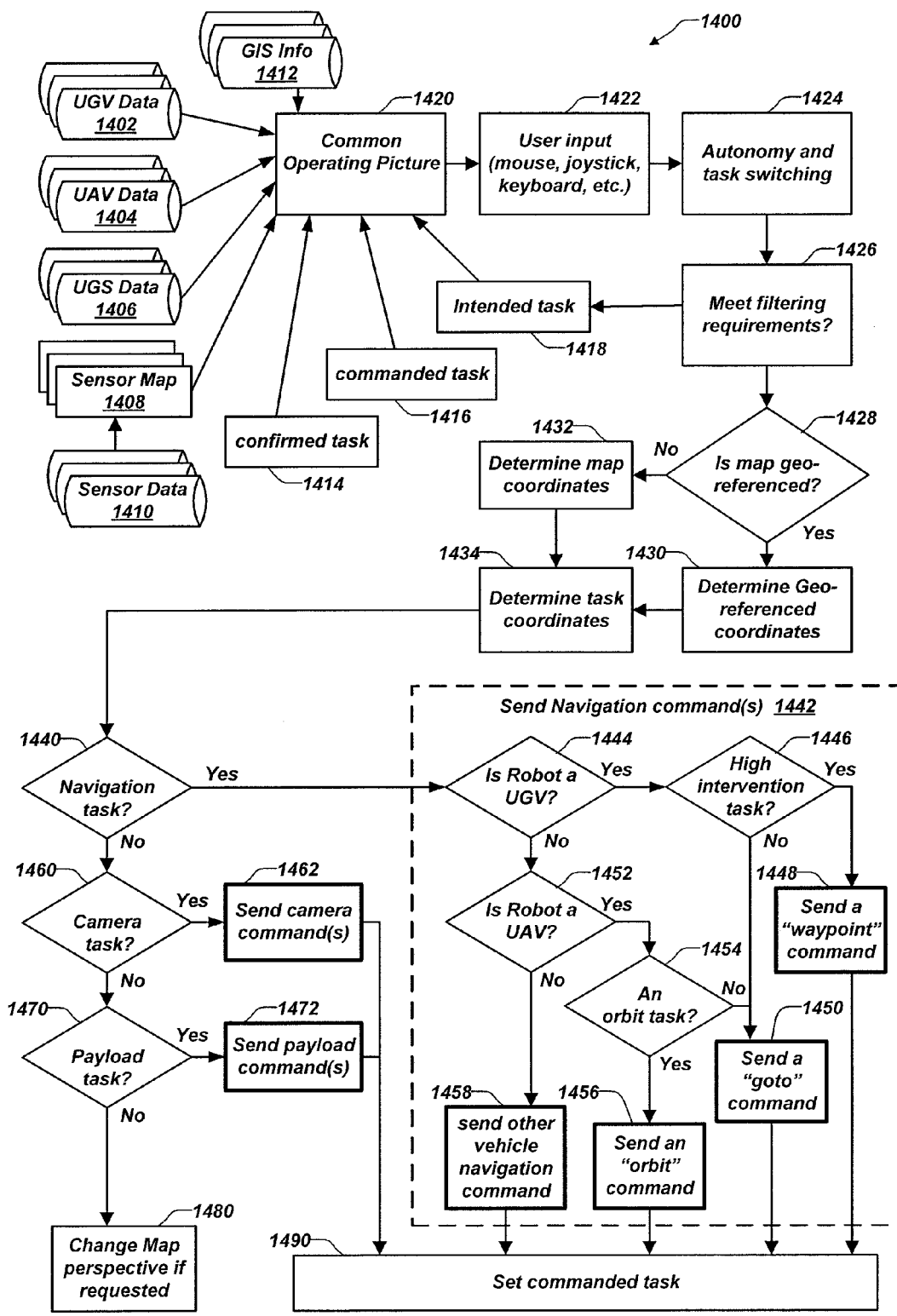
FIG. 22 is a simplified flow chart illustrating components of a user interface algorithm for controlling seamless task-oriented autonomy adjustments in accordance with one or more embodiments of the present invention.

FIG. 22 is a simplified flow chart illustrating components of a user interface algorithm 1400 for controlling seamless task-oriented autonomy adjustments in accordance with one or more embodiments of the present invention.

A common operating picture 1420 may receive information from a variety of sources to develop an understanding of the robot and its environment. Non-limiting examples of these sources are, UGV data 1402, UAV data 1404, UGS data 1406, Geospatial Information System (GIS) information 1412, and sensor data 1410, either directly or via a sensor map 1408. The common operating picture 1420 includes the GUI that is presented to the user as well as all the collected information from the various data sources and information about the robot and the various task designators (i.e., task-oriented targets).

The common operating picture 1420 also receives information about the task designators in the form of intended tasks 1418, commanded tasks 1416, and confirmed tasks 1414, as is explained more fully below.

Operation block 1422 indicates user input in the form of a mouse, a joystick, a keyboard, haptic devices, and other suitable input devices for conveying a user's intentions to the user interface. The user's intentions may be actions for the robot to perform, such as, for example, where to go, what to do, what to look for, what to detect, and the like. The user interface algorithm 1400 illustrated herein is a simplified flow chart intended to show general actions performed as a result of the user placing, moving, and modifying task-oriented targets. Those of ordinary skill in the art will recognize that there may be many other inputs from the user not directly related to achieving task-oriented targets.

Based on the user input, and other information gathered by the common operating picture 1420, the user interface determines the appropriate tasks and autonomy level for the robot. As was explained above, in a very general sense, the autonomy level will have a low robot initiative if the task-oriented target is close to the robot, moving relatively frequently, or within an event horizon.

Operation block 1426 tests to see if the task-oriented target meets certain filtering requirements and filters information about the task-oriented target to meet those filtering requirements. These filtering requirements may be time based and distance based. As a non-limiting example, if the user is dragging a task-oriented target around in the environment map, it may not be advisable to flood the communication channel between the user interface and robot with many small changes in position. Rather, the user interface may attempt to filter out many of these small changes to present fewer position changes to the robot based on communication capabilities. After creating the filtered information, operation block 1418 indicates that the intended task, based on the autonomy and task switching 1424 and filtering of operation block 1426 is communicated back to the common operating picture 1420 for display to the user. The intended task 1418 indicates what the user interface intends to instruct the robot to do.

In parallel with generating the intended task 1418, decision block 1428 tests to see if the map is geo-referenced. In other words, can the map be tied to Global Positioning System (GPS) coordinates, Universal Transverse Mercator (UTM)

geographic coordinates, or other suitable geo-referenced coordinate system? If the map is geo-referenced operation block 1430 determines the current geo-referenced coordinates for the task-oriented target. If the map is not geo-referenced operation block 1432 determines the current coordinates for the task-oriented target in terms of another suitable map, such as environment map coordinates.

Operation block 1434 determines the task coordinates from whichever map coordinates are provided. As non-limiting examples, these coordinates may be relative to the robot's current position and pose, relative to a specific sensor, relative to a specific manipulator, or relative to the robot's understanding of the environment.

The decision block string of 1440, 1460, and 1470 are example decisions that may be made for various task-oriented targets. Along with operation blocks 1442, 1462, and 1472, these decisions and operations are intended to be exemplary and not to cover the details of each possible task-oriented target or all possible operations for each task-oriented target.

Decision block 1440 determines if a navigation task needs to be addressed. If so, operation block 1442 determines what type of navigation commands should be sent to the robot. As a non-limiting example, details of the type of decisions and commands that may be performed are illustrated for operation block 1442. Decision block 1444 tests to see if the robot is a UGV. If so, decision block 1446 tests to see if the current task is a high intervention task or a high initiative task. As explained earlier, if the target is close to the robot, or the target is moving relatively frequently, the user interface decides that high intervention should be used.

In addition, if the target is within an event horizon high intervention may be appropriate. As a non-limiting example, the distance between the target and the robot may be close enough that the time to communicate instructions to the robot, perform a path plan on the robot, and communicate the path plan back to the user interface may be too long. In other words, at its present speed, the robot may reach the target before the planning operations can be performed. In these scenarios, high intervention is more appropriate because there is not enough time to allow high initiative.

If high intervention is appropriate, operation block 1448 sends a waypoint command to the robot. The waypoint command indicates to the robot where in its environment it should immediately head toward.

If high initiative is appropriate, operation block 1450 sends a "goto" command to the robot. The robot can then use its initiative to attempt to achieve the navigation target. The robot then plans a path to the navigation target and communicates the planned path back to the user interface for display to the user.

If the robot is not a UGV, decision block 1452 tests to see if the robot is a UAV. If not, operation block 1458 indicates that other vehicle navigation commands should be sent to the robot. As a non-limiting example, the robot may be an underwater vehicle and a decision should be made about the underwater vehicle's capabilities relative to the navigation target. Then, appropriate navigation commands at various autonomy levels can be sent to the underwater vehicle.

If the robot is a UAV, decision block 1454 tests to see if the current navigation task is to orbit around the navigation target. If the task is not an orbit task, operation block 1450 sends a "goto" command as was described above for the UGV. If the task is an orbit task, operation block 1456 sends an orbit command.

Those of ordinary skill in the art will recognize that operation block 1442 for handling navigation targets is a simplified block diagram. Many other types of robot vehicles may be involved as well as many other navigation decisions and navigation commands.

Returning to decision block 1440, if the current task is not a navigation task, decision block 1460 tests to see if the current task is a camera task. If so, operation block 1462 sends appropriate high robot initiative or low robot initiative commands to control a camera to the robot. As non-limiting examples, commands may be related to operations such as pan, tilt, focus, and zoom.

If the current task is not a camera task, decision block 1470 tests to see if the current task is a payload task. If the current task is a payload task, operation block 1472 sends appropriate high robot initiative or low robot initiative commands to control a payload. Non-limiting examples of payloads are bomb sniffers, manipulators, chemical sensors, and the like.

If the current task does not appear to relate to tasks for the robot to perform, operation block 1480 tests to see if the user wishes to change the map perspective and, if so, changes map views based on user instructions.

Operation blocks 1462, 1472, 1458, 1456, 1450, and 1448 all are operations sending instruction to the robot and are indicated as such by using a bold box. As part of sending the instruction to the robot, the user interface also defines the commanded task 1416 and sends it to the common operating picture 1420 for display to the user.

Operation block 1490 sets the commanded task 1416 indicating that the robot has received the commanded task 1416 and has acknowledged the instructions. The acknowledgement may be a simple reply or a complex reply that may include information about what the robot intends to do, such as, for example, a waypoint list for a planned path. As part of the acknowledgement, the user interface reports a confirmed task 1414 to the common operating picture 1420 for display to the user. Thus, the common operating picture 1420, and the user if appropriate, is aware of tasks to be performed at three levels; an intended task 1418 not yet sent to the robot, a commanded task 1416 indicating what the user interface wants the robot to perform, and a confirmed task 1414 indicating that the robot acknowledges that the task is being attempted.

5.2. Robot Actions

Figure 23:
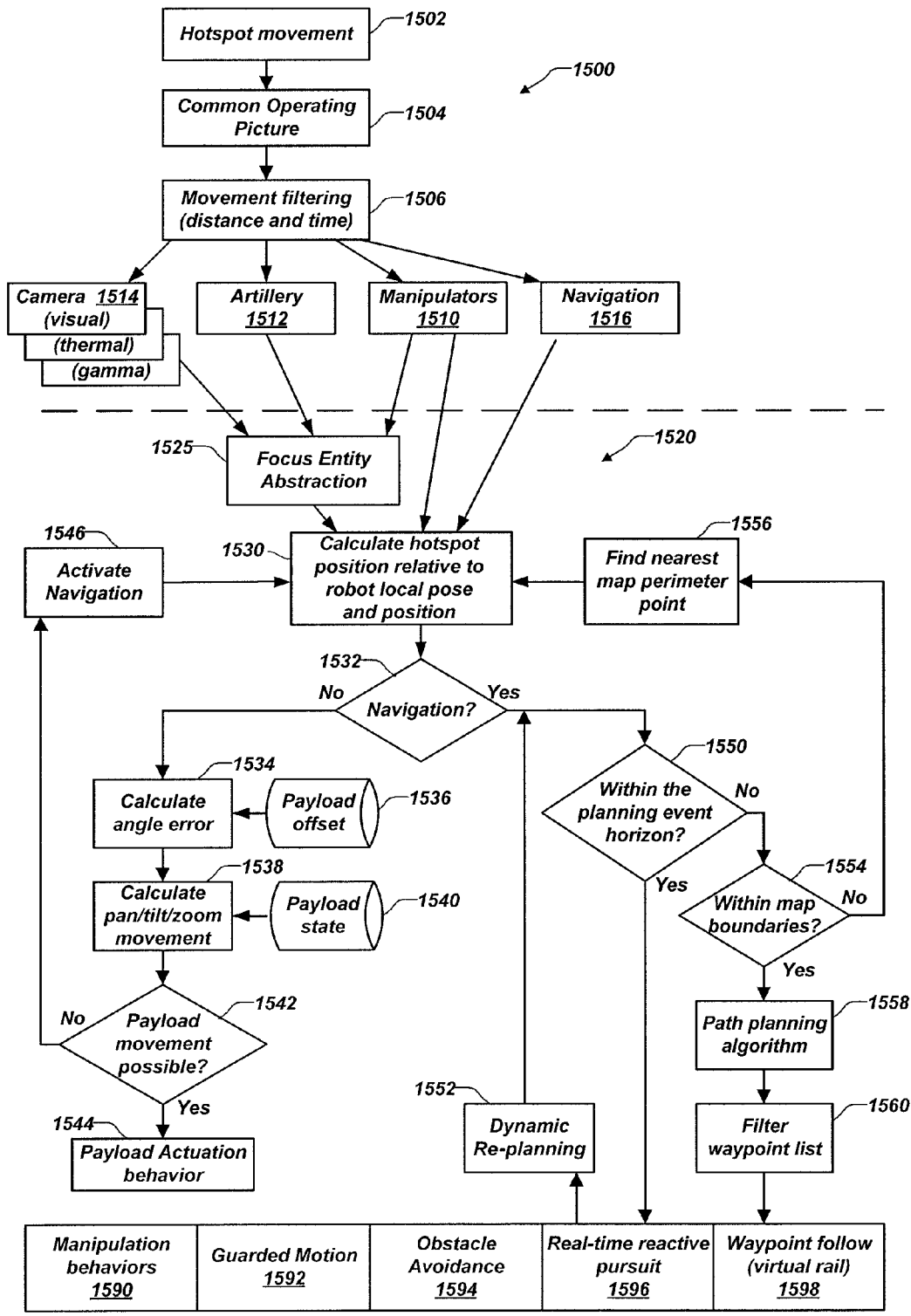
FIG. 23 is a simplified flow chart illustrating components of a robot algorithm for controlling seamless task-oriented autonomy adjustments in accordance with one or more embodiments of the present invention.

FIG. 23 is a simplified flow chart illustrating components of a robot algorithm for controlling seamless task-oriented autonomy adjustments on the robot in accordance with one or more embodiments of the present invention. Operations 1500, shown above the dashed line of FIG. 23, are operations performed by the user interface. Operations 1520, shown below the dashed line of FIG. 23, are operations performed by the robot platform. A change to the current state of the seamless autonomy related to task-oriented targets generally begins with a hotspot (i.e., task-oriented target) movement 1502, which may include hotspot placement and changes to task attributes. The hotspot movement 1502 along with other information is communicated to the common operating picture 1504 (designated as common operating picture 1420 in FIG. 22), as was explained above with respect to FIG. 22. Movement filtering 1506 (designated as decision block 1426 in FIG. 22) with respect to time and distance may be performed.

As non-limiting examples, task-oriented targets may be related to manipulators 1510, artillery 1512, navigation 1516, and cameras 1514. As non-limiting examples, cameras may include still and video images generated for visual images, thermal images, and gamma images.

Robot instructions related to task-oriented targets may call a focus entity abstraction 1525 on the robot. Other robot instructions, such as, for example, navigation targets, and possibly manipulator targets may go directly to operation block 1530.

The focus entity abstraction 1525 generally may be used in connection with visual hotspots for various visual tracking behaviors, such as, for example, determining line of sight, tracking, determining distance, and the like.

Operation block 1530 determines the hotspot position relative to the robot's local pose and position. This may include conversion to a robot coordinate system or an environment map coordinate system. In other words, the current hotspot position is put in robot understandable coordinates.

Decision block 1532 tests for whether the current hotspot being analyzed is a navigation target. If so, decision block 1550 tests to see if the hotspot is within a planning event horizon. As discussed earlier, the distance between the target and the robot may be close enough that the robot may not have time to perform a path-planning algorithm. In other words, at its present speed, the robot may reach the target before the planning operations can be performed. If the navigation target is within the planning event horizon, the robot may use a real-time reactive pursuit behavior 1596, such as, for example, the robotic follow conduct discussed above. During performance of the pursuit behavior 1596, dynamic re-planning 1552 may be requested because the navigation target may move outside of the event horizon, enabling the possibility to generate a path plan using robot conduct and robot behaviors, such s manipulation behaviors 1590, guarded motion 1592, and obstacle avoidance 1594. After dynamic re-planning 1552, control returns to decision block 1550 to see if the target is still within the event horizon.

If the navigation target is outside the event horizon, decision block 1554 tests to see if the navigation target is within the map boundaries. The navigation target placed by the user may actually be outside the boundaries of the map the robot has of its environment. If the navigation target is not within the map boundary, operation block 1556 finds the nearest point on the map boundary based on where a vector between the robot and the target crosses the map boundary. As the robot moves toward this new point on the map boundary, it may discover more about its environment on its own or through the user interface enabling the robot to re-plan movement toward the navigation target. After finding the perimeter point, as indicated by operation block 1556, control returns to operation block 1530 to determine robot position relative to the perimeter point.

If the navigation target is within the map boundary, operation block 1558 determines a path plan and operation block 1560 filters out some of the waypoints in the path plan, if appropriate. For example, the filter may remove multiple waypoints in a substantially straight line or reduce the number of waypoints on a curve. With the path plan determined and filtered, a waypoint following conduct 1598, such as, for example, the virtual rail conduct discussed above, is performed to achieve the navigation target.

Returning to decision block 1532, if the current hotspot is not a navigation target, the target may be related to a payload such as a sensor, manipulator, or camera. Operation block 1534 calculates the angle of error relative to a payload offset 1536. A payload offset may indicate a payload's position relative to the robot. As a non-limiting example, a camera may be mounted on the back of a robot and compensation may be needed relative to the center of the robot.

Operation block 1538 calculates the needed pan/tilt/zoom movement, or other appropriate movements for manipulators or sensors, needed to achieve the hotspot. Information about the payload state 1540 may be used in the calculations of operation block 1538. Decision block 1542 tests to see if the calculated movements are possible. For example, a manipulator may extend beyond the robot and movement of the manipulator in the desired manner may cause it to meet an obstacle. If the payload movement is possible, an appropriate payload actuation behavior 1544 is executed.

If the payload movement is not possible, operation block 1546 activates a navigation task 1546 in an effort to move the robot to a position, pose, or combination thereof that will allow the desired payload movement.

In some instances, the robot may have better knowledge of the environment than the user. In these cases, the robot may move the navigation target, or modify waypoints in a path plan. As a non-limiting example, the hotspot may be on an opposite side of a wall that the user was not aware of or did not see. In such cases, the robot may move the hotspot, or create a new path plan to get around the wall. Similarly, a new obstacle may be placed in the robot's current path, causing the robot to re-plan a path or move the hotspot.

As with FIG. 22, the simplified flowchart of FIG. 23 is intended to illustrate only some of the operations and decisions that the robot may need to perform to achieve a task-oriented target with an emphasis on navigation decisions and operations. Those of ordinary skill in the art will recognize that many other navigation decisions and operations are included within the scope of the present invention. Similarly, those of ordinary skill in the art will recognize that for the sake of brevity, decisions and operations related to other task-oriented targets would be similar to those for navigation and need not be described in detail herein.

6. Hazard Localization and Visualization

Embodiments of the present invention comprise methods and systems that provide a more intuitive visualization of a robot's environment and hazard intensities detected therein. In addition, embodiments of the present invention provide for the user to direct a robot's activities without having to understand the available robot behaviors or autonomy levels. This intuitive approach provides a bridge between a user's intentions and a robot's behaviors by creating a new user interface to visualize environmental hazards, provide robot initiative to seek out hazards on its own, and adjustment between different levels of robot initiative and user intervention.

Various autonomy levels and elements of the user interface discussed above for seamless autonomy are augmented with new autonomous behaviors, visualizations, and user interfaces for hazard detection in embodiments discussed herein. With embodiments of the present invention, hazard evaluations of an area may be performed while keeping humans out of harm's way. Furthermore, in recent experimental comparisons, the time required for embodiments of the present invention to complete a localization task for a hazard source and egress from the hazardous area has been shown empirically to take significantly less time than conventional hazard identification systems.

With conventional systems, threat characterization performance may be highly dependent on training and operator skill. This training may take years and include expertise with multiple hazard sensors, training in first response approaches and HAZMAT and radiological controls. Embodiments of the present invention allow a user with limited training in these areas to accomplish a full threat assessment, identify personnel safety limits, localize sources and produce a highly accurate hazard map.

Embodiments of the present invention increase the efficiency of threat characterization and response by producing a dynamic, robot-generated representation of the hazard plume within a terrain map of the surrounding area. The operator's understanding of the threat is supported by a dynamic three-dimensional (3D) visualization of the hazard gradient that illustrates personnel safety limits, facilitates source localization, and supports drag-and-drop robot tasking.

Robot platforms and control systems include an intelligent threat seeking system that can be combined with several different robotic platforms to detect and localize multiple hazards, such as, for example, radiological, chemical, and explosive hazards. The system may also report the findings in a number of graphical formats to an operator who remains a safe distance from the hazardous environment.

Returning to FIG. 1, the locomotors 175 enable the robot to move around in its environment. The perceptors 165 on the robot platform 100 include one or more hazard sensors for detecting a wide variety of hazards, such as, for example, Volatile Organic Chemicals (VOCs), chlorine ($CL_2$), ammonia ($NH_3$), explosives, radiation, ground penetrating radar, metal content, and landmines. As non-limiting examples, some of these hazard sensors may be a Nomadics' FIDO® explosives detector, RAE Systems' Multi-RAE chemical detector, Arrow-Tech's AMP-50 Geiger Mueller (GM) tube area radiation detector, and other suitable hazard sensors that can be incorporated into the plug-and-play platform in embodiments of the present invention.

Hazard information indicative of a magnitude of the hazard is gathered from the hazard sensors 165 and analyzed by the system controller 110 or communicated to a remote controller. The hazard information is converted to a hazard level based on the intensity (e.g., magnitude) of the hazard that is sensed. In some embodiments, the robot platform 100 may autonomously explore an environment to discover varying hazard levels for a variety of sensed hazards. In other embodiments, the robot platform 100 may communicate with remote controllers such that a user can assist or direct the robot in the hazard exploration using varying levels of the dynamic autonomy discussed above.

Figure 24:
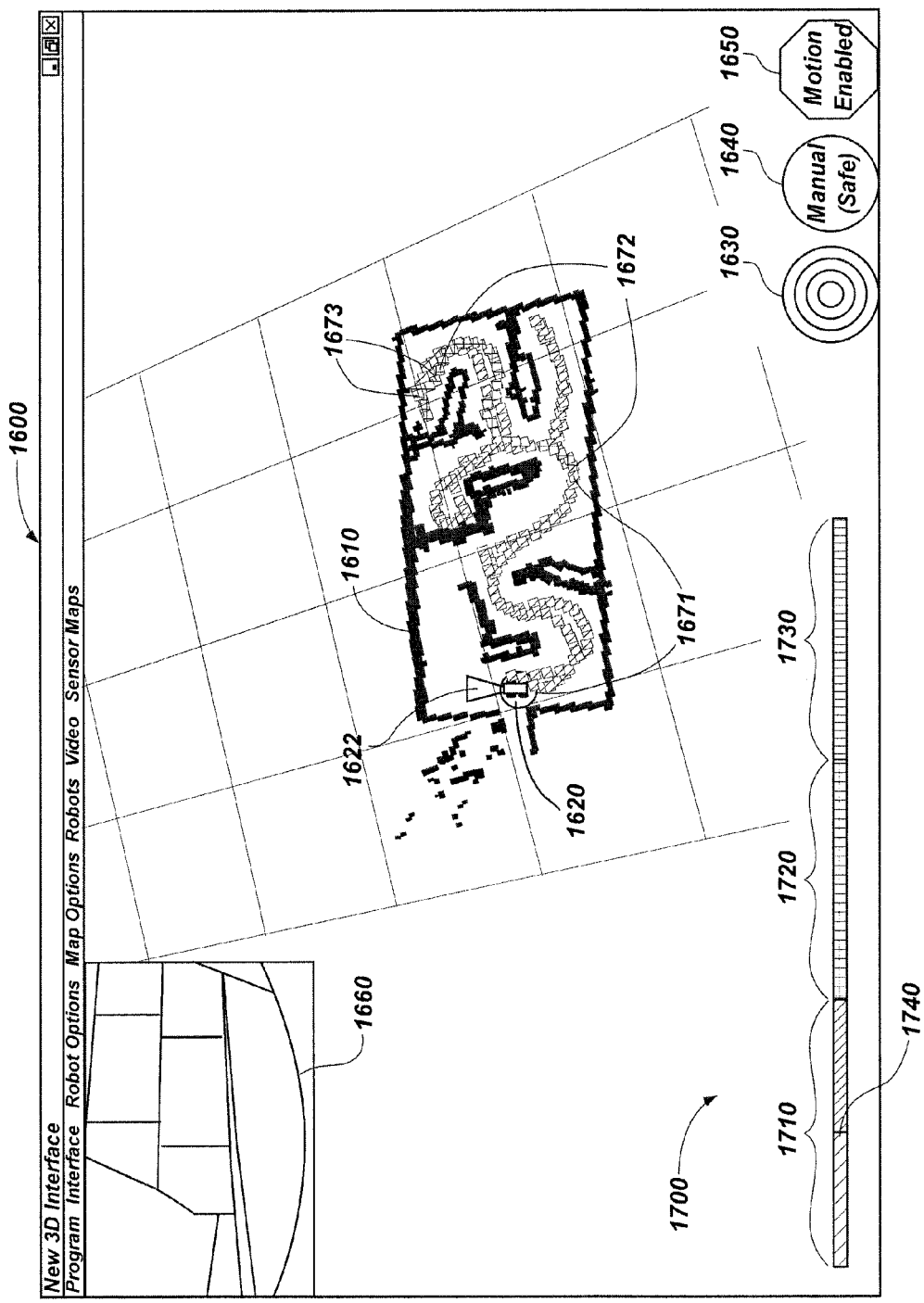
FIG. 24 is a user interface window showing a robot path through an environment and a hazard gradient scale with the robot path illustrated as various hazard indicators showing hazard intensities at various path locations.

FIG. 24 is a graphical user interface (GUI) window 1600 showing a robot path through an environment and a hazard gradient scale 1700. The robot path may be illustrated with various hazard indicators (1671, 1672, and 1673) showing hazard intensities at various path locations.

The user interface window 1600 may include an environment map 1610, a robot position 1620, one or more task-oriented targets 1630 (only one depicted in FIG. 24), other robot controls (1640 and 1650) and an imaging window 1660. As a non-limiting example, seamless autonomy changes using task-oriented targets may be incorporated within the GRA, RIK, robot behaviors, and robot conduct described herein to conduct searches for, and create maps of, various hazards. However, embodiments of the present invention are not so limited. Hazard detection and mapping according to embodiments of the present invention may be practiced in other robot architectures that define specific behaviors for the robot to accomplish and include an architecture of varying autonomy levels.

The environment map 1610 depicts the portions of an interior space that the robot comprehends up to this point in time. As the robot progresses through the environment, it may fill out more details of the environment map 1610. In addition, details of the environment map 1610 may be filled in from other sources, such as, for example, GPS information, or other information that may be supplied by the user interface. Occupancy grid-based maps may be a good choice of map because they provide a higher resolution for tasking; however, any map representation can work as long as the robot is localized with respect to the map. Furthermore, the map may depict any environment that the robot is in, not just an interior space as depicted in FIG. 24.

In FIG. 24, the robot's current location and pose 1620 is shown in the center-left area of the environment map 1610. The imaging window 1660 shows the current view of a camera mounted on the robot. The image indicator 1622 shows a current direction that the camera is pointing. The task-oriented target 1630 may be placed in the environment map 1610 by the user to assist the robot in achieving tasks using the seamless autonomy discussed above. Other robot controls, such as, for example, a manual control 1640 for switching the robot to a teleoperation mode, and a motion enable control 1650 for enabling and disabling motion of the robot platform may also be used. Of course, those of ordinary skill in the art will recognize that many other types of robot controls may be present and contemplated within the scope of the present invention.

The hazard gradient scale 1700 indicates the various levels of a hazard that may be encountered and displayed in the environment map 1610. The hazard gradient scale 1700 indicates varying levels for a given hazard. As a non-limiting example, the hazard gradient scale 1700 may depict hazard intensities from non-existent to a high intensity that may be a very high concentration or a level that is very hazardous to humans. The hazard gradient scale 1700 of FIG. 24 illustrates three hazard levels; a low level 1710, an intermediate level 1720, and a high level 1730. As illustrated the hazard gradient scale 1700 gives the user a visual understanding of the hazard levels. As a non-limiting example, the low level 1710 may be illustrated as the color green, the intermediate level 1720 may be illustrated as the color yellow, and the high level 1730 may be illustrated as the color red. For each individual level, a gradient within the level may be defined from low to high with different textures, color saturations, color transparency, combinations thereof, or other suitable gradient indicators.

The scale of the hazard gradient scale 1700 and identification of the different levels (1710, 1720, and 1730) may be an abstraction of intensities for a given hazard. As a non-limiting example, the low level 1710 may indicate a hazard intensity that is safe for humans, the intermediate level 1720 may indicate a first personnel exposure limit, and the high level 1730 may indicate a second personnel exposure limit. In addition, the hazard gradient scale 1700 may include a current indicator 1740 to show the hazard intensity at the robot's current location and pose 1620.

In application, each small square (which may be labeled generically as 1670) is a hazard indicator 1670 along the robot's path giving an indication of the hazard intensity at that location in the environmental map 1610 based on hazards sensed by the robot when it was located at that point. Thus, low-hazard indicators 1671 indicate locations in the environmental map 1610 with a low level 1710 of the hazard gradient scale 1700. Similarly, intermediate-hazard indicators 1672 indicate locations in the environment map 1610 with an intermediate level 1720 of the hazard gradient scale 1700. Finally, high-hazard indicators 1673 indicate locations in the environment map 1610 with a high level 1730 of the hazard gradient scale 1700. Each hazard indicator (1671, 1672, and 1673) may include a gradient and color matching with a corresponding gradient and color shown on the hazard gradient scale 1700.

Tasking the robot from the user interface may take place in three primary modes. The first mode of tasking may be to click a button that toggles between autonomous exploration, safe teleoperation, or other autonomy levels as discussed above. In autonomous mode the robot may move forward and turn when obstacles obstruct its path, in teleoperation, the operator controls the robot through a user interface. In the second mode, the operator can use a computer mouse or other pointer to drag-and-drop a target icon to specify where in the environment the user would like the robot to explore using the seamless autonomy discussed above. When this is done, the robot will plan its own path to the destination and proceed to follow the path. The third mode of interaction is to click on the robot and drag it along the desired path for the robot to follow. This approach supports a more precise control of where the robot will explore in comparison to the target mode.

To simplify the interactions, the user need only utilize the desired interaction schemes and the system automatically adjusts from the previous interaction to the new interaction. For example, if the robot is in autonomous mode and the user wants to teleoperate the robot, the user can just start using the joystick or the keyboard to drive the robot. Or if the robot is in teleoperation, the user can just drag the target and the system automatically changes the level of intelligence.

As can be seen in FIG. 24 a hazardous source has been localized to an area near the upper right corner of the environment map 1610 by high-hazard indicators 1673. Navigational algorithms may use the information to plan exploration paths that enable the robot to search and take readings of the entire environment. The navigational algorithms further allow the robot to do a directed search toward the area of highest readings. This localization may have been performed autonomously by the robot by repeatedly sampling hazard intensities, moving to new locations and sampling hazard intensities, and using adaptive feedback to move toward areas with higher hazard intensities. Alternatively, the localization may have been performed by a user operating the robot in teleoperation mode and viewing the hazard indicators in the user interface window 1600 to seek out areas with higher hazard intensities. Finally, the localization may have been performed in cooperation between robot initiative and user intervention using procedures such as the seamless autonomy discussed above.

Figure 25:
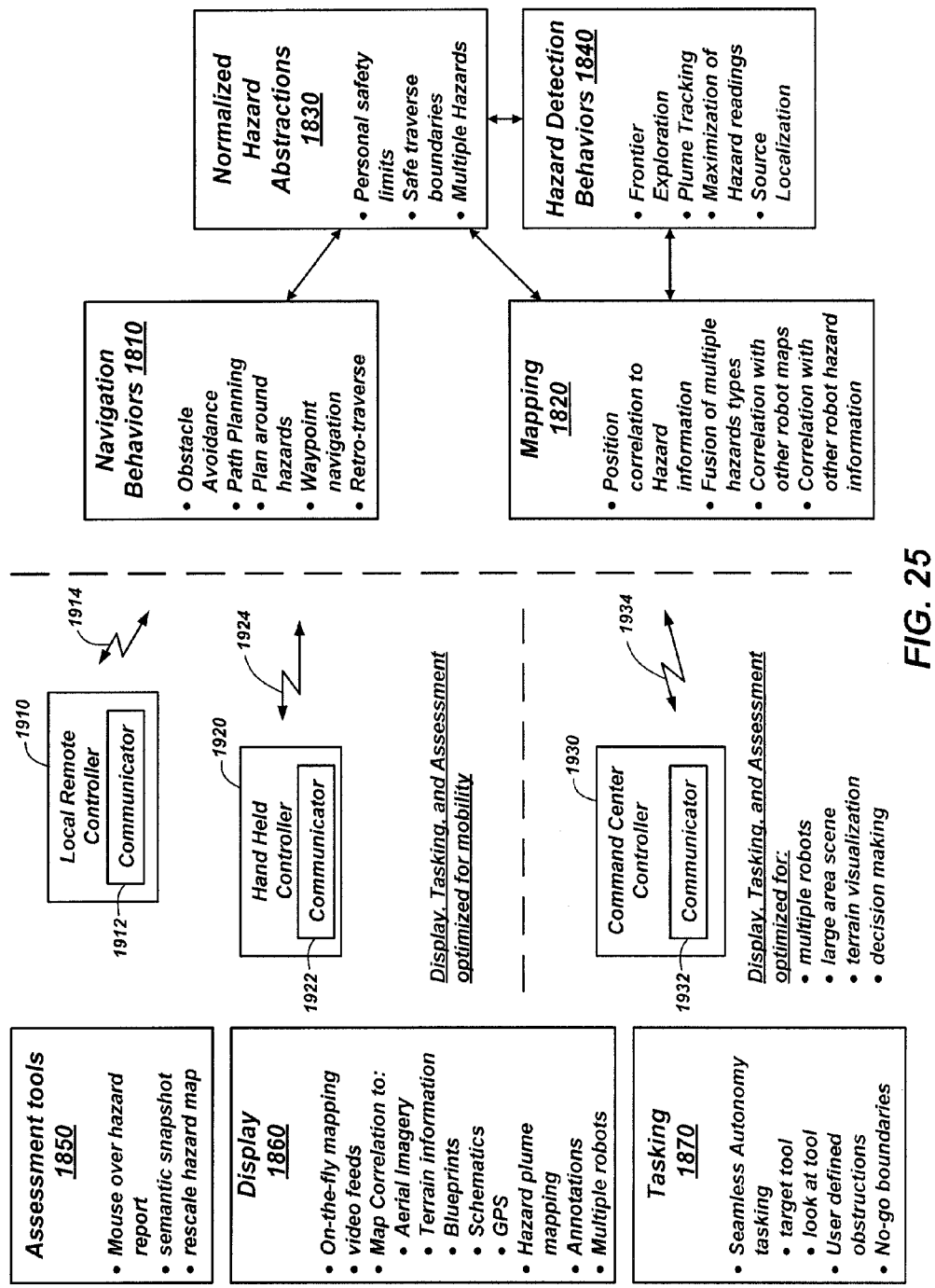
FIG. 25 is a simplified block diagram illustrating elements of a hazard sensing robot and possible controllers for a robot system.

FIG. 25 is a simplified block diagram illustrating elements of a hazard sensing robot and possible controllers for a robot system. Elements on the right side of FIG. 25 illustrate behaviors and abstractions that may be implemented on the robot and used in seeking out, mapping, and visualizing hazards in an environment. Elements on the left side of FIG. 25 illustrate procedures and tools that may be used in a robot control system including a combination of the robot and a remote controller operated by the user and in communication with the robot.

FIG. 25 illustrates a local remote controller 1910 and a handheld remote controller 1920 in the upper-left side of the drawing. These types of remote controllers may be used with display, tasking, and assessment elements that are optimized for mobility of the robot, mobility of the user, and a more local control of the robot by the user.

The local remote controller may be a handheld device 1910, such as, for example, a Wii® remote, an iPOD®, or an iPHONE®. The handheld device 1910 includes a communicator 1912 for communicating with the robot via proximate-range communication 1914, such as, for example, BLUETOOTH®, infrared, or other suitable communication protocols and frequencies for communication over distances of 100 feet or less. This handheld device 1910 may be able to perform user commands, such as, for example, switch the level of autonomy, cue hazard detection and navigation behaviors, and permit direct teleoperation control with a user interface including elements such as dedicated function buttons, arrow buttons, control buttons, and inertial sensors that translates user hand motion into directional commands to the robot. The handheld device 1910 may communicate the detection of hazards by a visual indicator, an auditory indicator, or a tactile indicator, such as, for example, light elements, simple audible tones, vibration of the handheld controller 1910, or displacement of tactile elements on the handheld device 1910. These hazard level indicators may indicate a type of hazard, an intensity of the hazard, or a combination thereof. The handheld device 1910 may be more useful for investigation of urban terrain when it is necessary for a responder to move quickly through complex terrain.

The local remote controller may be a handheld controller 1920, such as, for example, an iPOD®, an iPHONE®, or other suitable handheld computer. A user interface on the handheld controller 1920 may include elements such as a keyboard, dedicated function keys, a touch sensitive screen, and inertial sensors. The handheld controller 1920 may include a display for presenting a GUI to the user. A communicator 1922 is included for communicating with the robot via short-range communication. This short-range communication may be wireless network communication protocols 1924 such as 802.11a/b/g/n or other suitable radio communications frequencies and protocols for communications ranges of a few feet to several miles to where the robot is operating. The communicator 1922 may also include a combination of a proximate-range communicator, such as, for example, BLUETOOTH® and infrared communicating with a small portable radio that can be worn on the belt, placed in the pocket, or contained in a backpack. This portable radio can then extend the communications for several miles to where the robot is operating. The display of the handheld controller 1920 may be optimized to support "on-the-move" monitoring and high-level tasking and display elements such as those discussed above with reference to FIG. 24 and those discussed below with reference to FIGS. 26A-29C.

The handheld controller 1920 may be used in conjunction with the handheld device 1910 to provide additional situation awareness, visual feedback on the hazard mapping and an ability to monitor more than one robot. The handheld controller 1920 may be optimized in such a way that the user can focus on one modality at a time to maximize visual real estate (i.e., occupancy map, terrain data, hazard map, video feed) or can view a fusion of these visual elements.

FIG. 25 illustrates a command center controller 1930 in the lower-left side of the drawing, which may include one or more remote computers. The command center controller 1930 type of remote controller may be useful with display, tasking, and assessment elements that are optimized for multiple robots, large area scenes, terrain visualization, and complex decision making. Of course, embodiments of the present invention may also include systems utilizing one or more robots, one or more handheld controllers, a command center controller, and intercommunication between the various elements of the system.

User interfaces for the command center controller 1930 may include elements such as keyboards, dedicated function keys, a touch sensitive screen, mice, and other user interface elements associated with desktop computers, laptop computers, and small handheld computers. One or more displays for the command center controller 1930 may be optimized to high-level tasking and display elements such as those discussed above with reference to FIG. 24 and those discussed below with reference to FIGS. 26A-29C.

The command center controller 1930 also may include capabilities for merging maps and hazard data from multiple robots as well as communicating the intersection of maps and as well as positioning transforms in order to support multi-robot tasking. A communicator 1932 may use long-range communications 1934 over distances of hundreds or thousands of miles or within enclosed environments to extend the operational envelope to include caves, bunkers and large buildings where conventional robotic system currently cannot be used. Thus, embodiments of the present invention enable a non-roboticist to complete a thorough threat characterization with limited personal exposure and with minimal training. Furthermore, decision makers who may be at an even greater distance (100's or 1000's of miles) away are provided with a layered, information-rich visualization of the hazard to support a timely, well-informed response.

The robot system may use a variety of tools for performing hazard identification and localization. Assessment tools 1850 may include elements, such as, for example, mouse over hazard reports, virtual "Fly-Throughs" of the 3D hazard map, semantic snapshots of hazard areas, and resealing and thresholding of hazard maps.

Display tools 1860 may include a variety of real-time displays and post-processing information displays. The display tools 1860 may include elements, such as, for example, on-the-fly mapping, video feeds, hazard plume mapping, and Annotations for various hazards or elements in the environment. The display tools 1860 may include map correlations to additional information such as aerial imagery, terrain information, blueprints, schematics, and GPS information. The display tools 1860 may also include information about multiple robots, such as, for example, position and time referenced video feeds that can be fused into the 3D hazard map and a fused representation of maps from multiple robots.

Tasking tools 1870 may include task elements, such as, for example, seamless autonomy tasking, user-defined obstructions, and no-go boundaries. The tasking tools 1870 may also include tasking and elements defined above for seamless autonomy, such as, for example, target tools, and look-at tools.

Returning to the right side of FIG. 25, some of the interrelated elements that may be included on a hazard sensing robot are navigation behaviors 1810, mapping functions 1820, normalized hardware abstractions 1830 and hazard detection behaviors 1840. In terms of elements on the robot, software and hardware elements may normalize the hazard data and provide abstractions that can then be used as inputs to navigation behaviors 1810, mapping functions 1820 and hazard detection behaviors 1840.

Navigation behaviors 1810 may include behaviors, such as, for example, obstacle avoidance, hazard avoidance, path planning, plan around hazards, waypoint navigation, homing (i.e., plan most efficient path to entry point) and retrotraverse (i.e., follow exactly the same path taken back to entry point). Cognitive conduct may be developed using navigation behaviors 1810 and other robot behaviors to provide area coverage and exploration, "drive by intent" tasking tools for searching and localizing the source, Mapping functions 1820 may provide functions, such as, for example, position correlation to hazard information, fusion of multiple hazards types, correlation with other robot maps, and correlation with other robot's hazard information. Thus, the mapping functions 1820 can displays multiple threats at the same time in real-time using a fusion of robot map data and terrain data, and develop dynamic representations of safe and unsafe zones.

Normalized hazard abstractions 1830 may define elements, such as, for example, personal safety limits, safe traverse boundaries, and multiple hazards.

Hazard detection behaviors 1840 may use information from the mapping function 1820 and normalized hazard abstractions 1830 and include elements, such as, for example, frontier exploration, hazard plume tracking, maximization of hazard readings, and source localization.

All of these robot abstractions and behaviors (1810, 1820, 1830, and 1840), respectively, may be combined with range sensing capabilities and core navigational behaviors to support different modes of semi-autonomous control of the robot as it performs a characterization and mapping of the hazards within an environment. As sensor data is read into the navigational system, it is interpreted and correlated to the robot's current location. By comparing current and past readings, the navigational system can estimate the direction toward the source location and plan exploration paths to facilitate this search. All of this can be done autonomously by the robot or with varying amounts of user input using different levels of robot autonomy versus user intervention.

In addition to using the sensor readings to guide the navigation of the robot, the data also may be transmitted wirelessly to an interface that abstracts the data into color gradients to indicate to an operator the relative readings of the hazards. The interface further supports the use of simplified interaction technologies that support dynamic navigation and exploration behaviors and simplified mode switching to allow the operator quick switching to and from more robot autonomy and more human control.

FIGS. 26A-26D illustrate graphical representations of multi-hazard gradient scales according to embodiments of the present invention. The hazard gradient scale 1700 illustrated in FIG. 24 shows a scale for a single hazard. However, embodiments of the present invention may fuse multiple hazard indication levels into the same hazard gradient scale.

Fusing multiple hazards may be useful in a number of situations. One such situation is for detecting landmines. In landmine detection, ground penetrating radar may be fused with a metal detector (e.g., electromagnetic sensors) in a combination. This combination may enable a user to distinguish between detection of small metal objects and metal objects that may be a landmine.

The abstractions of the sensor data on the interface may include three hazard level bands, which may indicate personnel safety limits. As non-limiting examples, the low level may be displayed as green to represent safer areas, the high level may be displayed as red to represent the most dangerous areas, and the intermediate level may be displayed as yellow to represent somewhat dangerous areas. The bounds between the abstractions are determined from subject matter experts and may be adjustable depending on the needs of the operator.

Figure 26A:
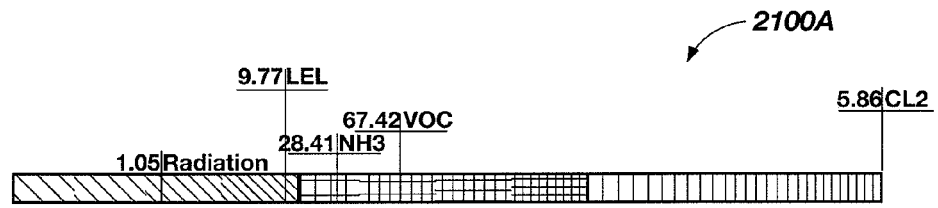
FIGS. 26A-26D illustrate graphical representations of hazard gradient scales according to embodiments of the present invention.

In FIG. 26A, a multi-hazard gradient scale 2100A shows hazard readings from five different hazard sensors on the same scale. Thus, the same hazard gradient scale 2100A shows chlorine at 5.86, VOC at 67.42, $NH_3$ at 28.41, a lower explosive limit (LEL) at 9.77, and radiation at 1.05.

Figure 26B:
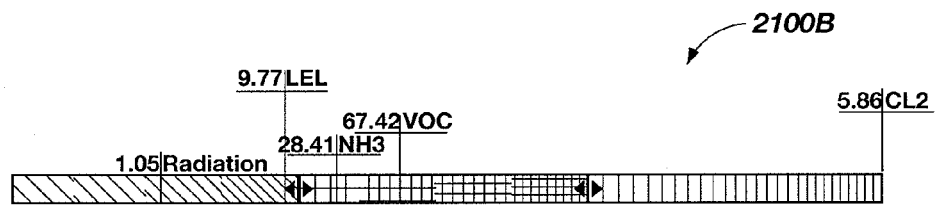

FIG. 26B shows the same hazards and hazard levels as in FIG. 26A. However, in FIG. 26B, a multi-hazard gradient scale 2100B includes adjustable scales between the low level, the intermediate level and the high level, as indicated by the arrows at the boundaries between levels. Thus, the user can adjust and scale the readings to show where different hazard readings fall in different hazard levels.

Figure 26C:

FIG. 26C shows the same hazards and hazard levels as in FIG. 26A and FIG. 26B, however in FIG. 26C the boundaries between levels on a multi-hazard gradient scale 2100C have been moved. The boundary between the low hazard level and the intermediate hazard level has been slid to the right by a large amount and the boundary between the intermediate hazard level and the high hazard level has been slid to the right by a small amount. Moving the boundaries may be useful for a user to identify and isolate the most dangerous areas or least dangerous areas on an environment map by using a smaller or larger scale and gradient within some of the levels.

Figure 26D:

FIG. 26D shows the same hazards and hazard levels as in FIG. 26A, FIGS. 26B, and 26C, however in FIG. 26D the boundaries between levels on a multi-hazard gradient scale 2100D have been moved. The boundary between the low hazard level and the intermediate hazard level has been slid to the left by a small amount and the boundary between the intermediate hazard level and the high hazard level has been slid to the left by a large amount. Moving the boundaries in this fashion may be useful for a user to identify the highest readings on an environment map by using a smaller or larger scale and gradient within some of the levels.

Figure 27A:
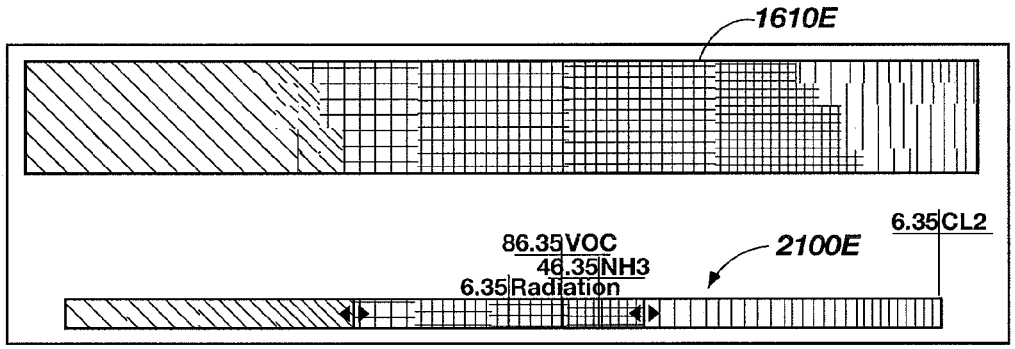
FIGS. 27A-27C illustrate graphical representations of a two-dimensional linear representation of a path the robot has traversed and a multi-hazard gradient scale according to one or more embodiments of the present invention.
Figure 27B:
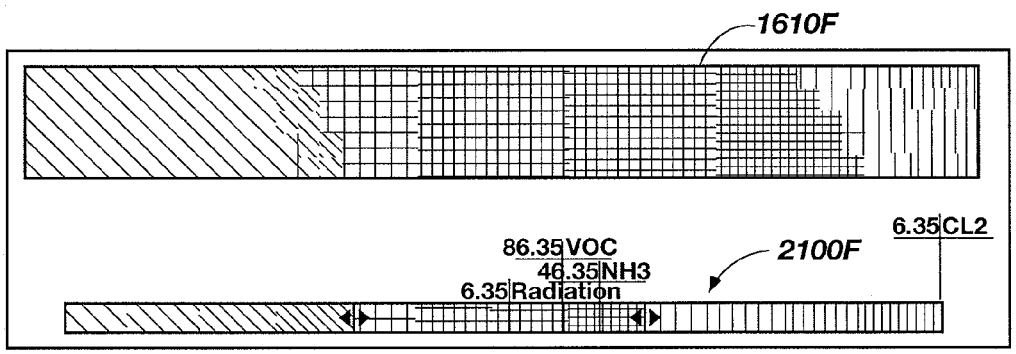
Figure 27C:
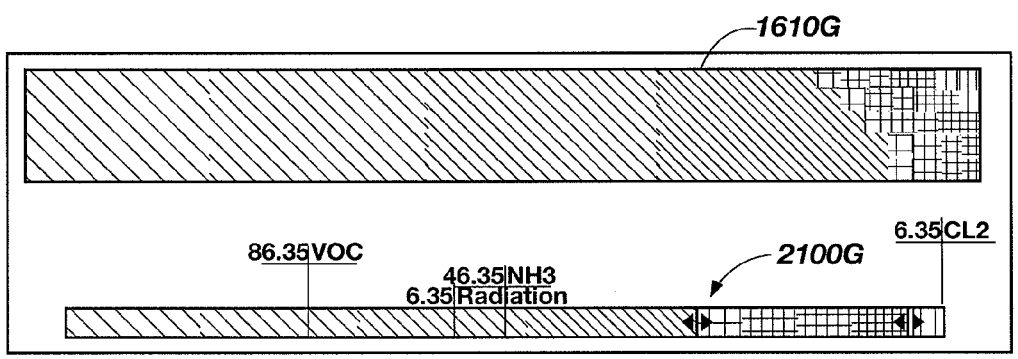

FIGS. 27A-27C illustrate graphical representations of a two-dimensional linear representation (generically indicated as 1610) of a path the robot has traversed and a multi-hazard gradient scale (generically indicated as 2100) according to one or more embodiments of the present invention. The two-dimensional linear representation 1610E is another form of an environment map that shows the robot's path linearly, rather than in a three-dimensional space. In other words, the turns performed by the robot are not illustrated. The linear representation may be narrow, indicating a track the robot has followed, or may be varying width to indicate hazards at a distance to the sides of the path the robot has followed. This two-dimensional linear representation may be easier for the user to quickly comprehend in some situations and may replace or augment the three-dimensional environment map 1610 shown in FIG. 24. It should also be pointed out that the hazard indicators in the two-dimensional linear representation 1610 may vary over time as the robot potentially discovers higher hazard levels.

FIG. 27A shows the two-dimensional linear representation 1610E of a path the robot has traversed and the multi-hazard gradient scale 2100E. In FIG. 27A, the area to the left of the robot (i.e., the top part of the two-dimensional linear representation 1610E) shows that the hazard transitioned to the high level sooner on the left of the robot than on the right of the robot.

FIG. 27B shows the two-dimensional linear representation 1610F of a path the robot has traversed and the multi-hazard gradient scale 2100F. In FIG. 27B, the boundary between the low level and intermediate level and the boundary between the high level and the intermediate level have been slid to the right on the multi-hazard gradient scale 2100F. A corresponding change in the hazard indicators on the two-dimensional linear representation 1610F may also be seen in FIG. 27B.

FIG. 27C shows the two-dimensional linear representation 1610G of a path the robot has traversed and the multi-hazard gradient scale 2100G. In FIG. 27C, the boundary between the low level and intermediate level and the boundary between the high level and the intermediate level have been slid to the left on the multi-hazard gradient scale 2100G. A corresponding change in the hazard indicators on the two-dimensional linear representation 1610G may also be seen in FIG. 27C.

Figure 28A:
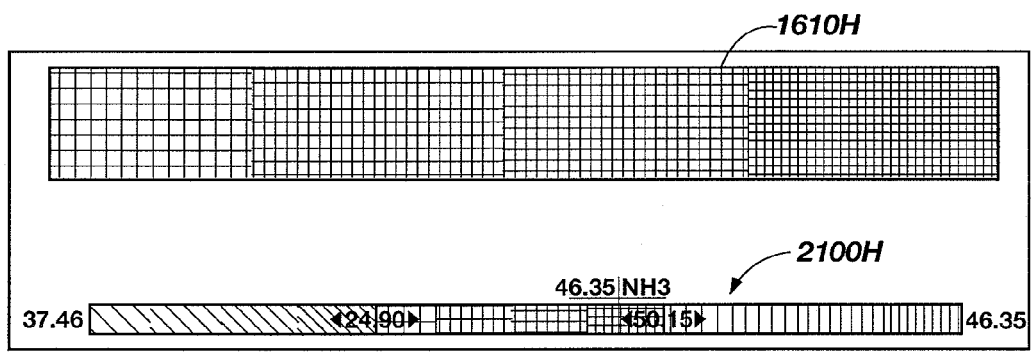
FIGS. 28A and 28B illustrate graphical representations of a two-dimensional linear representation of a path the robot has traversed and a hazard gradient scale for ammonia according to one or more embodiments of the present invention.

FIG. 28A illustrates a graphical representation of a two-dimensional linear representation 1610H of a path the robot has traversed and a hazard gradient scale 2100H for ammonia. As can be seen, the hazard indicators on the two-dimensional linear representation 1610H all fall within a small gradient of the intermediate level.

Figure 28B:
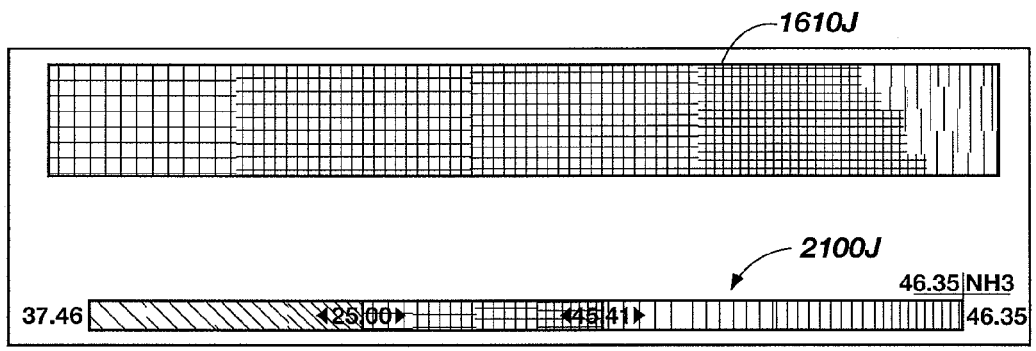

FIG. 28B illustrates a graphical representation of a two-dimensional linear representation 1610) of a path the robot has traversed and a hazard gradient scale 2100J for ammonia. In FIG. 28B, the boundary between the low level and intermediate level and the boundary between the high level and the intermediate level have been slid to the left on the multi-hazard gradient scale 2100J. With this modification, a transition can be seen on the two-dimensional linear representation 1610) between the intermediate level and the high level. Thus, by adjusting the boundaries, the user may be able to discern more useful information on the display hazard.

Figure 29A:
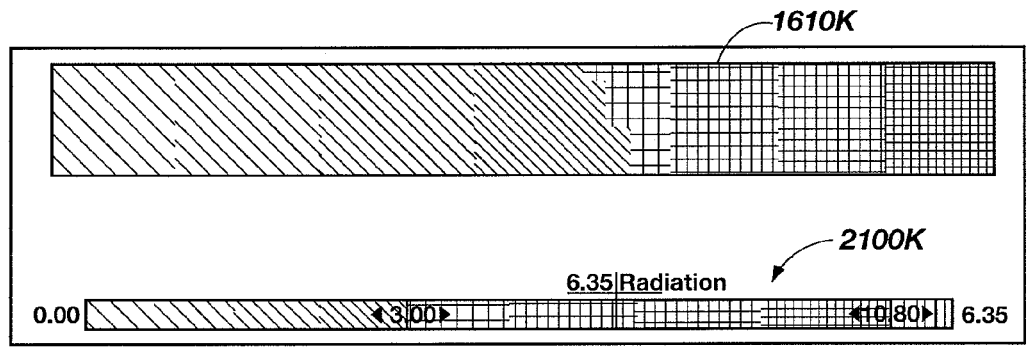
FIGS. 29A-29C illustrate graphical representations of a two-dimensional linear representation of a path the robot has traversed and a hazard gradient scale for radiation according to one or more embodiments of the present invention.

FIG. 29A illustrates a graphical representation of a two-dimensional linear representation 1610K of a path the robot has traversed and a hazard gradient scale 2100K for radiation. In FIG. 29A, the boundary between the intermediate level and the high level is placed near the extreme right of the hazard gradient scale 2100K.

Figure 29B:
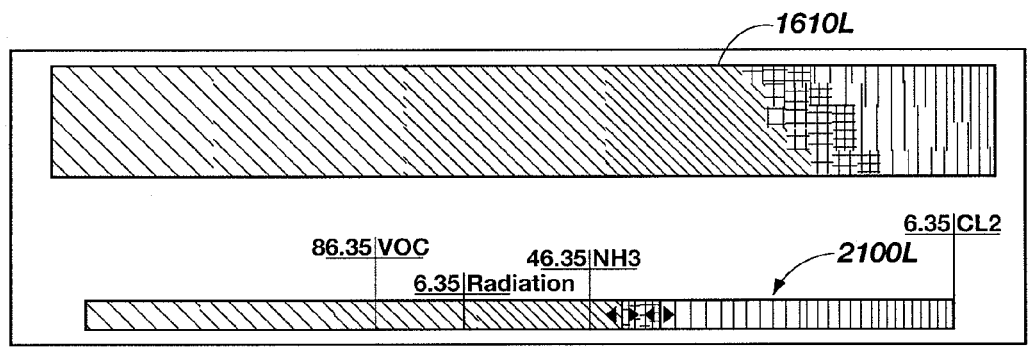

FIG. 29B illustrates a graphical representation of a two-dimensional linear representation 1610L of a path the robot has traversed and a hazard gradient scale 2100L for radiation. In FIG. 29B, the boundary between the intermediate level and the high level has been slid to near the center of the hazard gradient scale 2100L. With this modification, the intermediate level is much smaller and more levels of gradation for the intermediate level can be seen on the two-dimensional linear representation 1610L.

Figure 29C:
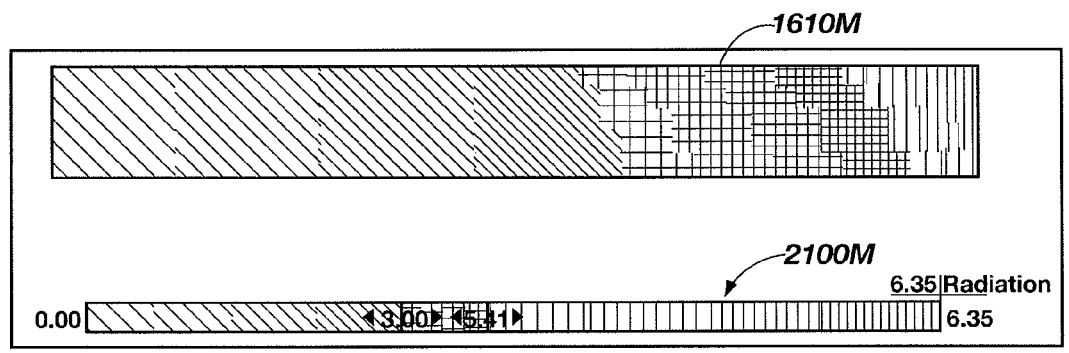

FIG. 29C illustrates a graphical representation of a two-dimensional linear representation 1610M of a path the robot has traversed and a hazard gradient scale 2100M for radiation. In FIG. 29C, the boundary between the intermediate level and the high level has been slid even farther to the left than in FIG. 29B. With this modification, the intermediate level is much smaller and more levels of gradation for the intermediate level can be seen on the two-dimensional linear representation 1610M. In addition, a transition to the high level can also be seen.

Figure 30A:
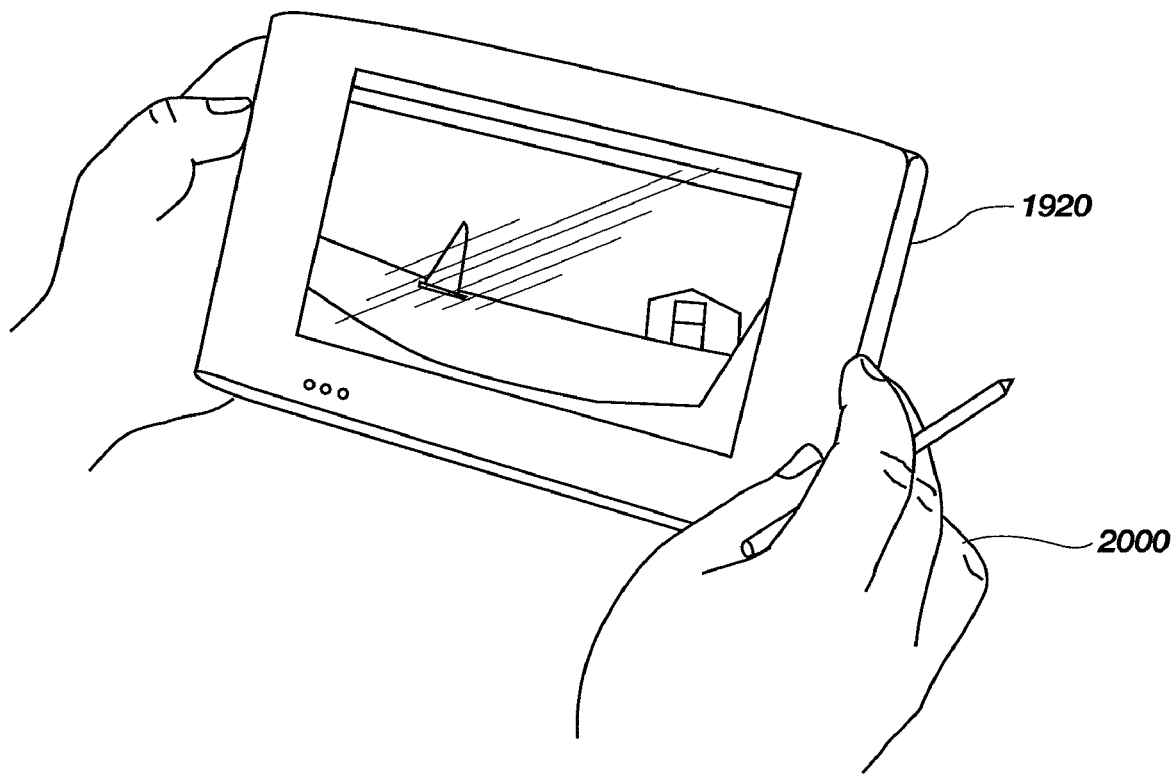
FIGS. 30A-30C illustrate a handheld controller and two possible graphical interfaces for display thereon.
Figure 30B:
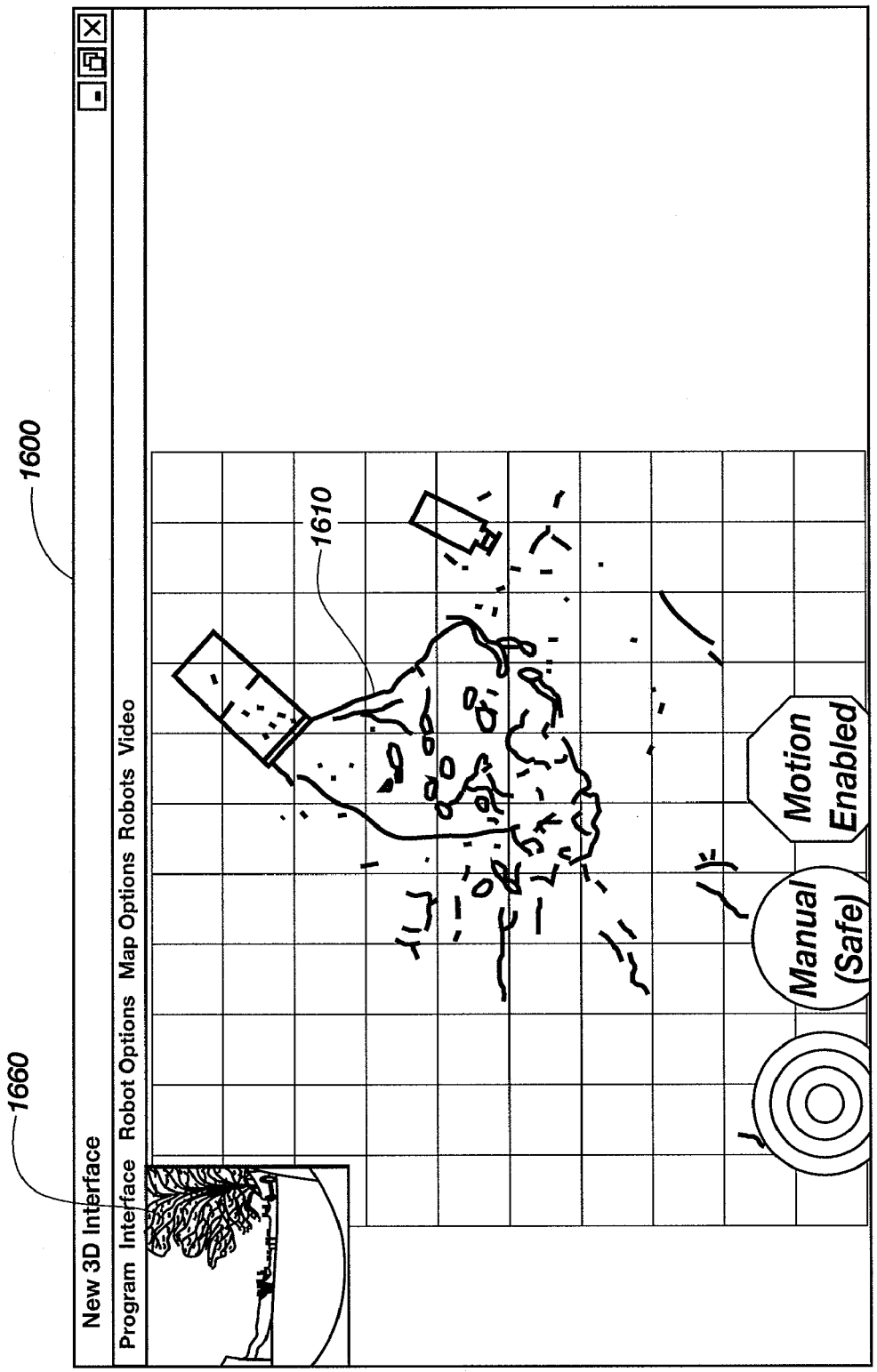
Figure 30C:
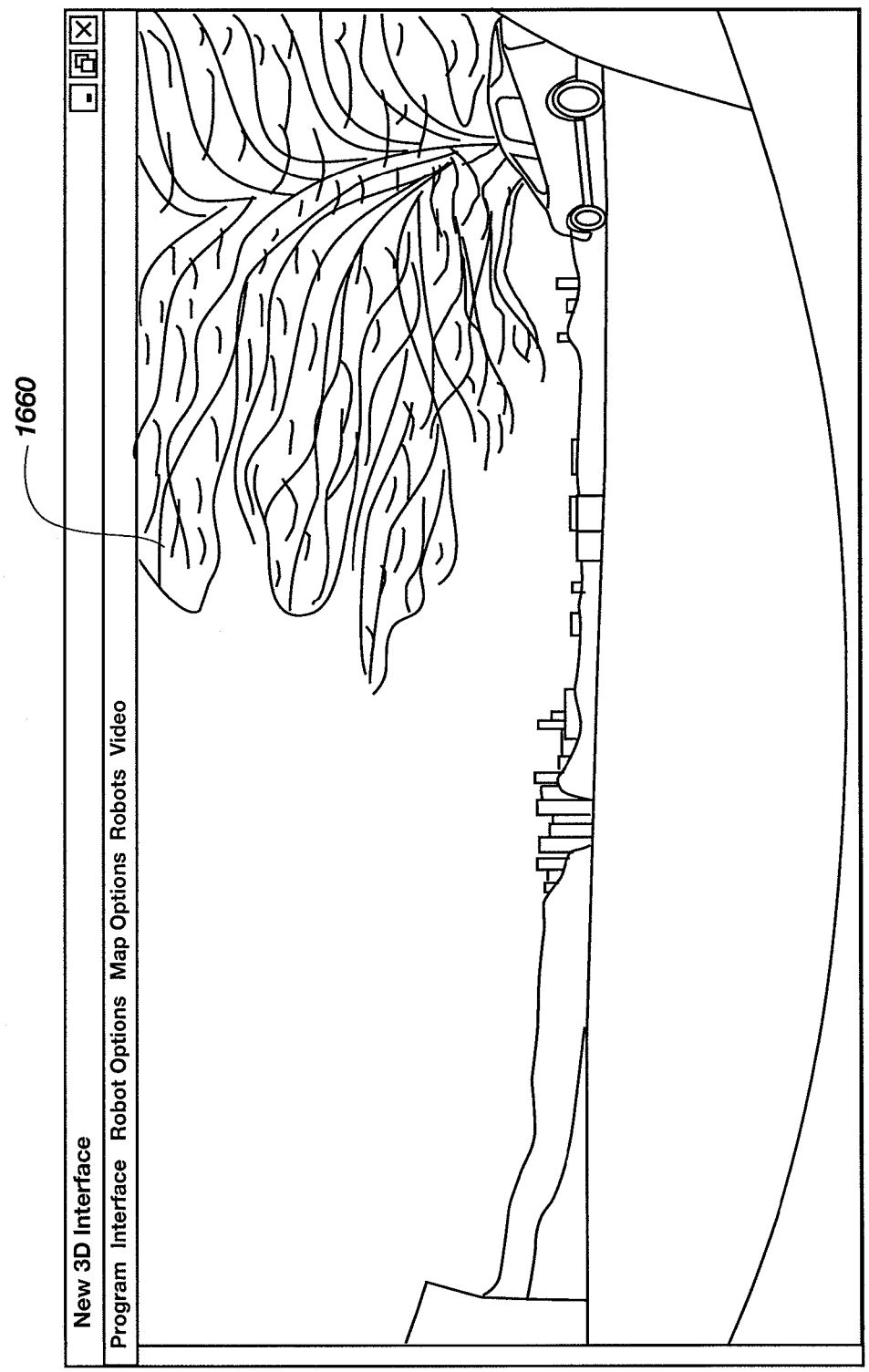

FIGS. 30A-30C illustrate a handheld controller 1920 and two possible graphical interfaces for display thereon. FIG. 30A illustrates a user 2000 holding the handheld controller 1920 with a video feed from the robot in an imaging window 1660, as shown in FIG. 30C. The user 2000 may also view a GUI 1600, which may include the imaging window 1660 and an environment map 1610 as explained above with reference to FIG. 24.

Figure 31A:
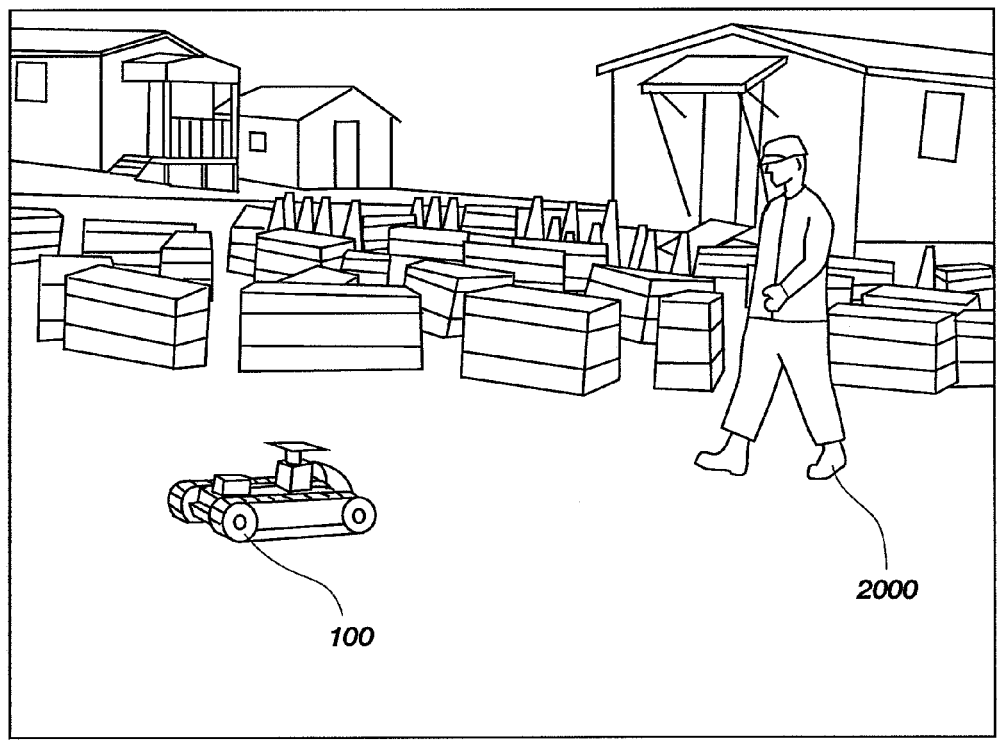
FIGS. 31A and 31B illustrate a local remote controller and a user controlling a hazard sensing robot with the local remote controller.
Figure 31B:
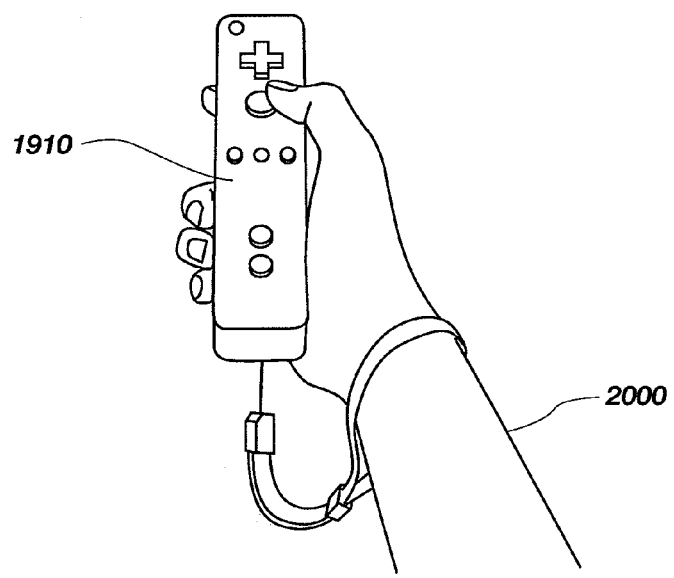

FIGS. 31A and 31B illustrate a handheld device 1910 and a user 2000 controlling a hazard sensing robot 100 with the handheld device 1910. In FIG. 31A a user 2000 is shown closely following the robot 100. The handheld device 1910 is not visible in the user's hand in FIG. 31A. FIG. 31B illustrates an example of a handheld device 1910 held by a user 2000 to direct the robots actions as explained above.

Although this invention has been described with reference to particular embodiments, the invention is not limited to these described embodiments. Rather, the invention is encompassed by the appended claims and their legal equivalents.

What is claimed is:
1. A robot platform, comprising:
a hazard sensor configured for sensing an environmental hazard to generate a signal containing hazard information indicative of a magnitude of the environmental hazard;
a locomotor configured for providing mobility to the robot platform; and
a system controller disposed on the robot platform and operably coupled to the locomotor and the signal from the hazard sensor, the system controller configured for executing a hazard evaluation of an area of interest, the hazard evaluation, comprising repeatedly:
determining a hazard level proximate the hazard sensor from the hazard information; and using a robot initiative to adaptively move the robot platform with the locomotor to a new position responsive to the hazard level determined at one or more of a present hazard level and previous hazard levels from the repeated hazard level determinations; and determining a hazard gradient indicating varying levels of a hazard intensity at different locations responsive to two or more of the repeated hazard level determinations.

2. The robot platform of claim 1, further comprising a communication interface operably coupled to the system controller and configured for communicating the hazard information to a remote user interface.

3. The robot platform of claim 2, wherein the system controller is further configured for:

receiving instructions from the remote user interface using the communication interface, the instructions for achieving at least one task-oriented target and comprising at least one of intervention instructions, robot initiative instructions, and instructions for setting a task-oriented autonomy level;

if the instructions are the robot initiative instructions, developing a robot plan to achieve the at least one task-oriented target and performing the robot plan; and if the instructions are the intervention instructions, then performing the intervention instructions for achieving the at least one task-oriented target from the remote user interface and, if present, overriding the robot plan to achieve the at least one task-oriented target.

4. The robot platform of claim 3, wherein the at least one task-oriented target is selected from the group consisting of a navigation target, an imaging target, a sensor target, and a manipulator target.

5. The robot platform of claim 1, further comprising at least one additional hazard sensor operably coupled to the system controller and configured for sensing a different environmental hazard as additional hazard information and wherein the system controller is further configured for using a robot initiative to adaptively move the robot platform responsive to a combination of the hazard level and the additional hazard information.

6. The robot platform of claim 1, further comprising a manipulator configured for moving the hazard sensor relative to the robot platform and wherein the system controller is further configured for repeatedly using the robot initiative to adaptively move the hazard sensor with the manipulator to a new manipulator position responsive to the hazard level determined at one or more of the present hazard level and previous hazard levels from the repeated operations.

7. The robot platform of claim 1, further comprising a communication interface operably coupled to the system controller and configured for communicating the hazard gradient to a remote user interface.

8. A robot platform, comprising:

a hazard sensor configured for sensing an environmental hazard to generate a signal containing hazard information indicative of a magnitude of the environmental hazard at a current location;

a manipulator configured for moving the hazard sensor relative to the robot platform; and a system controller disposed on the robot platform and operably coupled to the manipulator, and the signal from the at least one hazard sensor, the system controller configured for executing a hazard evaluation of an area of interest, the hazard evaluation, comprising repeatedly:

determining a hazard level proximate the hazard sensor from the hazard information; and using a robot initiative to adaptively move the hazard sensor with the manipulator to a new manipulator position responsive to the hazard level determined at one or more of a present hazard level and previous hazard levels from the repeated hazard level determinations; and determining a hazard gradient indicating varying levels of a hazard intensity at different locations responsive to two or more of the repeated hazard level determinations.

9. The robot platform of claim 8, further comprising a locomotor configured for providing mobility to the robot platform and wherein the system controller is further configured for repeatedly using the robot initiative to move the robot platform with the locomotor to a new position responsive to the hazard level determined at one or more of the present hazard level and previous hazard levels from the repeated operations.

10. The robot platform of claim 9, further comprising at least one additional hazard sensor operably coupled to the system controller and configured for sensing a different environmental hazard as additional hazard information and wherein the system controller is further configured for using a robot initiative to adaptively move the robot platform responsive to a combination of the hazard level and the additional hazard information.

11. The robot platform of claim 8, further comprising a communication interface operably coupled to the system controller and configured for communicating the hazard information to a remote user interface.

12. The robot platform of claim 11, wherein the system controller is further configured for:

receiving instructions from the remote user interface using the communication interface, the instructions for achieving at least one task-oriented target and comprising at least one of intervention instructions, robot initiative instructions, and instructions for setting a task-oriented autonomy level;

if the instructions are the robot initiative instructions, developing a robot plan to achieve the at least one task-oriented target and performing the robot plan; and if the instructions are the intervention instructions, then performing the intervention instructions for achieving the at least one task-oriented target from the remote user interface and, if present, overriding the robot plan to achieve the at least one task-oriented target.

13. The robot platform of claim 12, wherein the at least one task-oriented target is selected from the group consisting of a navigation target, an imaging target, a sensor target, and a manipulator target.

14. The robot platform of claim 8, further comprising a communication interface operably coupled to the system controller and configured for communicating the hazard gradient to a remote user interface.

* * * * *

UNITED STATES PATENT AND TRADEMARK OFFICE
CERTIFICATE OF CORRECTION

PATENT NO. : 8,355,818 B2  
APPLICATION NO. : 12/553794  
DATED : January 15, 2013  
INVENTOR(S) : Curtis W. Nielsen et al.

Page 1 of 1

It is certified that error appears in the above-identified patent and that said Letters Patent is hereby corrected as shown below:

In the specification:

| COLUMN 12, | LINE 23, | change "and 30';" to --and 30°;-- |
| COLUMN 12, | LINE 29, | change "-80';" to -- -80°;-- |

In the claims:

CLAIM 1, COLUMN 54, LINE 58, change "ard;" to --and;--

Signed and Sealed this  
Eighteenth Day of August, 2015

Michelle K. Lee  
*Director of the United States Patent and Trademark Office*